US006973229B1

(12) United States Patent
Tzathas et al.

(10) Patent No.: US 6,973,229 B1
(45) Date of Patent: Dec. 6, 2005

(54) NODE ARCHITECTURE FOR MODULARIZED AND RECONFIGURABLE OPTICAL NETWORKS, AND METHODS AND APPARATUS THEREFOR

(75) Inventors: Anastasios Tzathas, Howell, NJ (US); Moon W. Kim, Pleasanton, CA (US); Abdella Battou, Silver Spring, MD (US)

(73) Assignee: Lambda OpticalSystems Corporation, Reston, VA (US)

( * ) Notice: Subject to any disclaimer, the term of this patent is extended or adjusted under 35 U.S.C. 154(b) by 519 days.

(21) Appl. No.: 09/795,950

(22) Filed: Feb. 28, 2001

(51) Int. Cl.[7] ............................. G02B 6/26; G02B 6/28; H04J 14/00
(52) U.S. Cl. ............................. 385/16; 385/17; 385/24; 398/43; 398/45; 398/48
(58) Field of Search ............................. 385/16–18, 24; 359/115, 124; 398/48, 43, 45, 15; 370/352, 370/419

(56) References Cited

U.S. PATENT DOCUMENTS

| | | | |
|---|---|---|---|
| 4,979,118 A | 12/1990 | Kheradpir | |
| 5,169,332 A | 12/1992 | Cooke et al. | |
| 5,278,689 A | 1/1994 | Gitlin et al. | |
| 5,450,225 A | 9/1995 | Bostica et al. | |
| 5,480,319 A | 1/1996 | Vlakancic | |
| 5,488,500 A | 1/1996 | Glance | |
| 5,651,006 A | 7/1997 | Fujino et al. | 370/408 |
| 5,859,846 A | 1/1999 | Kim et al. | |
| 5,911,018 A | 6/1999 | Bischel et al. | |
| 5,941,955 A | 8/1999 | Wilby et al. | |
| 5,970,072 A * | 10/1999 | Gammenthaler et al. | 370/366 |
| 5,978,354 A | 11/1999 | Taketomi et al. | |
| 6,061,482 A | 5/2000 | Davis | |
| 6,067,288 A | 5/2000 | Miller et al. | |
| 6,078,596 A | 6/2000 | Wellbrock | |
| 6,151,023 A | 11/2000 | Chari | |
| 6,167,041 A * | 12/2000 | Afanador | 370/352 |
| 6,240,087 B1 * | 5/2001 | Cummings et al. | 370/353 |
| 6,260,062 B1 | 7/2001 | Davis et al. | |
| 6,275,499 B1 | 8/2001 | Wynn et al. | |
| 6,285,673 B1 * | 9/2001 | Blackburn et al. | 370/360 |
| 6,292,905 B1 | 9/2001 | Wallach et al. | |
| 6,320,877 B1 * | 11/2001 | Humphrey et al. | 370/419 |
| 6,339,488 B1 * | 1/2002 | Beshai et al. | 359/119 |
| 6,356,282 B2 | 3/2002 | Roytman et al. | |
| 6,366,716 B1 * | 4/2002 | Graves | 385/14 |

(Continued)

OTHER PUBLICATIONS

R.Ramaswami And K. Sivarajan, *Optical Networks: A Practical Perspective*, p.423-451, 1998.

(Continued)

*Primary Examiner*—Georgia Epps
*Assistant Examiner*—Jack Dinh
(74) *Attorney, Agent, or Firm*—Smith, Gambrell & Russell, LLP

(57) ABSTRACT

An optical transport switching system having an all-optical switch that can be selectively configured to provide cross-connection and add/drop multiplexing functions. Optical circuit cards are provided in a chassis/bay, and connected by an optical backplane. The circuit cards may include access line interface cards, optical access ingress cards, transport ingress cards, transport egress cards, and optical access egress cards. An optical switching fabric provides selective optical coupling between the cards. The all-optical switch can be used in an optical network that allows external/access networks to access the optical network, including access networks that use Gigabit Ethernet or SONET signaling. Wavelength conversion is provided for non-compliant wavelengths of the access networks. A local area network enables control and monitoring of the cards by a local node manager.

30 Claims, 49 Drawing Sheets

U.S. PATENT DOCUMENTS

| | | |
|---|---|---|
| 6,389,015 B1 | 5/2002 | Huang et al. |
| 6,411,623 B1 | 6/2002 | DeGollado et al. |
| 6,507,421 B1 | 1/2003 | Bishop et al. |
| 6,567,429 B1 | 5/2003 | DeMartino |
| 6,606,427 B1 | 8/2003 | Graves et al. |
| 6,647,208 B1 | 11/2003 | Kirby |
| 6,650,803 B1 | 11/2003 | Ramaswami et al. |
| 6,731,832 B2 | 5/2004 | Alvarez et al. |
| 6,738,825 B1 | 5/2004 | Bortolotto et al. |
| 6,792,174 B1 | 9/2004 | Ramaswami |
| 2002/0004828 A1 | 1/2002 | Davis et al. |
| 2002/0103921 A1 | 8/2002 | Nair et al. |
| 2002/0109877 A1 | 8/2002 | Funk |
| 2002/0165962 A1 | 11/2002 | Alvarez et al. |
| 2002/0174207 A1 | 11/2002 | Battou |
| 2002/0176131 A1 | 11/2002 | Walters et al. |
| 2003/0023709 A1 | 1/2003 | Alvarez et al. |
| 2003/0091267 A1 | 5/2003 | Alvarez et al. |
| 2003/0163555 A1 | 8/2003 | Battou et al. |
| 2005/0089027 A1 | 4/2005 | Colton |

OTHER PUBLICATIONS

P. Heywood, ed., "The Optical Future", Light Reading, Mar. 29, 2000, printed from www.lightreading.com on Nov. 9, 2000.

C. Wolter, "Optical 'Access' Rides The Waves", Jun. 2000, printed from www.x-changemag.com/articles/061spot.html on Nov. 22, 2000.

D. Iler, Ed., "Mirrors, Bubbles Lead Race To Pure Optical Switching", Sep. 2000, printed from www.cedmagazine.com/ced/009/9003.htm on Nov. 9, 2000.

International Search Report, dated Sep. 17, 2003, issued by the U.S. Patent and Trademark Office, for International Patent Application No. PCT/US02/05826 (4 pages).

* cited by examiner

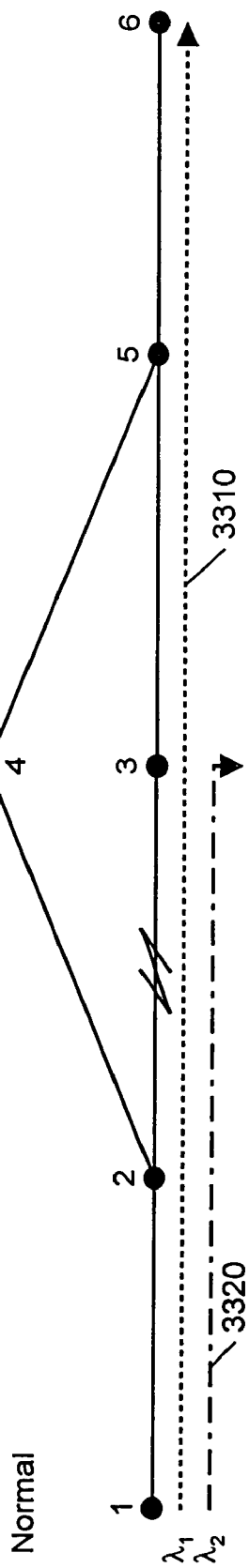
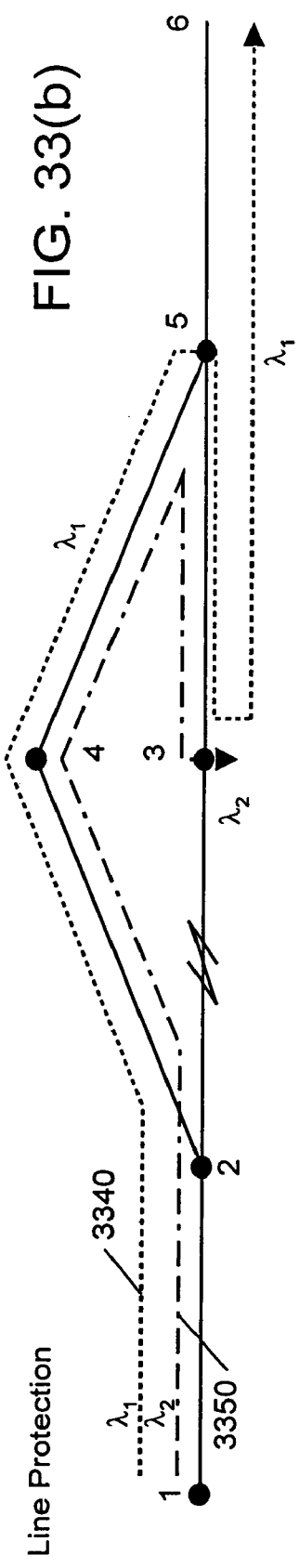
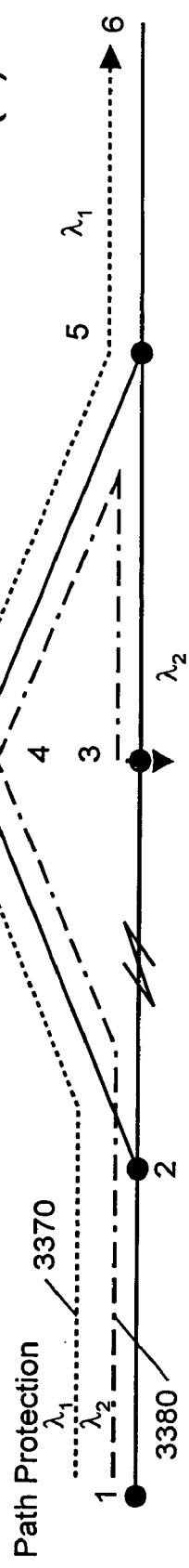

NODE ARCHITECTURE FOR MODULARIZED AND RECONFIGURABLE OPTICAL NETWORKS, AND METHODS AND APPARATUS THEREFOR

FIELD OF THE INVENTION

The present invention relates to an optical communications network and, more particularly, to an all-optical switching system for use at nodes in such a network, and to a control architecture for such a network.

BACKGROUND OF THE INVENTION

Fiber optic and laser technology have enabled the communication of data at ever-higher rates. The use of optical signals has been particularly suitable for use over long haul links. Moreover, recently there has been a push to integrate optical signals into metro core and other networks. Conventional approaches use switches (i.e., network nodes) that receive an optical signal, convert it to the electrical domain for switching, then convert the switched electrical signal back to the optical domain for communication to the next switch. Moreover, while some all-optical switches have been developed that avoid the need for O-E-O conversion, they possess many limitations, such as their being time consuming and difficult to configure or re-configure.

Additionally, conventional network infrastructures have other disadvantages, such as inflexibility, inefficient bandwidth utilization, fixed bandwidth connections, and hardware that provide overlapping functions.

SUMMARY OF THE INVENTION

It is an object of the invention to provide an all-optical switch that can be selectively configured to provide cross-connection and add/drop multiplexing functions.

It is an object of the invention to provide an all-optical switch for use in an optical network that interfaces with access networks, including Gigabit Ethernet over fiber networks, SONET OC-n networks, and others. It is an object of the invention to provide wavelength conversion at such an interface for wavelengths of such access networks that are not compliant with the optical network.

The invention utilizes particular decompositions of a node's optical switching hardware in achieving these and other aspects of the invention. A node of an optical network in accordance with the present invention is also referred to as an optical transport switching system (or simply an "OTS").

In one aspect of the invention, a node includes an optical access ingress subsystem, an optical access egress subsystem a transport ingress subsystem, a transport egress subsystem, and an optical switch subsystem. The optical switch subsystem selectively provides optical coupling between (a) the transport egress subsystem and at least one of (a)(1) the optical access ingress subsystem and (a)(2) the transport ingress subsystem, and between (b) the transport ingress subsystem and at least one of one of (b)(1) the optical access egress subsystem, and (b)(2) the transport egress subsystem.

In another aspect of the invention, a node includes a chassis having a plurality of receiving locations, where at least some of the receiving locations are adapted to receive optical circuit cards. Moreover, an optical backplane is associated with the chassis for providing selective optical coupling between the optical circuit cards, and a local area network enables control and monitoring of the optical circuit cards by a central controller.

BRIEF DESCRIPTION OF THE DRAWINGS

The invention is illustrated in the figures of the accompanying drawings, which are meant to be exemplary, and not limiting, in which like references are intended to refer to like or corresponding structures, and in which:

FIGS. 33(a)–(c) illustrate a normal data flow, a data flow with line protection, and a data flow with path protection, respectively, in accordance with the present invention;

DETAILED DESCRIPTION OF THE PREFERRED EMBODIMENTS

Embodiments of the present invention will now be described in detail with reference to the accompanying figures.

A Glossary is provided at the end of the following description, wherein certain terms and acronyms are defined.

1. OTS Overview

The present invention provides for an all optical configurable switch (i.e., network node or OTS) that can operate as an optical cross-connect (OXC) (also referred to as a wavelength cross-connect, or WXC), which switches individual wavelengths, and/or an optical add/drop multiplexer (OADM). The switch is typically utilized with a Network Management System also discussed herein.

As an all-optical switching system, the switch of the present invention operates independently of bit rates and protocols. Typically, the all-optical switching, between inputs and outputs of the OTS, is achieved through the use of Micro-Electro-Mechanical System (MEMS) technology. Moreover, this optical switch offers an on-demand λ switching capability to support, e.g., either SONET ring based or mesh configurations.

The OTS also provides the capability to achieve an optimized network architecture since multiple topologies, such as ring and mesh, can be supported. Thus, the service provider can tailor its network design to best meet its traffic requirements. The OTS also enables flexible access interconnection supporting SONET circuits, Gigabit Ethernet (GbE) (IEEE 802.3z), conversion from non-ITU compliant optical wavelengths, and ITU-compliant wavelength connectivity. With these interfaces, the service provider is able to support a broad variety of protocols and data rates and ultimately provide IP services directly over DWDM without SONET equipment. The OTS further enables a scalable equipment architecture that is provided by a small form factor and modular design such that the service provider can minimize its floor space and power requirements needs and thereby incrementally expand its network within the same footprint.

Figure 1:
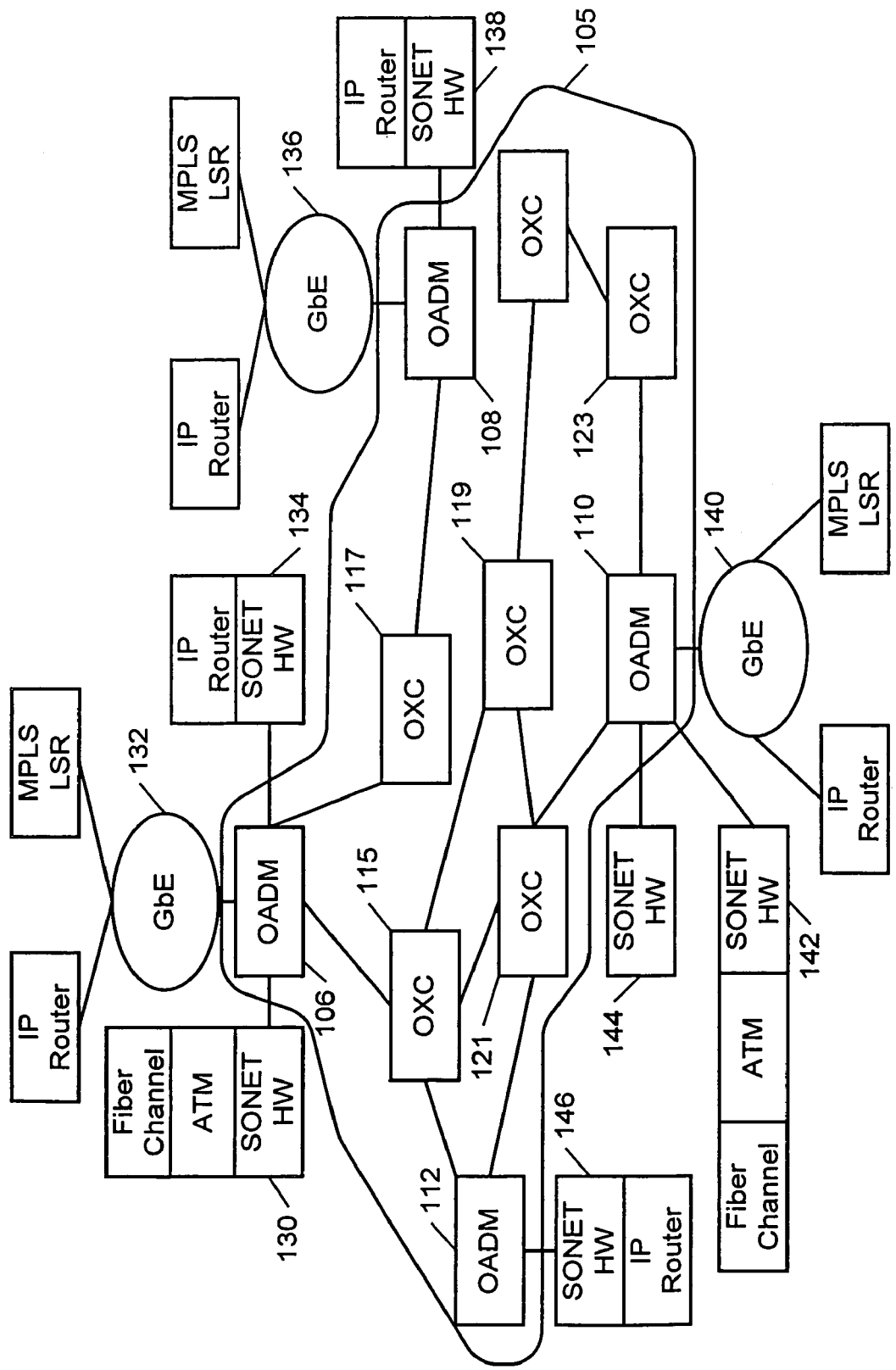
FIG. 1 illustrates an all-optical network architecture in accordance with the present invention.

FIG. 1 illustrates an all-optical "metro core" network architecture that utilizes the present invention in accordance with a variety of configurations.

OTS equipment is shown within the optical network boundary 105, and is designed for deployment both at the edges of a metro core network (when operating as an OADM), and internally to a metro core network (when operating as an OXC). For example, the OTSs at the edge of the network include OADMs 106, 108, 110 and 112, and the OTSs internal to the network include WXCs 115, 117, 119, 121 and 123. Each OTS is a node of the network.

External devices such as SONET and GbE equipment may be connected directly to the optical network 105 via the edge OTSs. For example, SONET equipment 130 and 134, and GbE equipment 132 connect to the network 105 via the OADM 106. GbE 136 and SONET 138 equipment connect to the network via OADM 108. GbE 140 and SONET equipment 142 and 144 connect to the network via OADM 110. SONET equipment 146 connects to the network via OADM 112. The network architecture may also support other network protocols as indicated, such as IP, MPLS, ATM, and Fibre Channel operating over the SONET and GbE interfaces.

Figure 2:
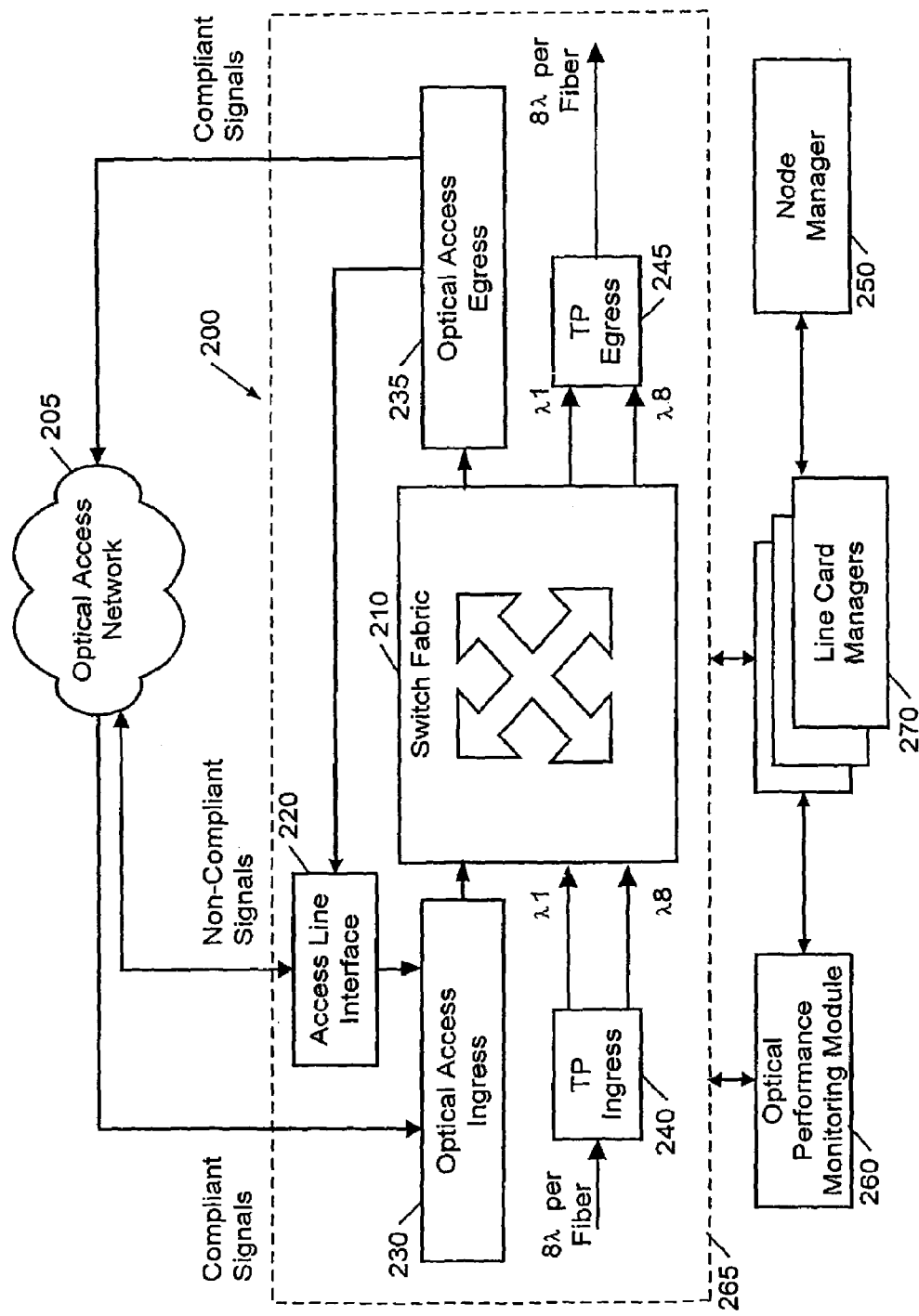
FIG. 2 illustrates a logical node architecture in accordance with the present invention.

FIG. 2 depicts a logical node architecture 200, which includes an Optical Switch Fabric 210, Access Line Interface 220, Optical Access Ingress 230, Optical Access Egress 235, Transport Ingress 240, and Transport Egress 245 functions. These functions (described below) are implemented on respective line cards, also referred to as optical circuit cards or circuit packs or packages, that are receivable or deployed in a common chassis. Moreover, multiple line cards of the same type may be used at an OTS to provide scalability as the bandwidth needs of the OTS grow over time.

A Node Manager 250 and Optical Performance Monitoring (OPM) module 260 may also be implemented on respective line cards in the chassis. Node Manager 250 typically communicates with the rest of the OTS 200 through a 100 BaseT Ethernet internal LAN distributed to every line card and module and terminated by the Line Card Manager module 270 residing on every line card. Alternatively, a selectable 10/100 BaseT connection may be used. OPM 260 is responsible for monitoring optical hardware of OTS 200, and typically communicates its findings to the Node Manager 250 via the internal LAN and the OPM's LCM. The Node manager may process this performance information to determine whether the hardware is functioning properly. In particular, based on the OPM information, the Node Manager may apply control signals to the line cards, switchover to backup components on the line cards or to backup line cards, set alarms for the NMS, or take other appropriate action.

Each of the line cards, including the OPM 260 and the line cards that carry the optical signals in the network, shown within the dashed line 265, are controlled by respective LCMs 270. The Node Manager 250 may control the line cards, and receive data from the line cards, via the LCMs 270.

Being interfaced to all other cards of the OTS 200 via the internal LAN and LCMs, the Node Manager 250 is responsible for the overall management and operation of the OTS 200 including signaling, routing, and fault protection. The responsibility for telemetry of all control and status information is delegated to the LCMs. There are also certain local functions that are completely abstracted away from the Node Manager and handled solely by the LCMs, such as laser failsafe protection. Whenever a light path is created between OTSs, the Node Manager 250 of each OTS performs the necessary signaling, routing and switch configuration to set up the path. The Node Manager 250 also continuously monitors switch and network status such that fault conditions can be detected, isolated, and repaired. The OPM 260 may be used in this regard to detect a loss of signal or poor quality signal, or to measure signal parameters such as power, at any of the line cards using appropriate optical taps and processing circuitry. Three levels of fault recovery may be supported: (1) Component Switchover—replacement of failed switch components with backup, (2) Line Protection—rerouting of all light paths around a failed link; and (3) Path Protection—rerouting of individual light paths affected by a link or node failure. Component Switchover is preferably implemented within microseconds, while Line Protection is preferably implemented within milli-seconds of failure, and Path Restoration may take several seconds.

The all-optical switch fabric 210 is preferably implemented using MEMS technology. However, other optical switching components may be used, such as lithium niobate modules, liquid crystals, bubbles and thermo-optical switching technologies. MEMS have arrays of tiny mirrors that are aimed in response to an electrostatic control signal. By aiming the mirrors, any optical signal from an input fiber (e.g., of a transport ingress or optical access ingress line card) can be routed to any output fiber (e.g., of a transport egress or optical access egress line card).

The Optical Access Network 205 may support various voice and data services, including switched services such as telephony, ISDN, interactive video, Internet access, videoconferencing and business services, as well as multicast services such as video. Service provider equipment in the Optical Access Network 205 can access the OTS 200 in two primary ways. Specifically, if the service provider equipment operates with wavelengths that are supported by the OTS 200 of the optical network, such as selected OC-n ITU-compliant wavelengths, it can directly interface with the Optical Access (OA) ingress module 230 and egress module 235. Alternatively, if the service provider equipment is using a non-compliant wavelength, e.g., in the 1310 nm range, or GbE (or 10 GbE), then it accesses the OTS 200 via an ALI card 220. Advantageously, since a GbE network can be directly bridged to the OTS without a SONET Add/Drop Multiplexer (ADM) and a SONET/SDH terminal, this relatively more expensive equipment is not required, so service provider costs are reduced. That is, typically, legacy electronic infrastructure equipment is required to connect with a SONET terminator and add-drop multiplexer (ADM). In contrast, these functions are integrated in the OTS of the present invention, resulting in good cost benefits and a simpler network design. In other words, because the GbE physical layer is a substitute for the SONET physical layer, and because there is no reason to stack two physical layers, the SONET equipment would be redundant. Table 1 summarizes the access card interface parameters associated with each type of OA and ALI card, in some possible implementations.

TABLE 1

| Protocol | Data Rate | Card Type | External Ports | Internal Ports |
|---|---|---|---|---|
| ITU-Compliant SONET | OC-12 | OA | 8 OC-12 | 8 OC-12 |
| | OC-48 | OA | 8 OC-48 | 8 OC-48 |
| | OC-192 | OA | 8 OC-192 | 8 OC-192 |
| Non-Compliant SONET | OC-12 | ALI | 8 OC12 Input | 2 OC48 Output |
| | | | 8 OC12 Output | 2 OC48 Input |
| | OC-48 | ALI | 8 OC48 Input | 2 OC192 Output |
| | | | 8 OC48 Output | 2 OC192 Input |
| | OC-192 | ALI | 2 OC192 Input | 2 OC192 Output |
| | | | 2 OC192 Output | 2 OC192 Input |
| Gigabit Ethernet | 1 Gbps | ALI | 8 GbE Input | 2 OC48 Output |
| | | | 8 GbE Output | 2 OC48 Input |

The OTS can interface with all existing physical and data-link layer domains (e.g., ATM, IP router, Frame relay, TDM, and SONET/SDH/STM systems) so that legacy router and ATM systems can connect to the OTS. The OTS solution also provides the new demand services, e.g., audio/video on demand, with cost-effective bandwidth and efficient bandwidth utilization.

The OTS 200 can be configured, e.g., for metro and long haul configurations. In one possible implementation, the OTS can be deployed in up to four-fiber rings, up to four fiber OADMs, or four fiber point-to-point connections. Each OTS can be set to add/drop any wavelength with the maximum of sixty-four channels of local connections.

2. Hardware Architecture

Figure 3:
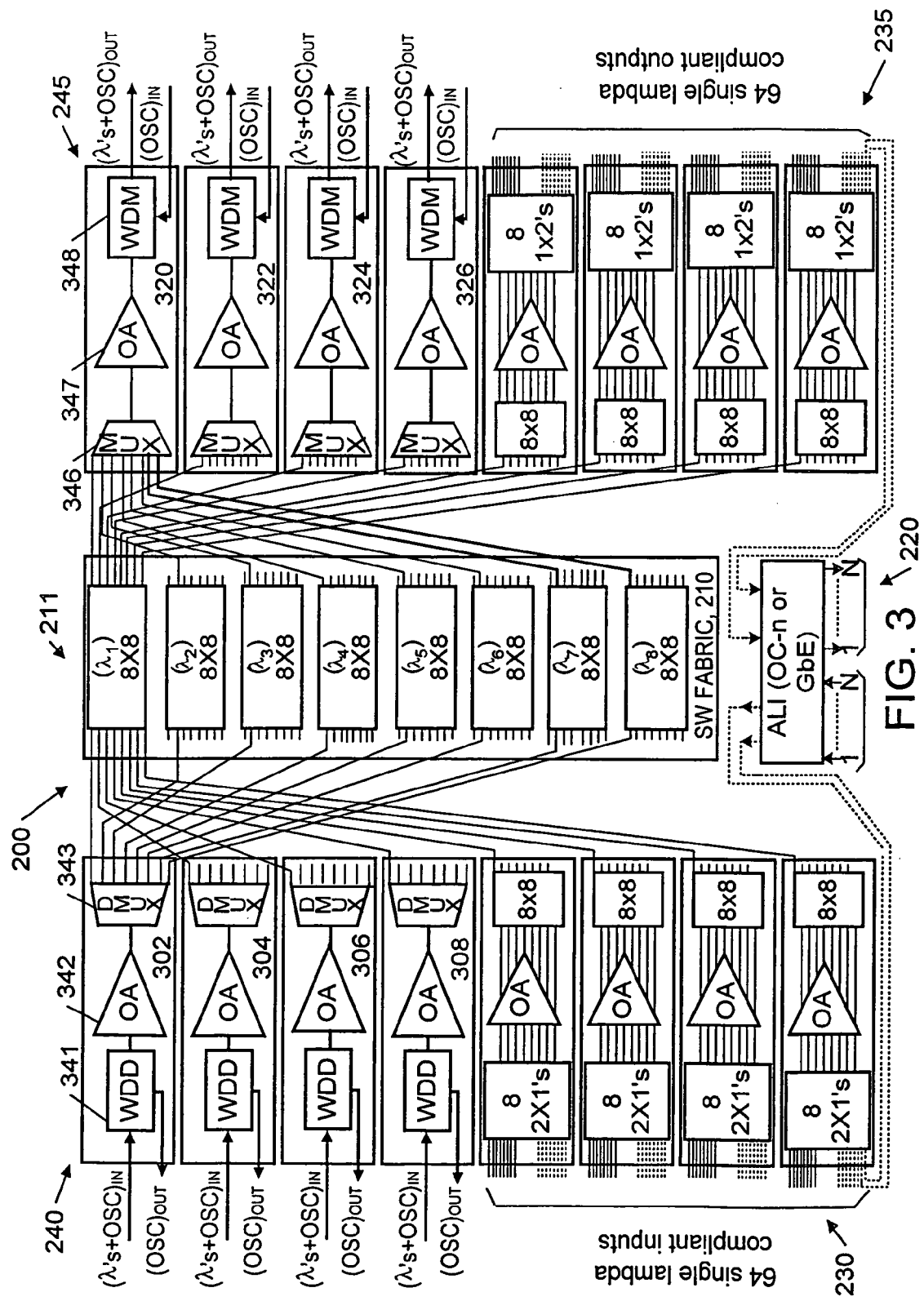
FIG. 3 illustrates an optical transport switching system hardware architecture in accordance with the present invention.

FIG. 3 illustrates an OTS hardware architecture in accordance with the present invention. The all-optical switch fabric 210 may include eight 8×8 switch elements, the group of eight being indicated collectively as 211. Each of the eight switch elements is responsible for switching an optical signal from each of eight sources to any one of eight outputs.

Generally, selected outputs of the TP ingress cards 240 and OA ingress cards 230 are optically coupled by the switching fabric cards 210 to selected inputs of the TP egress cards 245 and/or OA egress cards 235. The optical coupling between cards and the fabric occurs via an optical backplane, which may comprise optical fibers. Preferably, the cards are optically coupled to the optical backplane when they are inserted into their slots in the OTS bay such that the cards can be easily removed and replaced. For example, MTP™-type connectors (Fiber Connections, Inc.) may be used. This allows easy troubleshooting and upgrading of cards. Moreover, each line card may connect to an RJ-45 connector when inserted into their slots.

Moreover, each TP ingress and OA ingress card has appropriate optical outputs for providing optical coupling to inputs of the switch fabric via the optical backplane. Similarly, each TP egress and OA egress card has appropriate optical inputs for providing optical coupling to outputs of the switch fabric via the optical backplane. With appropriate control signals, the switching fabric is controlled to optically couple selected inputs and outputs of the switch fabric card, thereby providing selective optical coupling between outputs of the TP ingress and OA ingress cards, and the inputs of the TP egress and OA egress cards. As a result, the optical signals carried by the outputs of TP ingress and OA ingress cards can be selectively switched (optically coupled) to the inputs of the TP egress and OA egress cards.

In the example configuration shown in FIG. 3, the transport ingress module 240 includes four cards 302, 304, 306 and 308, each of which includes a wavelength division demultiplexer (WDD), an example of which is the WDD 341, for recovering the OSC, which may be provided as an out-of-band signal with the eight multiplexed data signals (λ's).

An optical amplifier (OA), an example of which is the OA 342, amplifies the optical transport signal multiplex, and a demux, an example of which is the demux 343, separates out each individual wavelength (optical transport signal) in the multiplex. Each individual wavelength is provided to the switch fabric 210 via the optical backplane, then switched by one of the modules 211 thereat. The outputs of the switch fabric 210 are provided to the optical backplane, then received by either a mux, an example of which is the mux 346, of one of the transport egress cards 320, 322, 324 or 326, or an 8×8 switch of one of the OA egress cards 235. At each of the TP egress cards, the multiplexer output is amplified at the associated OA, and the input OSC is multiplexed with data signals via the WDM. The multiplexer output at the WDM can then be routed to another OTS via an optical link in the network. At the OA egress cards 235, each received signal is amplified and then split at 1×2 dividers/splitters to provide corresponding outputs either to the faceplate of the OA egress cards for compliant wavelengths, or to the ALI cards via the optical backplane for non-compliant wavelengths. Note that only example light paths are shown in FIG. 3, and that for clarity, all possible light paths are not depicted.

The ALI cards perform wavelength conversion for interfacing with access networks that use optical signals that are non-compliant with the OTS. As an example, the ALI card receives non-compliant wavelength signals, converts them to electrical signals, multiplexes them, and generates a compliant wavelength signal. Two optical signals that are output from the ALI card 220 are shown as inputs to one of the OA_In cards 230 to be transmitted by the optical network, and two optical signals that are output from one of the OA_Eg cards 235 are provided as inputs to the ALI cards 220. N total inputs and outputs (e.g., N=4, two inputs and two outputs) may be input to, or output from, the ALI cards 220.

The OSC recovered at the TP ingress cards, namely $OSC_{OUT}$, is processed by the Optical Signaling Module (OSM) of the OTS using an O-E conversion. The OSM generates a signaling packet that contains signaling and route information, and passes it on to the Node Manager. The OSM is discussed further below, particularly in conjunction with FIG. 9. If the OSC is intended for use by another OTS, it is re-generated by the OSM for communication to another OTS and transmitted via, e.g., $OSC_{IN}$. Or, if the OSC is intended for use only by the present OTS, there is no need to relay it to a further node. Alternatively, $OSC_{IN}$ could also represent a communication that originated from the present OTS and is intended for receipt, e.g., by another node. For a group of nodes operating under the control of an NMS, typically only one of the nodes acts as a gateway to the shared NMS. The other nodes of the group communicate with the NMS via the gateway node and communication by the other nodes with their gateway node is typically also accomplished via the OSC.

Figure 4:
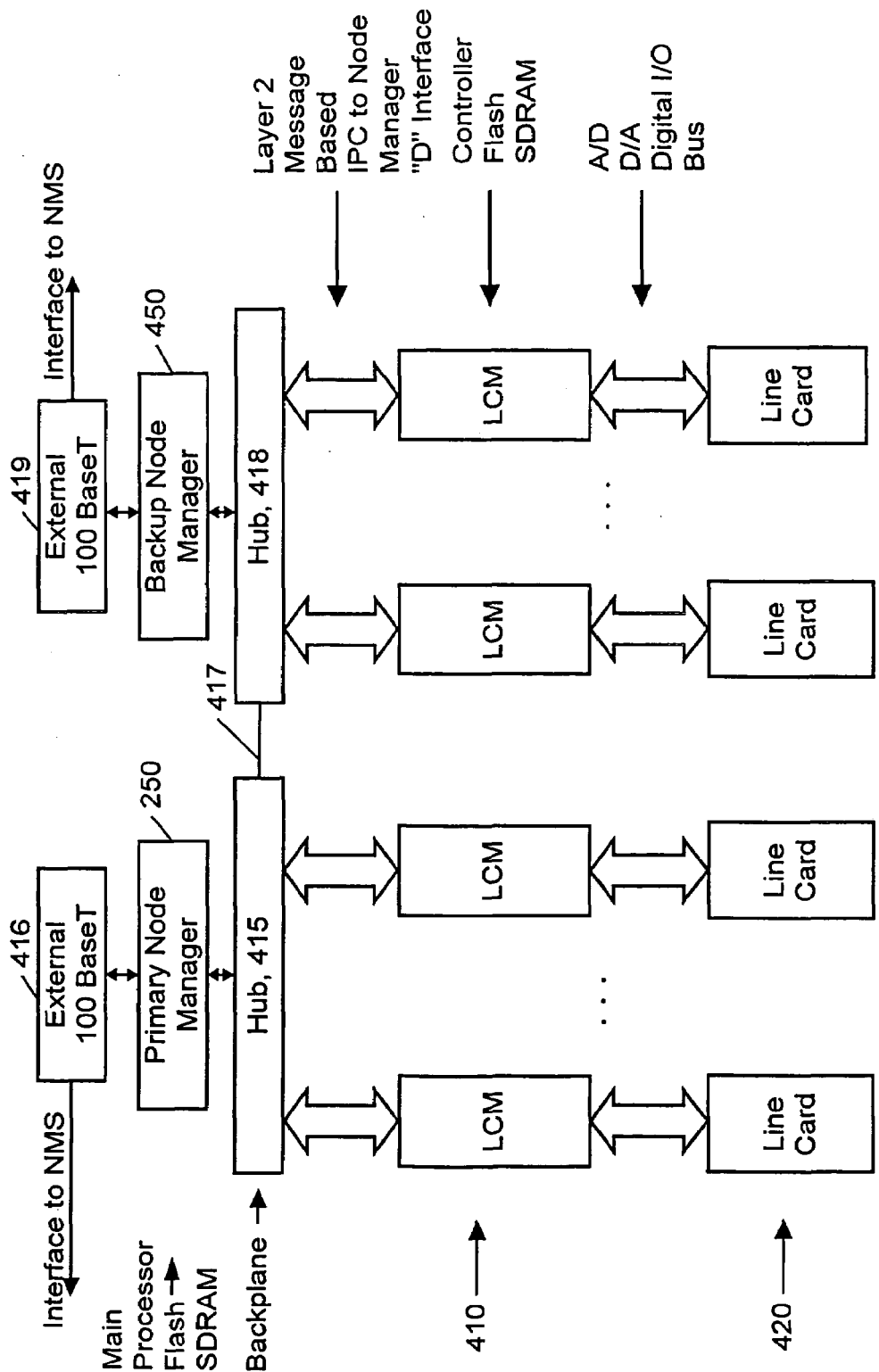
FIG. 4 illustrates a control architecture for an OTS in accordance with the present invention.

FIG. 4 illustrates a control architecture for an OTS in accordance with the present invention. The OTS implements the lower two tiers of the above described three-tier control architecture typically without a traditional electrical backplane or shelf controller. Moreover, the OTS has a distributed architecture, which results in maximum system reliability and stability. The OTS does not use a parallel backplane bus such as Compact PCI or VME bus because they represent a single point of failure risk, and too much demand on one shared element is a performance risk. Instead, the invention preferably provides a distributed architecture wherein each line card of the OTS is outfitted with at least one embedded controller referred to as a LCM on at least one daughter board, with the daughter boards communicating with the node's single Node Manager via a LAN technology such as 100 BaseT Ethernet and Core Embedded Control Software.

In particular, the LCM may use Ethernet layer 2 (L2) datagrams for communication with the Node Manager, with the Node Manager being the highest-level processor within an individual OTS. The Node Manager and all OTS line cards plug into a 100 BaseT port on one or more hubs via RJ-45 connectors to allow electronic signaling between LCMs and the Node Manager via an internal LAN at the OTS. In a particular embodiment, two twenty-four port hubs are provided to control two shelves of line cards in an OTS bay, and the different hubs are connected by crossover cables. For example, FIG. 4 depicts LCMs 410 and associated line cards 420 as connected to hubs 415 and 418, which may be 24-port 100 BaseT hubs. The line cards may perform various functions as discussed, including Gigabit Ethernet interface (a type of ALI card), SONET interface (a type of ALI card), TP ingress, TP egress, optical access ingress, optical access egress, switching fabric, optical signaling, and optical performance monitoring.

Moreover, while only one Node Manager is required, the primary Node Manager 250 can be provided with a backup Node Manager 450 for redundancy. Each Node Manager has access to the non-volatile data on the LCMs which help in reconstructing the state of the failed node manager. The backup Node Manager gets copies of the primary node manager non-volatile store, and listens to all traffic (e.g., messages from the LCMs and the primary Node Manager) on all hubs in the OTS to determine if the primary has failed. Various schemes may be employed for determining if the primary Node Manager is not functioning properly, e.g., by determining whether the primary Node Manager 250 responds to a message from an LCM within a specified amount of time.

In particular, the hubs 415 and 418 are connected to one another via a crossover 417 and additional hubs may also be connected in this manner. See also FIG. 8. In terms of the OTS bay, every shelf connects to a 100 BaseT hub. This use of an Ethernet backplane provides both hot-swappability of line cards (i.e., removal and insertion of line cards into the OTS bay when optical and/or electrical connections are active), and totally redundant connections between the line cards and both Node Managers. Moreover, if the node is a gateway, its primary Node Manager communicates with the NMS, e.g., via a protocol such as SNMP, using 100 BaseT ports 416, 419. Alternatively, selectable 10/100 BaseT may be used. RJ-45 connectors on the faceplate of the Node Manager circuit pack may be used for this purpose.

The Node Manager and Line Card Manager are described further, below.

3. Node Manager Module

Figure 5:
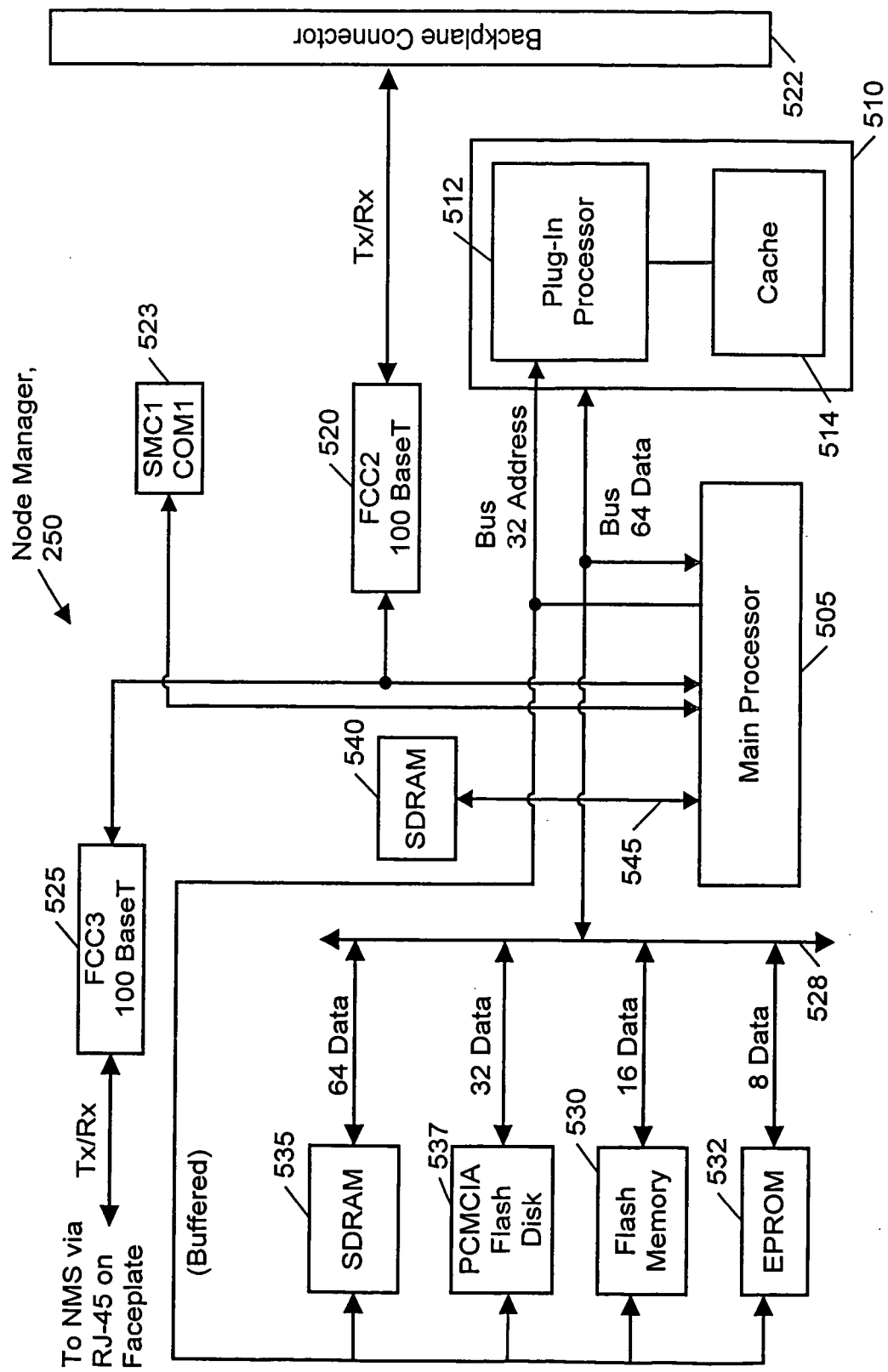
FIG. 5 illustrates a single Node Manager architecture in accordance with the present invention.

FIG. 5 illustrates a single Node Manager architecture 250 in accordance with the present invention. An OTS with primary and backup Node Managers would have two of the architectures 250.

The Node Manager executes all application software at the OTS, including network management, signaling, routing, and fault protection functions, as well as other features.

As discussed above, each Node Manager circuit pack has a 100 BaseT network connection to a backplane hub that becomes the shared medium for each LCM in the OTS. Additionally, for a gateway OTS node, another 100 BaseT interface to a faceplate is provided for external network access.

The Node Manager Core Embedded Software performs a variety of functions, including: i) issuing commands to the LCMs, ii) configuring the LCMs with software, parameter thresholds or other data, iii) reporting alarms, faults or other events to the NMS, and iv) aggregating the information from the LCMs into a node-wide view that is made available to applications software at the Node Manager. This node-wide view, as well as the complete software for each LCM controller, are stored in flash memory 530. The node- or switch-wide view may provide information regarding the status of each component of the switch, and may include, e.g., performance information, configuration information, software provisioning information, switch fabric connection status, presence of alarms, and so forth. Since the node's state and the LCM software are stored locally to the node, the Node Manager can rapidly restore a swapped line card to the needed configuration without requiring a remote software download, e.g., from the NMS.

The Node Manager is also responsible for node-to-node communications processing. All signaling messages bound for a specific OTS are sent to the Node Manager by that OTS's optical signaling module. The OSM, which has an associated LCM, receives the OSC wavelength from the Transport Ingress module. The incoming OSC signal is converted from optical to electrical, and received as packets by the OSM. The packets are sent to the Node Manager for proper signaling setup within the system. On the output side, out-going signaling messages are packetized and converted into an optical signal of, e.g., 1310 nm or 1510 nm, by the OSM, and sent to the Transport Egress module for transmission to the next-hop OTS. The Node Manager configures the networking capabilities of the OSM, e.g., by providing the OSM with appropriate software for implementing a desired network communication protocol.

The Node Manager may receive remote software downloads from the NMS to provision itself and the LCMs. The Node Manager distributes each LCM's software via the OTS's internal LAN, which is preferably a shared medium LAN. Each LCM may be provisioned with only the software it needs for managing the associated line card type. Or, each LCM may be provisioned with multi-purpose software for handling any type of line card, where the appropriate software and/or control algorithms are invoked after an LCM identifies the line card type it is controlling (e.g., based on the LCM querying its line card or identifying its slot location in the bay).

In one possible implementation, the Node Manager uses a main processor 505, such as the 200 MHz MPC 8255 or MPC8260 (Motorola PowerPC microprocessor, available from Motorola Corp., Schaumburg, Illinois), with an optional plug-in module 510 for a higher power plug-in processor 512, which may be a RISC CPU such as the 400 MHz MPC755. These processors 505, 510 simultaneously support Fast Ethernet, 155 Mbps ATM and 256 HDLC channels. However, the invention is not limited to use with any particular model of microprocessor. Moreover, while the plug-in module 510 is optional, it is intended to provide for a longer useful life for the Node Manager circuit pack by allowing the processor to be upgraded without changing the rest of the circuit pack.

The Node Manager architecture is intended to be flexible in order to meet a variety of needs, such as being a gateway and/or OTS controller. The architecture is typically provided with a communications module front end that has two Ethernet interfaces: 1) the FCC2 channel 520, which is a 100 BaseT to service the internal 100 BaseT Ethernet hub on the backplane 522, and, for gateway nodes, 2) the FCC3 channel 525, which is a 100 BaseT port to service the NMS interface to the outside. The flash memory 530 may be 128 MB organized in a×16 array, such that it appears as the least significant sixteen data bits on the bus 528. See the section entitled "Flash Memory Architecture" for further information regarding the flash memory 530.

The bus 528 may be an address and data bus, such as Motorola's PowerPC 60x. The SDRAM 535 may be 256 MB organized by sixty-four data bits. An EPROM 532 may store start up instructions that are loaded into the processor 505 or 512 via the bus 528 during an initialization or reset of the Node Manager. A PCMCIA Flash disk 537 also communicates with the bus 528, and is used for persistent storage, e.g., for storing long term trend data and the like from monitored parameters of the line cards. A warning light may be used so that the Flash disk is not inadvertently removed while data is being written to it. Preferably, to prevent tampering, the non-volatile memory resources, such as the Flash disk, are designed so that they cannot be removed while the Node Manager card is installed on the OTS backplane.

Additionally, there is a SDRAM 540 (e.g., having 4 MB) on the local bus 545, which is used to buffer packets received on the communications module front-end of the main processor 505. The local bus 545 may carry eighteen address bits and thirty-two data bits.

Flexibility is promoted if the core microprocessor (such as is possible with Motorola's PowerPC 603e core inside the MPC8260) 505 can be disabled, and the plug-in processor 512 can be installed on the bus 528. Such plug-in processor 512 can be further assisted with an L2 backside cache 514, e.g., having 256 KB. It is expected that a plug-in processor can be used to increase the performance of the Node Manager 505 by more than double. As an example, the plug-in processor 512 may be any future type of RISC processor that operates on the 60x bus. The processor 505 yields the bus to, and may also align its peripherals to, the more powerful plug-in processor 512. In addition to providing a general purpose path for upgradability of the Node Manager, the plug-in processor is also useful, e.g., for the specific situation where the OTS has had line cards added to it and the main processor 505 is therefore no longer able to manage its LCMs at a rate compatible with the desired performance characteristics of the optical networking system.

A serial port 523 for debugging may also be created.

In summary, the Node Manager provides NMS interface and local node management, as well as providing signaling, routing and fault protection functions (all using the Node Manager's application software), provides real-time LCM provisioning, receives monitored parameters and alarms/faults from each LCM, aggregates monitored parameters and alarms/faults from each line card into a node-wide view, processes node-to-node communication messages, provides remote software download capability, distributes new software to all LCMs, is expandable to utilize a more powerful CPU (through plug-in processor 512), such as of RISC design, is built on a Real-Time Operating System (RTOS), provides intra-OTS networking support (e.g., LAN connectivity to LCMs), and provides node-to-node networking support.

4. Line Card Manager Module

Figure 6:
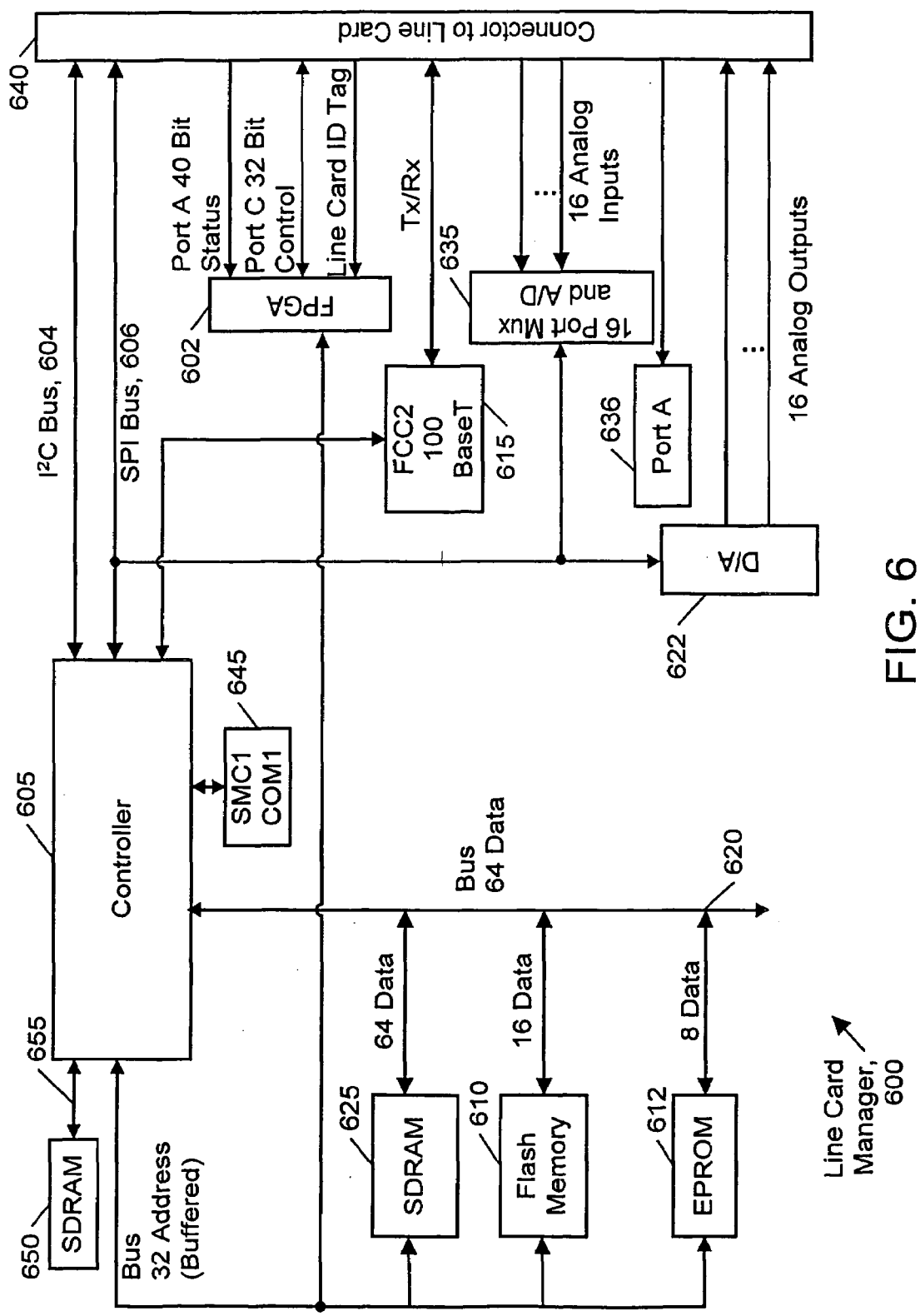
FIG. 6 illustrates a Line Card Manager architecture in accordance with the present invention.

FIG. 6 illustrates a Line Card Manager architecture 600 in accordance with the present invention. As discussed above, the LCM modules may be provided as daughter boards/plug-in modules that plug into the respective line cards to control each line card in the OTS. The LCMs offload local processing tasks from the Node Manager and provide continued line card support without any interruptions in the event the Node Manager fails (assuming no backup is available, or the backup has also failed), or the communication path to the Node Manager is not available. That is, even if the control path is lost, the user data paths are still active. The line card state and data are stored until the Node Manager is back in service. This is made possible by the loosely coupled distributed architecture which allows the LCM to act independently of the Node Manager whenever necessitated by failure of the Node Manager. The parameters which keep the line card active are kept locally on the LCM, thus allowing the line card to act independently of the Node Manager for a time. The Node Manager can be replaced while the OTS continues to function.

The line cards which an LCM 600 may control include any of the following: switch fabric, TP_IN, TP_EG, OA_IN, OA_EG, OSM, OPM, or ALI cards (acronyms defined in Glossary).

The LCM daughter board is built around an embedded controller/processor 605, and contains both digital and analog control and monitoring hardware. LCMs typically communicate with the Node Manager via the OTS internal LAN. The LCM receives commands from the Node Manager, such as for configuring the line cards, and executes the commands via digital and analog control signals that are applied to the associated line card. The LCM gathers from its line card digital and analog feedback and monitored parameter values, and may periodically send this information to the Node Manager, e.g., if requested by the Node Manager. The LCM also passes events such as faults/alarms and alerts to the Node Manager as they occur. These values and all provisioning data are kept in an in-memory snapshot of the line card status.

Preferably, the LCM stores this snapshot and a copy of the software that is currently running the LCM in its non-volatile (e.g., flash) memory 610 to allow rapid rebooting of the LCM. Specifically, when the LCM powers up, it loads the software from the non-volatile memory 610 into SDRAM 625, and then begins to execute. This avoids the need for the LCM to download the software from the Node Manager via the OTS internal LAN each time it starts up, which saves time and avoids unnecessary traffic on the internal OTS LAN. The software logic for all line cards is preferably contained in one discrete software load which has the ability to configure itself based on the identity of the attached line card as disclosed during the discovery phase of LCM initialization. The type of line card may be stored on an EEPROM on the line card. The LCM queries the EEPROM through the I²C bus to obtain the identifier.

See the section entitled "Flash Memory Architecture" for further information regarding the flash memory 610.

The LCM can also receive new software from the Node Manager via the OTS internal LAN and store it in the flash memory 610. It is desirable to have sufficient non-volatile memory at the LCM to store two copies of the software, i.e., a current copy and a backup copy. In this way, a new software version, e.g., that provides new features, could be stored at the LCM and tested to see if it worked properly. If not, the backup copy (rollback version) of the previous software version could be used.

The Node Manager delegates most of the workload for monitoring and controlling the individual line cards to each line card's local LCM. This reduces the central point of failure threat posed by a centralized architecture, increasing the probability that the optical network can keep functioning, even if levels of control above the LCM (i.e., the Node Manager or NMS) were to suffer a failure. Distributed architectures also scale better since, as each line card is added, at least one dedicated processor daughter board (i.e., the LCM) is added to control it. In one possible implementation, the controller 605 is the 200 MHz Motorola MPC8255 or MPC8260. However, the invention is not limited to use with any particular model of microprocessor. The controller 605 may have a built-in communications processor front-end, which includes an Ethernet controller (FCC2) 615 that connects to the Node Manager via the internal switch LAN. In the embodiment shown, this connection is made via the line card using an RJ-45 connector. Other variations are possible.

The flash memory 610 may be 128 MB organized in ×16 mode, such that it appears as the least significant sixteen data bits on the bus 620, which may be Motorola's 60× bus. The SDRAM 625 may be 64 MB organized by sixty-four data bits. An A/D converter 635, such as the AD7891-1 (Analog Devices, Inc., Norwood, Mass.) includes a 16 channel analog multiplexer into a 12 bit A/D converter. A D/A converter 622, which may be an array of four "quad" D/A converters, such as MAX536's (Maxim Integrated Products, Inc., Sunnyvale, Calif.), provides sixteen analog outputs to a connector 640, such as a 240-pin Berg Mega-Array connector (Berg Electronics Connector Systems Ltd, Herts, UK). The LCMs and line cards preferably adhere to a standard footprint connect scheme so that it is known which pins of the connector are to be driven or read. Essentially, a telemetry connection is established between the LCM and the line card via the connector 640.

Advantageously, since the LCM can be easily removed from its line card instead of being designed into the line card, it can be easily swapped with an LCM with enhanced capabilities, e.g., processor speed and memory, for future upgrades.

The LCM daughter board removeably connects to the associated line card via a connector 640. A serial port 645 for debugging may be added. For the MPC8255 or MPC8260, such a serial port 645 may be constructed from port D (SMC1). There is typically a 4 MB SDRAM 650 on the Local Bus 655, which is used to buffer packets received on the communications module front-end of the controller 605. Port A 636 receives a latch signal.

A serial bus known as a Serial Peripheral Interface SPI 606 is specialized for A/D and D/A devices, and is generated by the controller 605. It is a three-wire SPI for transmitted data, received data, and clock data that may be used with the more complicated line cards that have many registers and inputs/outputs. Examples of such more complicated line cards may be the OC-n and GbE ALI cards and the switching fabric line cards. Essentially, the SPI 606 provides an interface that allows a line card to communicate directly with the controller 605. The SPI 606 may carry analog signals to the line card via the D/A 622, or receive analog signals from the line card via the A/D 635.

The FPGA 602 provides a 40-bit status read only register for reading in signals from the line card, and a 32 bit read/write control register for reading/writing of control signals from/to the line card. These registers may be addressed via a GPIO on the connector 640. The FPGA 602 also receives an 8-bit line card ID tag that identifies the location of the line card within the OTS (i.e., slot, shelf and bay) since certain slots are typically reserved for certain line card types. The slot locations are digitally encoded for this purpose. Alternatively, or in addition, the type of line card could be identified directly regardless of the slot, shelf and bay, e.g., by using a serial number or other identifier stored on the line card and accessible to the LCM, e.g., via an I$^2$C bus 604. This bus enables the communication of data between the controller 605 and the connector 640. In particular, the bus 604 may be part of a GPIO that receives information from a line card, including the bay, shelf and slot, that identifies the line card's position at the OTS.

The controller 605 may receive a hard reset signal from the Node Manager, e.g., via the Ethernet controller (FCC2) 615, which clears all registers and performs a cold boot of the system software on the LCM, and a soft reset signal, which performs a warm boot that does not interfere with register contents. The soft reset is preferred for preserving customer cross connect settings.

To fulfill the mission of the Node Manager as an abstraction/aggregation of the LCM primitives, the LCM is preferably not accessible directly from the customer LAN/WAN interfaces.

An EPROM 612, e.g., having 8 KB, may store instructions that are loaded into the processor 605 via the bus 620 during an initialization or reset of the LCM.

The microcontroller 605 typically integrates the following functions: 603e core CPU (with its non-multiplexed 32 bit address bus and bi-directional 64 bit data bus), a number of timers (including watchdog timers), chip selects, interrupt controller, DMA controllers, SDRAM controls, and asynchronous serial ports. The second fast communication channel (FCC2) 100 BaseT Ethernet controller is also integrated into the Communications Processor Module functions of the controller 605. The microcontroller may be configured for 66 Mhz bus operation, 133 Mhz CPM operation, and 200 Mhz 603e core processor operation.

In summary, the line card manager module provides local control for each line card, executes commands received from the Node Manager, provides digital and/or analog control and monitoring of the line card, sends monitored parameters and alarms/faults of the line card to the Node Manager, provides an embedded controller with sufficient processing power to support a RTOS and multi-tasking, and provides Intra-OTS networking support.

5. OTS Configuration

Figure 7:
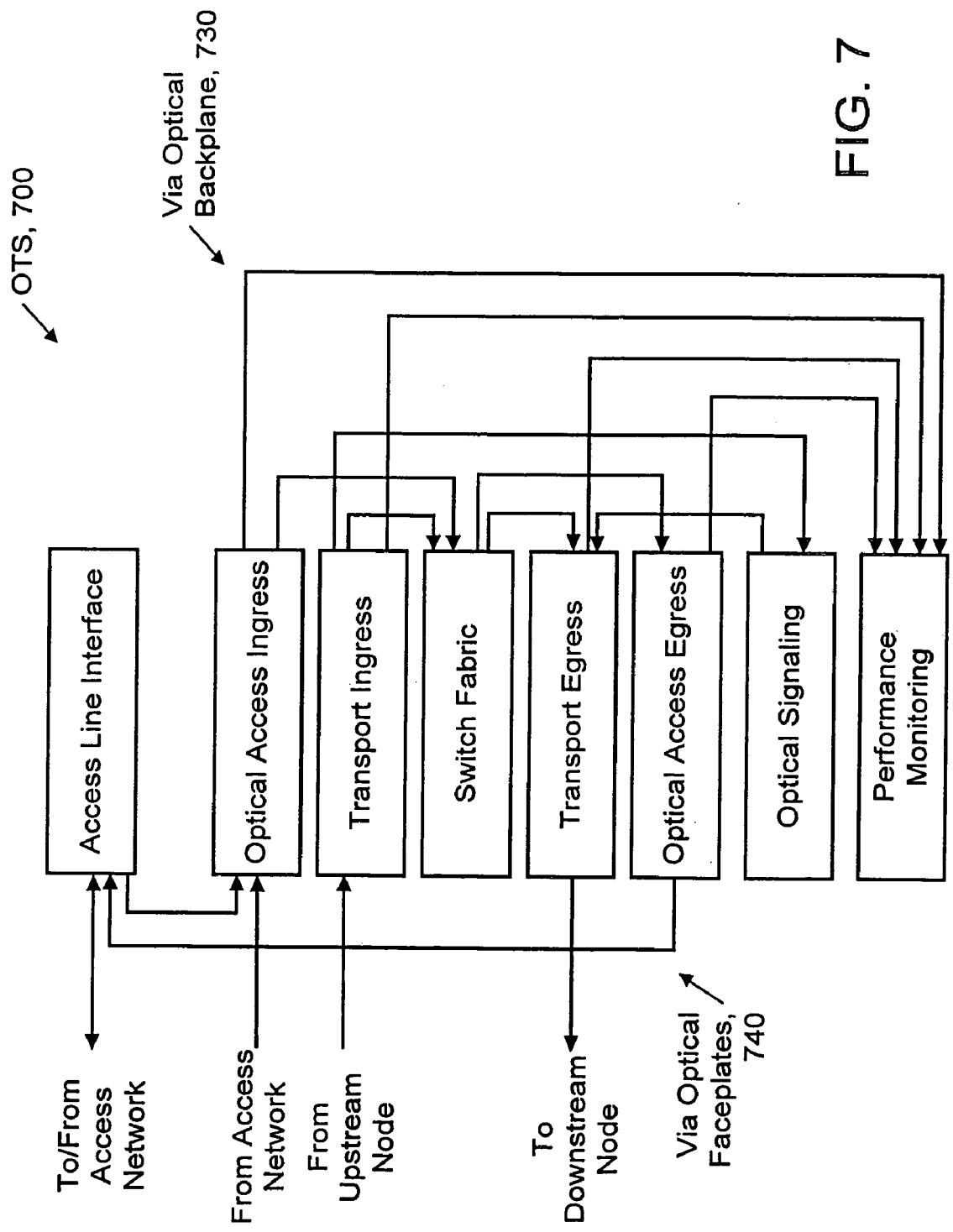
FIG. 7 illustrates an OTS configuration in accordance with the present invention.

FIG. 7 illustrates an OTS configuration in accordance with the present invention.

The OTS 700 includes an optical backplane 730 that uses, e.g., optical fibers to couple optical signals to the different optical circuit cards (line cards). Preferably, specific locations/slots of the chassis are reserved for specific line card types according to the required optical inputs and outputs of the line card. Moreover, the optical backplane 730 includes optical connections to optical links of the optical network, and, optionally, to links of one or more access networks.

Furthermore, while one of each line card type is shown, as noted previously, more than one line card of each type is typically provided in an OTS configuration.

Each of the optical circuit cards (specifically, the LCMs of the cards) also communicates via a LAN with the Node Manager to enable the control and monitoring of the line cards.

The optical inputs and outputs of each card type are as follows:

ALI—inputs an from access network link and OA egress cards; outputs to an access network link and OA ingress cards;

OA ingress cards—inputs from an access network link and ALI cards; outputs to switching fabric cards and OPM cards;

OA egress cards—inputs from switching fabric cards; outputs to ALI cards, OPM cards, and an access network link;

TP ingress cards—inputs from an optical network link; outputs to switching fabric cards and OPM cards;

TP egress cards—inputs from switching fabric cards; outputs to an optical network link and OPM cards;

Switch fabric cards—inputs from OA ingress cards and TP ingress cards; outputs to OA egress cards and TP egress cards;

OSM—inputs from TP ingress cards; outputs to TP egress cards; and

OPM—inputs from TP ingress cards, TP egress cards, OA ingress cards, and OA egress cards (may monitor additional cards also).

6. Interconnected Backplane Ethernet Hubs

Figure 8:
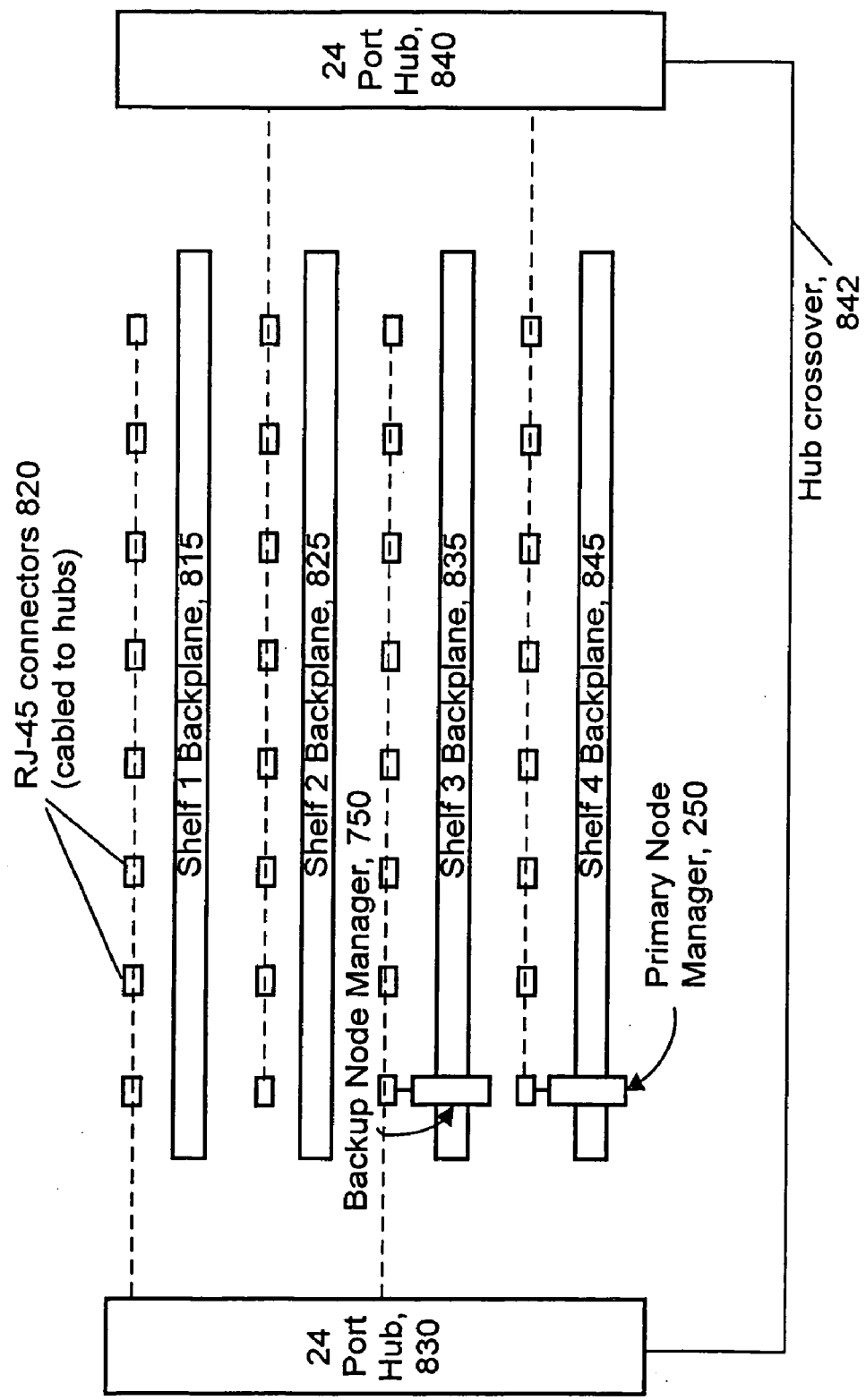
FIG. 8 illustrates backplane Ethernet hubs for an OTS in accordance with the present invention.

FIG. 8 illustrates backplane Ethernet hubs for an OTS in accordance with the present invention. The OTS may use standard Ethernet hub assemblies, such as 24-port hubs 830 and 840, to form the basis of inter-processor communication (i.e., between the Node Manager and the LCMs). Each hub assembly 830, 840 may have, e.g., twenty-four or more ports, whereas the corresponding shelf backplanes (815, 825, 835, 845, respectively) typically have, e.g., 6–8 ports. A number of connectors, two examples of which are denoted at 820, are provided to enable each line card to connect to a hub. The connectors may be RJ-45 connectors. The dashed lines denote a conceptual electrical connection from the connectors 820 to one or more of the hubs. Typically, each connector 820 is connected individually to a hub. For example, the connectors for shelf 1 (815) and shelf 3 (835) may connect to hub 830, while the connectors for shelf 2 (825) and shelf 4 (845) may connect to hub 840. Moreover, a crossover cable 842, which may be a cable such as 100 BaseT media, may connect the two hubs such that they are part of a common LAN. Other variations are possible. For example, a single hub may be used that is sized large enough to connect to each line card in the OTS bay.

In this arrangement, the backup Node Manager 750 shadows the primary Node Manager 250 by listening to all traffic on the internal OTS backplane hubs (the shared media LAN), to determine when the primary Node Manager ceases to operate. When such a determination is made, the backup Node Manager takes over for the primary Node Manager 750.

7. Optical Signaling Module

Figure 9:
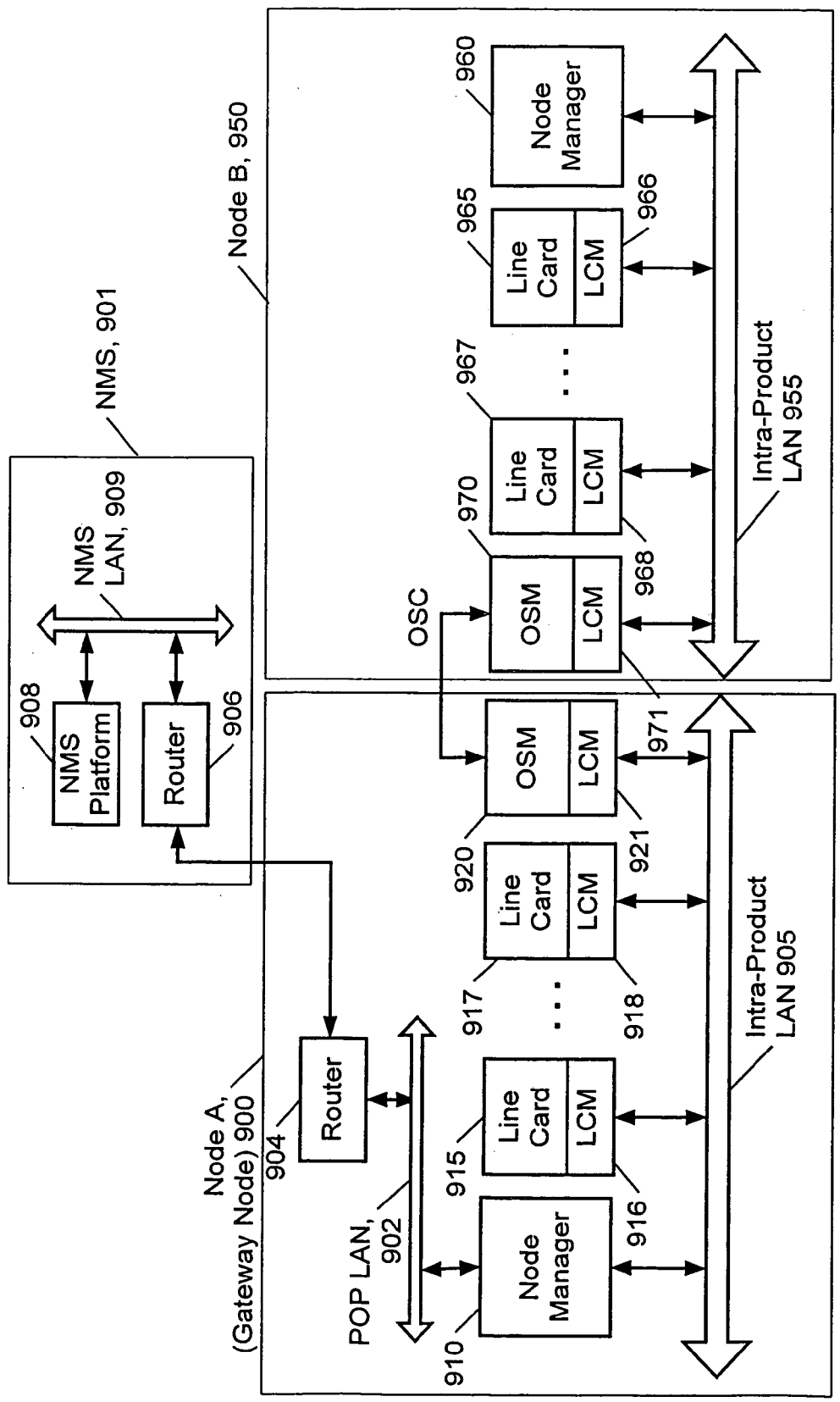
FIG. 9 illustrates the operation of a control architecture and Optical Signaling Module in accordance with the present invention.

FIG. 9 illustrates the operation of a control architecture and OSM in accordance with the present invention. The OSM provides an IP signaling network between switches for the interchange of signaling, routing and control messages. A gateway node 900 can interact with other networks, and includes an intra-product (internal to the OTS) LAN 905, which enables communication between the Node Manager 910 and the LCMs, such as LCM 916 and the associated line card 915, . . . , LCM 918 and the associated line card 917, and LCM 921 and the associated line card 920, which is an OSM. An example non-gateway node 950 similarly includes an intra-product LAN 955, which enables communication between its Node Manager and the LCMs, such as LCM 966 and the associated line card 965, . . . , LCM 968 and the associated line card 967, and LCM 971 and the associated line card 970, which is an OSM.

The OSC wavelength from the Transport Ingress module is extracted and fed into the optical signaling module (OSM). For example, assume the network topology is such that the node A 900 receives the OSC first, then forwards it to node B 950. In this case, the extracted OSC wavelength from the OSM 920 is provided to the OSM 970. The incoming OSC wavelength from node A 900 is converted from optical to electrical and packetized by the OSM 970, and the packets are sent to the Node Manager 960 for proper signaling setup within the system. On the output side of Node B 950, outgoing signaling messages are packetized and converted into an optical signal by OSM 970 and sent to the Transport Egress module for the next-hop OTS. Note that the OSC connection shown in FIG. 9 is logical, and that the OSC typically propagates from TP card to TP card where it is added to TP_Eg by the outgoing OSM and extracted from TP_In by the inbound OSM.

FIG. 9 shows the inter-operation of the Node Manager, LCMs, and the OSM in the OTS. The interconnection of the NMS 901 with the OTS/node 900 via routers 904 and 906 is also shown. In particular, the node 900 communicates with the NMS 901 via a POP gateway LAN 902, an NMS platform 908 via an NMS LAN 909 and the routers 904 and 906. Thus, in addition to the OSC, which enables the NMS to provide optical signals to each node, an electrical signaling channel enables a gateway node to communicate with the NMS.

Each Node Manager at each OTS typically has three distinct network interfaces: 1) a 100 BaseT interface to the intra-OTS LAN, 2) a 100 BaseT interface to remote NMS platforms, and 3) an out-of-band optical signaling channel (OSC) for node-to-node communications. OTSs that act as gateways to the NMS, such as node A 900, may use the 100 BaseT interface, while non-gateways nodes, such as node B 950, need not have this capability. Advantageously, the service provider's LAN is separated from the OTS LAN for more efficient traffic handling. Layer 3 (L3) IP routing over the OSC provides nodes without gateway connectivity access to nodes that have such Gateway capability. L3 here refers to the $3^{rd}$ layer of the OSI model, i.e., the network layer.

Moreover, there are three different levels of messaging-related software on the OTS Node Manager. First, an NMS connects to application software on the Node Manager through the Node Manager NMS agent. Second, an "S" (services) message interface provides an abstraction layer for connecting Node Manager application software to a collection of Core Embedded Control software services, on the Node Manager, that serves to aggregate information sent to, or received from, the LCMs. Third, a "D" (driver) message interface connects the aggregating software of the Node Manager to the LCMs.

8. Optical Switch Fabric Module

Figure 10:
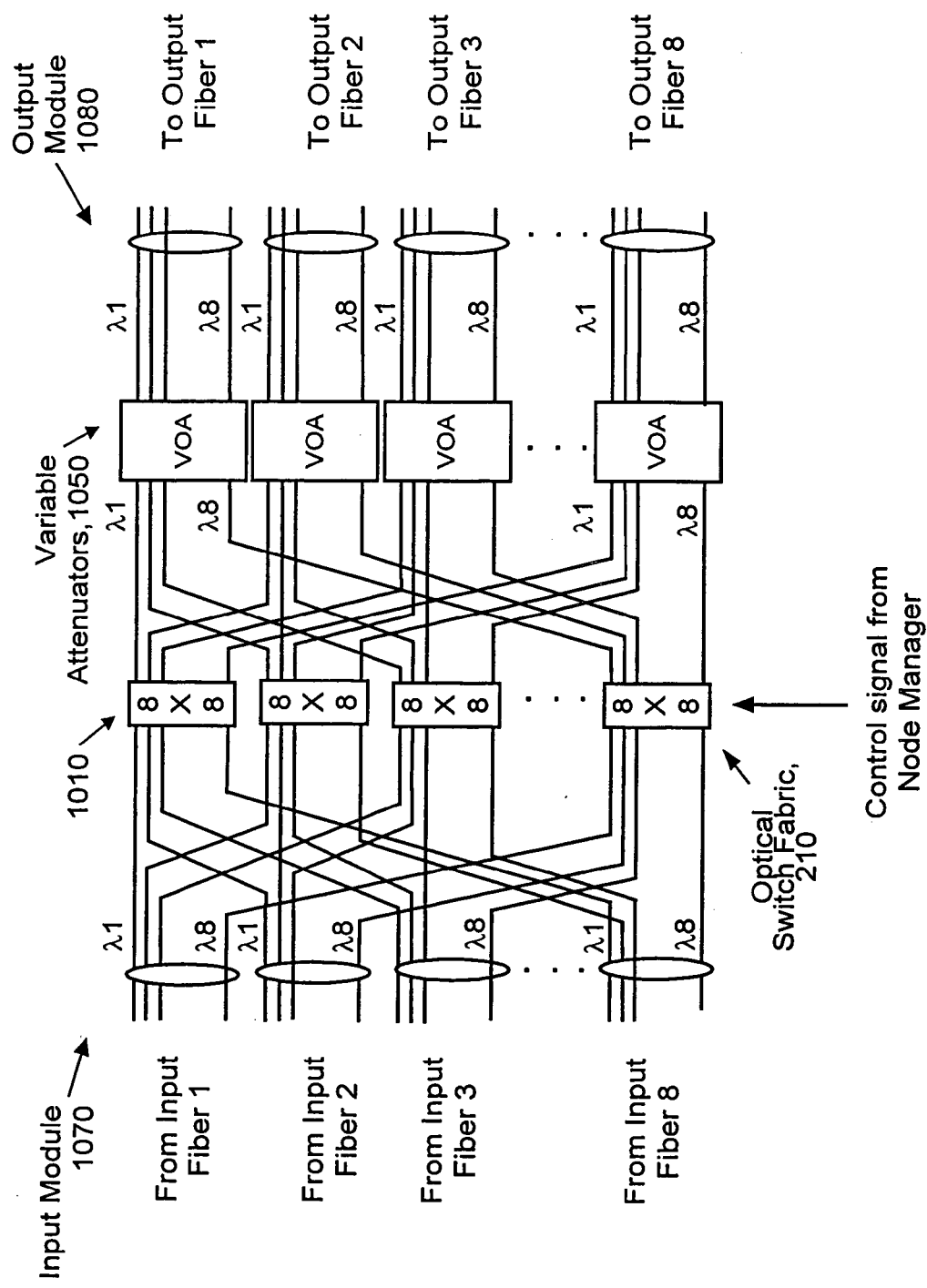
FIG. 10 illustrates an optical switch fabric module in accordance with the present invention.

FIG. 10 illustrates an optical switch fabric module architecture 210 in accordance with the present invention. The OSF module 210 may be designed using 8×8 MEMS modules/chips 1010 as switching elements. The switching is done in the optical domain, and no O/E/O conversions are involved. All inputs to a switching element carry one wavelength (i.e., one optical signal as opposed to a multiplex of optical signals), thus enabling wavelength level switching. Moreover, each optical output of every switching element goes through a variable optical attenuator (VOA) 1050, which may be part of the switch fabric card, to equalize the power across all the wavelengths being subsequently multiplexed into one fiber. The switch fabric 210 is designed in a modular and scalable fashion so that it can be easily configured from a small-scale system to a large-scale system depending on the system configuration requirements.

The switch fabric 210 may receive optical inputs from an input module 1070 such as a transport ingress card and/or an optical access ingress card. The switch fabric provides the corresponding optical outputs to designated ports of an output module 1080, such as a transport egress card and/or an optical access egress card. Note that, for clarity of depiction in FIG. 10, only example light paths are shown.

In summary, the optical switch module provides wavelength-level switching, individually controllable signal attenuation of each output, interconnection to other modules via the optical fiber backplane, power level control management for ensuring that the power of the signal that is output between switches is acceptable, and path loss equalization for ensuring that all channels have the same power. The optical switch module may also use an inherently very low cross-talk switch fabric technology such as MEMS, typically with a 2-D architecture, have a modular architecture for scalability with 8×8 switch modules, and provide digital control of the MEMS fabric with electrostatic actuation.

9. Optical Transport Modules

The optical transport module (or "TP" module) is a multiplexed multi-wavelength (per optical fiber) optical interface between OTSs in an optical network. For configuration and network management, this transport module supports in-band control signals, which are within the EDFA window of amplification, e.g., 1525–1570 nm, as well as out-of-band control signals. For the out-of-band channel, the OTS may support a 1510 nm channel interface. The OTS uses two primary types of transport modules: Transport Ingress 240 (FIG. 11) and Transport Egress 245 (FIG. 12).

In summary, the optical transport module provides demultiplexing of the OSC signal (ingress module), multiplexing of the OSC signal (egress module), optical amplification (ingress and egress modules) which may use low noise optical amplification and gain flattening techniques, demultiplexing of the multi-wavelength transport signal (ingress module), multiplexing of the individual wavelength signals (egress module). The optical transport module may also provide dynamic suppression of optical power transients of the multi-wavelength signal. This suppression may be independent of the number of the surviving signals (i.e., the signals at the transport ingress module that survive at the transport egress module—some signals may be egressed due to drop multiplexing), and independent of the number of the added signals (i.e., the signals added at the transport egress module that are not present at the transport ingress module—these signals may be added using add multiplexing). The optical transport module may also provide dynamic power equalization of individual signals, wavelength connection to the optical switch fabric via the optical backplane, and pump control.

Figure 11:
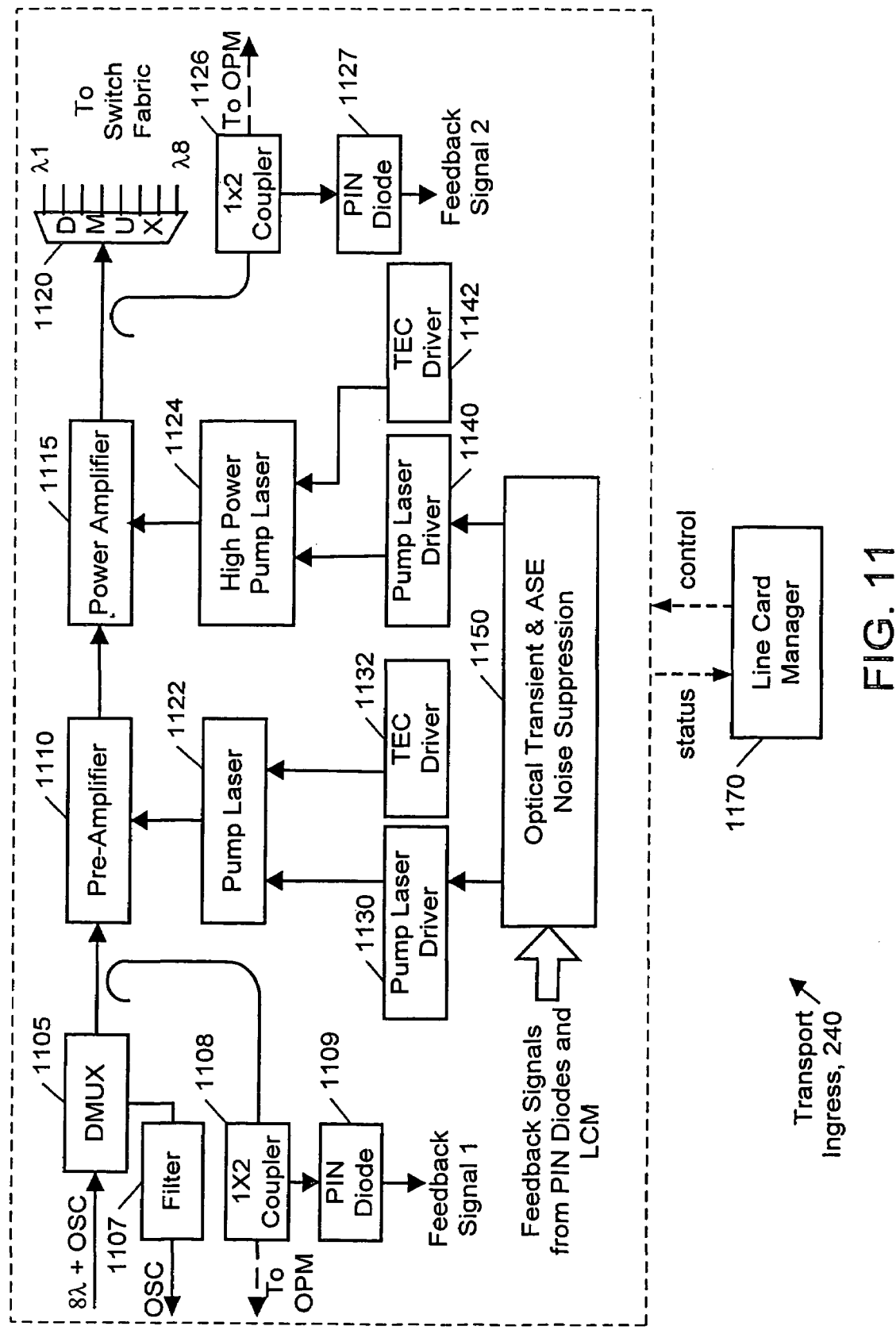
FIG. 11 illustrates a Transport Ingress Module in accordance with the present invention.
Figure 12:
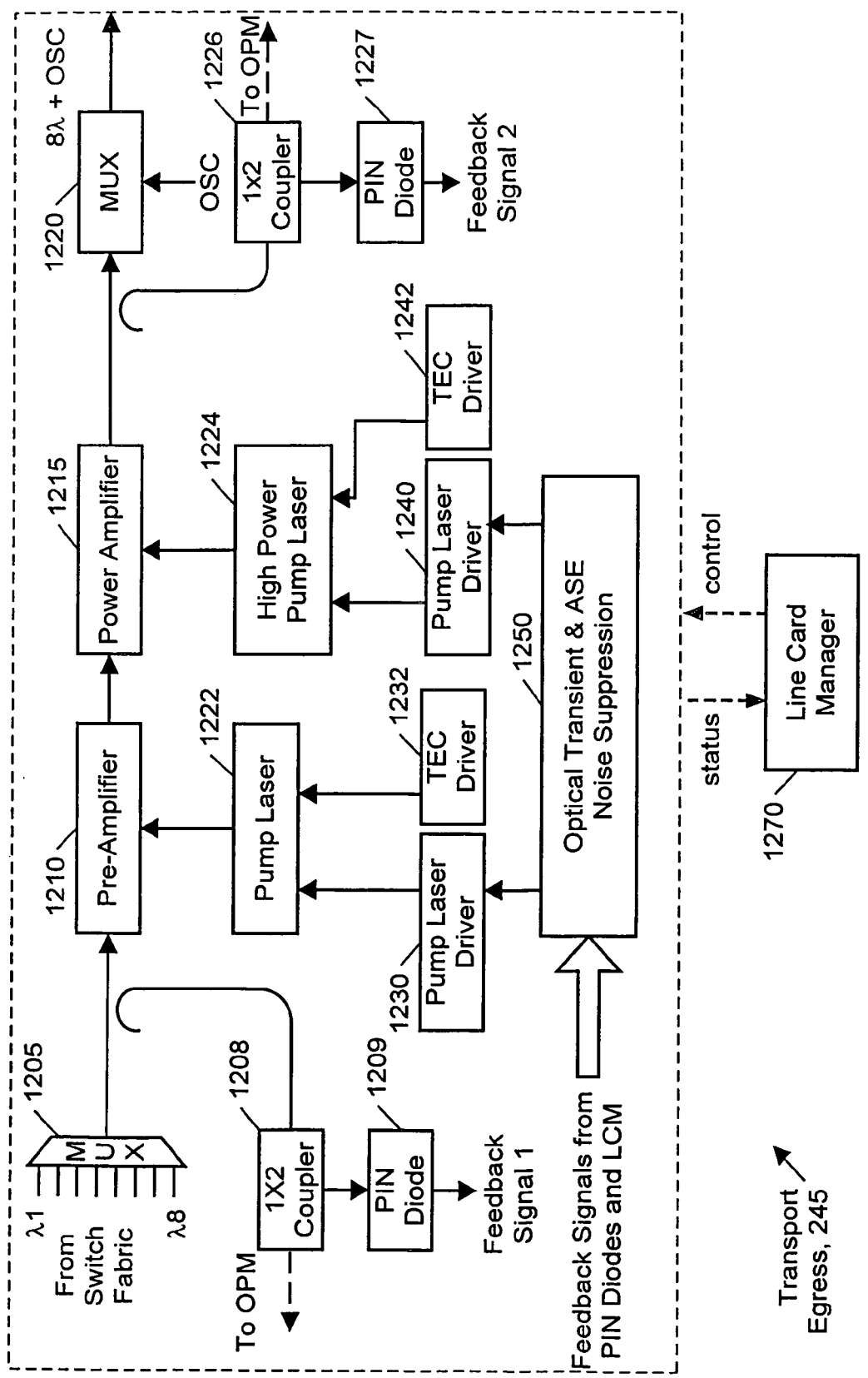
FIG. 12 illustrates a Transport Egress Module in accordance with the present invention.

FIG. 11 shows the architecture for the Transport Ingress module 240. The module includes a demultiplexer 1105 to recover the OSC, an EDFA pre-amplifier 1110, an EDFA power amplifier 1115, a demultiplexer 1120 to demultiplex the eight wavelengths from the input port, and pump lasers 1122 and 1124 (e.g., operating at 980 nm).

Additionally, a filter 1107 filters the OSC before it is provided to the OSM. A coupler 1108 couples a tapped pre-amplified optical signal to the OPM, and to a PIN diode 1109 to provide a first feedback signal. In particular, the PIN diode outputs a current that represents the power of the optical signal. The OPM may measure the power of the optical signal (as well as other characteristics such as wavelength registration), typically with more accuracy than the PIN diode. The tap used allows monitoring of the multi-wavelength signal and may be a narrowband coupler with a low coupling ratio to avoid depleting too much signal power out of the main transmission path. Similarly, a coupler 1126 couples a tapped amplified optical signal to the OPM, and to a PIN diode 1127 to provide a second feedback signal. Moreover, the pump laser 1122 is responsive to a pump laser driver 1130 and a TEC driver 1132. Similarly, the high-power pump laser 1124 is responsive to a pump laser driver 1140 and a TEC driver 1142. Both pump laser drivers 1130 and 1140 are responsive to an optical transient and amplified spontaneous emission noise suppression function 1150, which in turn is responsive to the feedback signals from the PIN diodes 1109 and 1127, and control signals from the LCM 1170. A DC conversion and filtering function may be used to provide local DC power.

The LCM 1170 provides circuit parameters and control by providing control bits and receiving status bits, performs A/D and D/A data conversions as required, and communicates with the associated Node Manager via an Ethernet or other LAN.

In particular, the LCM 1170 may provide control signals, e.g., for pump laser current control, laser on/off, laser current remote control, TEC on/off, and TEC remote current control. The LCM 1170 may receive status data regarding, e.g., pump laser current, backface photocurrent, pump laser temperature, and TEC current.

FIG. 12 shows the architecture of the Transport Egress module 245, which includes a multiplexer 1205 to multiplex the eight wavelengths from the switch fabric, an EDFA Pre-amplifier 1210, an EDFA Power amplifier 1215, a multiplexer 1220 to multiplex the eight wavelengths and the OSC, and pump lasers 1222 and 1224 (e.g., operating at 980 nm).

Analogous to the transport ingress module 240, the transport egress module 245 also includes a coupler 1208 that couples a tapped pre-amplified optical signal to the OPM module, and to a PIN diode 1209 to provide a first feedback signal, e.g., of the optical signal power. Similarly, a coupler 1226 couples a tapped amplified optical signal to the OPM module, and to a PIN diode 1227 to provide a second feedback signal. Moreover, the pump laser 1222 is responsive to a pump laser driver 1230 and a TEC driver 1232. Similarly, the high-power pump laser 1224 is responsive to a pump laser driver 1240 and a TEC driver 1242. Both pump laser drivers 1230 and 1240 are responsive to an optical transient and amplified spontaneous emission noise suppression function 1250, which in turn is responsive to feedback signals from the PIN diodes 1209 and 1227, and the LCM 1270. A DC conversion and filtering function may be used to provide local DC power.

The LCM 1270 operates in a similar manner as discussed in connection with the LCM 1170 of the TP ingress module.

10. Optical Access Modules

The optical access module 230 provides an OTS with a single wavelength interface to access networks that use wavelengths that are compliant with the optical network of the OTSs, such as ITU-grid compliant wavelengths. Therefore, third party existing or future ITU-grid wavelength compliant systems (e.g. GbE router, ATM switch, and Fibre Channel equipment) can connect to the OTS. The optical access modules are generally of two types: Optical Access Ingress 230 (FIG. 13) for ingressing (inputting) one or more signals from an access network, and Optical Access Egress 235 (FIG. 14) for egressing (outputting) one or more signals to an access network. The ITU grid specifies the minimum spacing and the actual wavelengths of the individual wavelengths in a WDM system.

Various functions and features provided by the optical access modules include: optical amplification, connection to the optical switch fabric to route the signal for its wavelength provisioning, ITU-Grid wavelength based configuration, re-configuration at run-time, direct connectivity for ITU-grid based wavelength signals, local wavelength switching, and direct wavelength transport capability.

Figure 13:
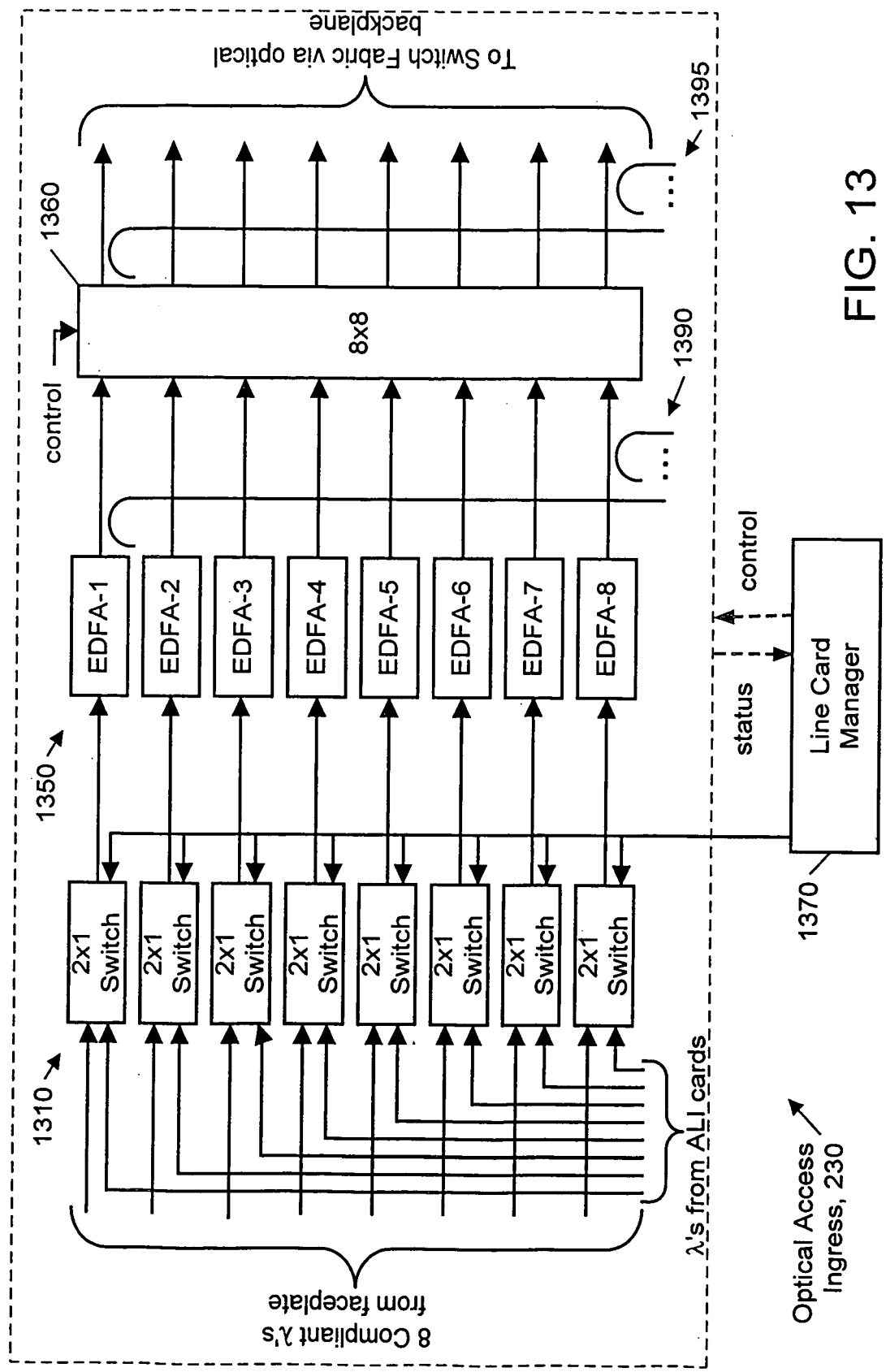
FIG. 13 illustrates an Optical Access Ingress module in accordance with the present invention.

FIG. 13 shows the architecture of the Optical Access Ingress module 230, which includes EDFAs (EDFA-1, . . . , EDFA-8) 1350, 2×1 switches 1310 and 8×8 optical (e.g., MEMS) switch 1360.

In particular, each 2×1 switch receives a compliant wavelength ($\lambda$) from the faceplate and from the output of an ALI card via the optical backplane. In a particular example, eight compliant wavelengths from the outputs of four ALI cards are received via the optical backplane. The LCM 1370 provides a control signal to each switch to output one of the two optical inputs to an associated EDFA.

The LCM 1370 operates in a similar manner as discussed in connection with the TP ingress and egress modules.

Taps 1390 are provided for each of the signals input to the switch 1360 to provide monitoring points to the OPM via the optical backplane. Similarly, taps 1395 are provided for each of the output signals from the switch 1360 to obtain additional monitoring points for the OPM via the optical backplane.

In particular, the performance of the optical signals is monitored, and a loss of signal detected. Each wavelength passes through the optical tap 1390 and a 1×2 optical splitter that provides outputs to: (a) a 8×1 optical coupler to provide a signal to the OPM via the optical backplane, and (b) a PIN diode for loss of signal detection by the LCM 1370. The OPM is used to measure the OSNR and for wavelength registration. The wavelengths at the taps 1395 are provided to a 8×1 optical coupler to provide a signal to the OPM via the optical backplane. The optical taps, optical splitters and 8×1 optical coupler are passive devices.

Figure 14:
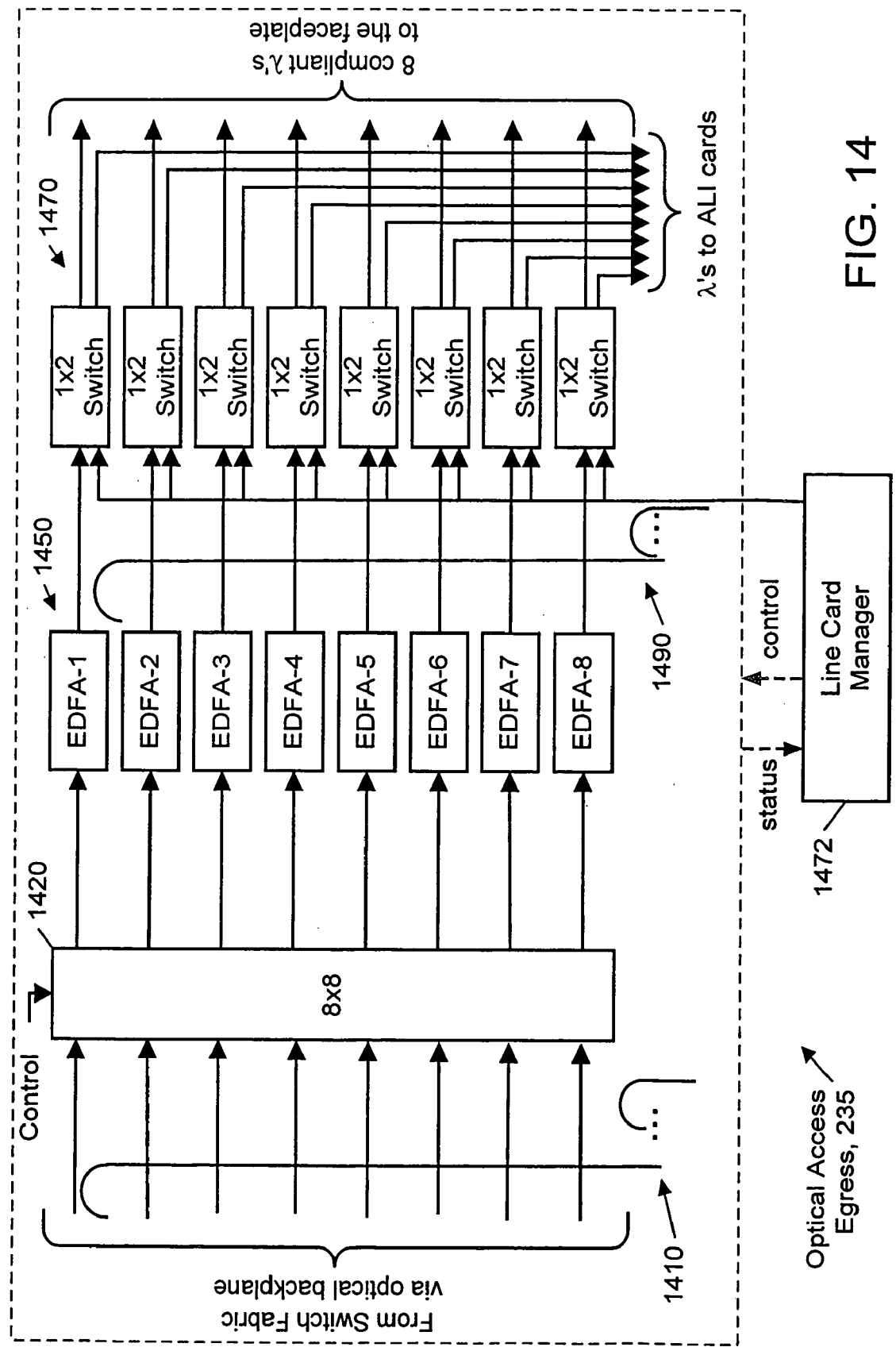
FIG. 14 illustrates an Optical Access Egress module in accordance with the present invention.

FIG. 14 shows the architecture of the Optical Access Egress module 235. The module 235 includes EDFAs (EDFA-1, . . . ,EDFA-8) 1450, 1×2 switches 1470 and 8×8 optical (e.g., MEMS) switch 1420.

In particular, the optical switch 1420 receives eight optical inputs from a switch fabric module 210. Taps 1410 and 1490 provide monitoring points for each of the inputs and outputs, respectively, of the switch 1420 to the OPM via the optical backplane. The optical signals from the switch fabric are monitored for performance and loss of signal detection as discussed in connection with the Optical Access Ingress module 230.

The LCM 1472 provides control signals to the switches 1470 for outputting eight compliant wavelengths to the faceplate, and eight compliant wavelengths to the input of four ALI cards via the optical backplane. The LCM 1472 operates in a similar manner as discussed previously.

11. Access Line Interface Modules

Figure 16:
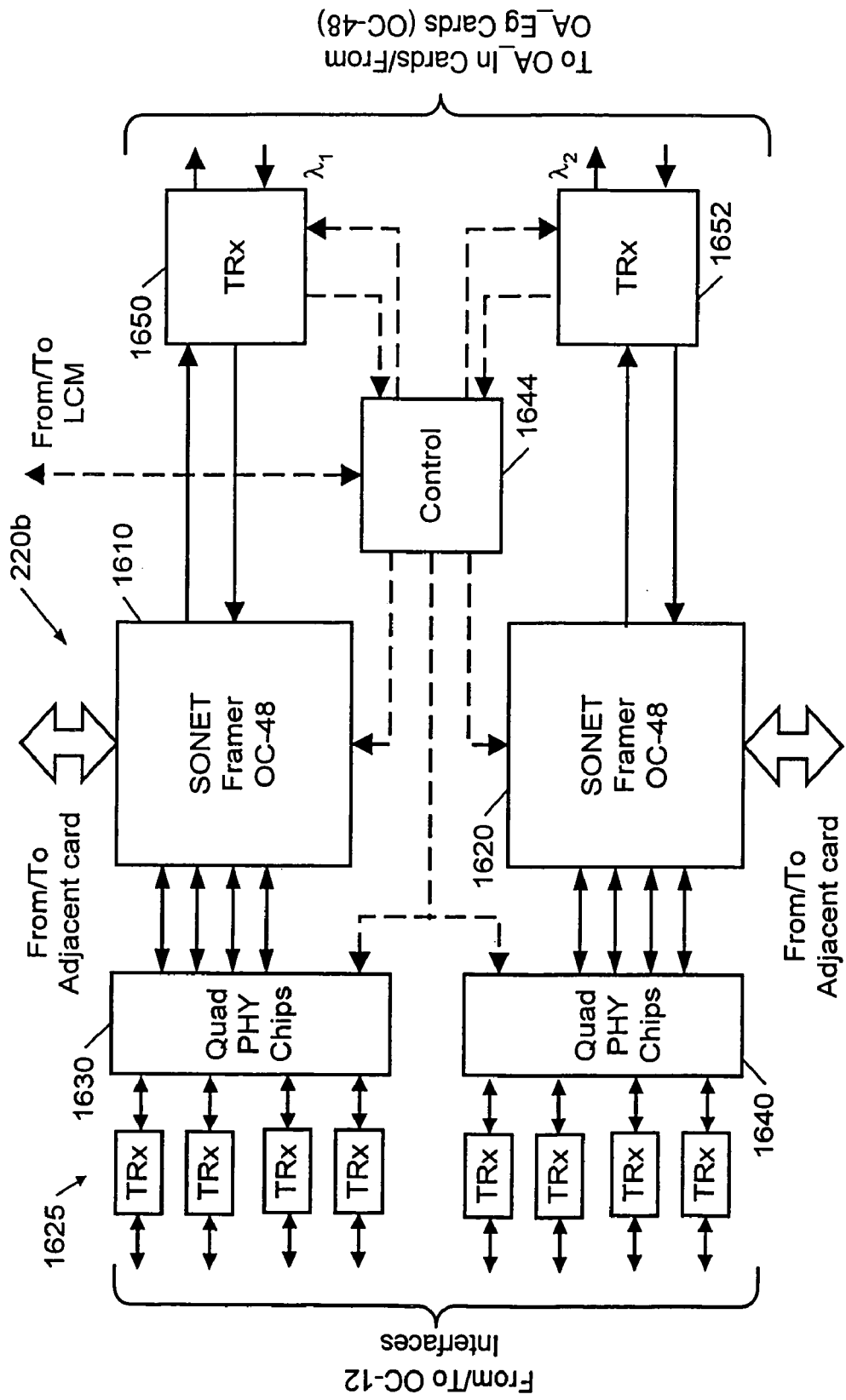
FIG. 16 illustrates a SONET OC-12 Access Line Interface module in accordance with the present invention.
Figure 17:
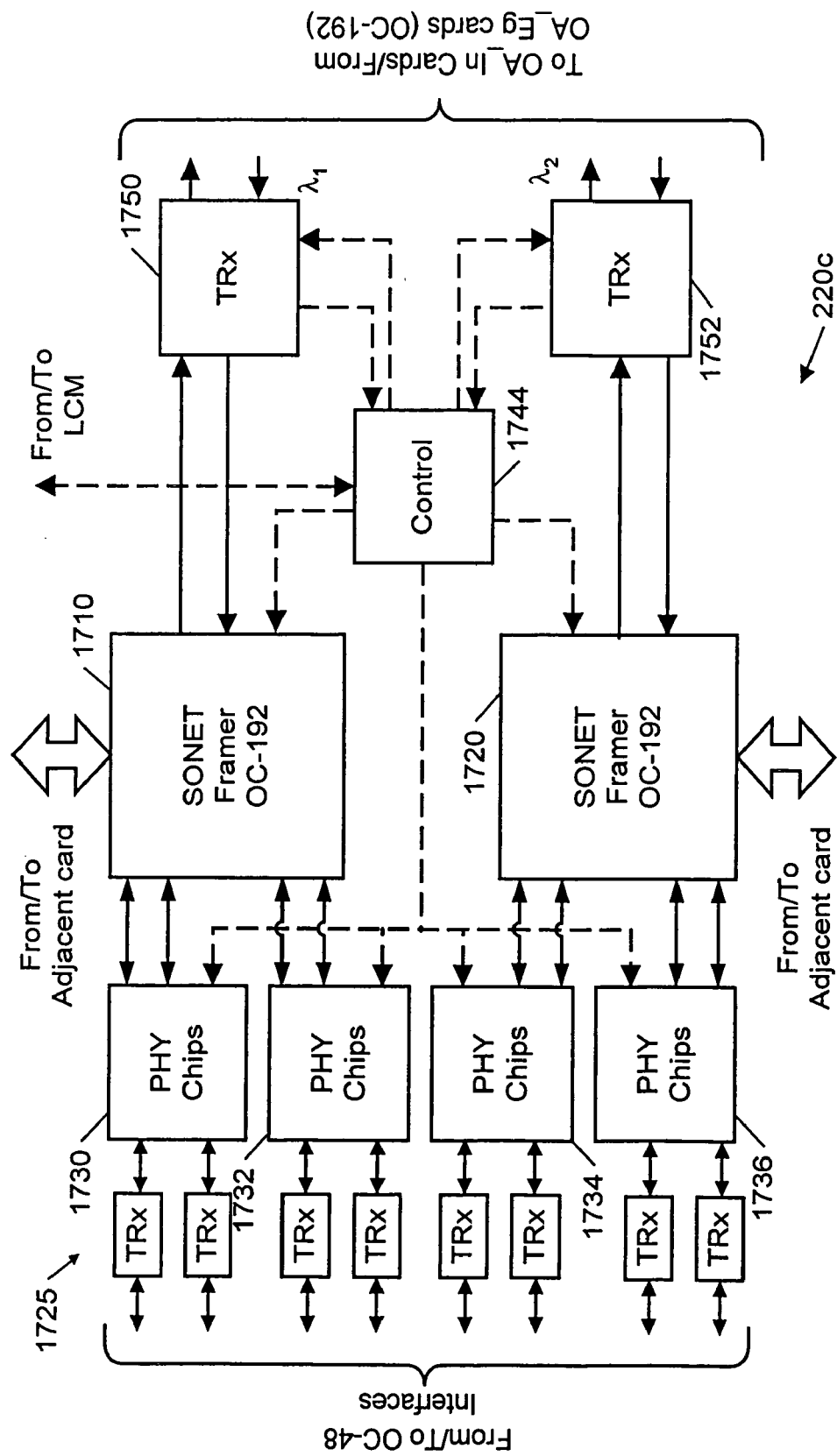
FIG. 17 illustrates a SONET OC-48 Access Line Interface module in accordance with the present invention.
Figure 18:
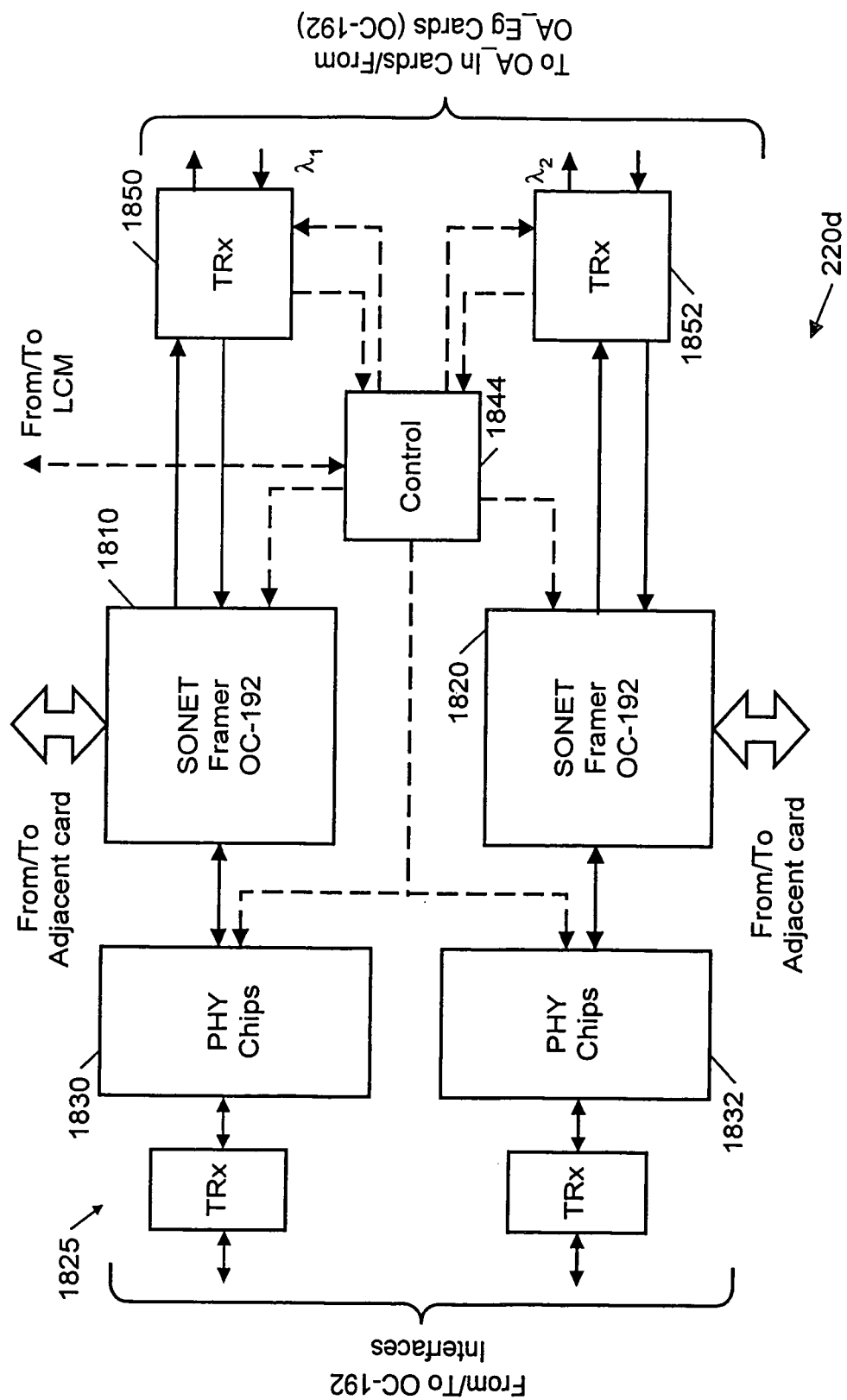
FIG. 18 illustrates a SONET OC-192 Access Line Interface module in accordance with the present invention.

This O/E/O convergent module is a multi-port single wavelength interface between the switching system and legacy access networks using non-compliant wavelengths, e.g., around 1300 nm. The ALI module/card may be provided as either a GbE interface module 220a (FIG. 15) or SONET OC-n module. For example, FIG. 16 shows the ALI module configured as an OC-12 module 220b, FIG. 17 shows the ALI module configured as an OC-48 module 220c, and FIG. 18 shows the ALI module configured as an OC-192 module 220d. Other OC-n speeds may also be supported. In FIGS. 15–18, the solid lines denote transport data flow, and the dashed lines denote control data flow.

Figure 15:
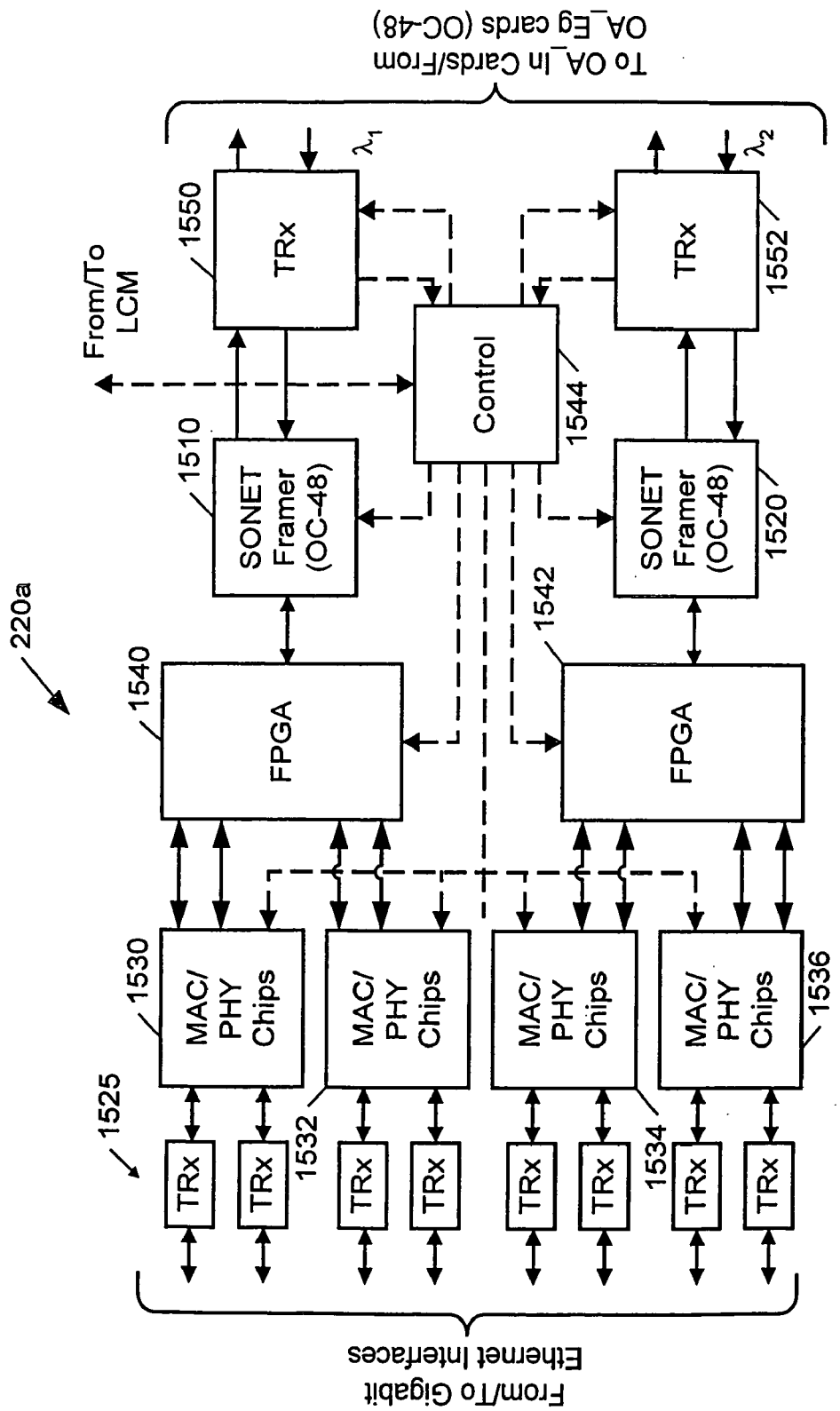
FIG. 15 illustrates a Gigabit Ethernet Access Line Interface module in accordance with the present invention.

Referring to FIG. 15, the GbE module 220a provides dual data paths, each of which accepts four GbE signals, and multiplexes them to a single OC-48 signal. In the other direction, the module accepts an OC-48 signal and demultiplexes it into four GbE signals in each of the two paths.

The GbE module 220a includes SONET framers 1510 and 1520 that handle aggregation and grooming from each GbE port. The SONET framers may use the Model S4083 or Yukon chips from Advanced Micro Circuits Corporation (AMCC) of Andover, Mass. The module 220a aggregates two or more GbE lines into each SONET framer 1510, 1520, which support OC-48 and OC-192 data rates. The module 220a also performs wavelength conversion to one of the ITU-grid wavelengths. For each of the modules 220a–220d, the desired ITU-grid wavelength is configured at initial path signaling setup.

For scheduling the use of OA bandwidth to support multiple legacy access networks, a variety of scheduling algorithms may be used when the aggregate bandwidth of the ALI inputs is greater than that of the ALI output. Such algorithms are typically performed by FPGAs 1540 and 1542. For example, one may use round robin scheduling, where the same bandwidth is allocated to each of the GbE interfaces, or weighted round robin scheduling, where relatively more bandwidth is allocated to specified GbE interfaces that have a higher priority.

The MAC/PHY chips 1530, 1532, 1534, 1536 communicate with GbE transceivers, shown collectively at 1525, which in turn provide O-E and E-O conversion. MAC, or Media Access Control, refers to processing that is related to how the medium (the optical fiber) is accessed. The MAC processing performed by the chips may include frame formatting, token handling, addressing, CRC calculations, and error recovery mechanisms. The Physical Layer Protocol, or PHY, processing, may include data encoding or decoding procedures, clocking requirements, framing, and other functions. The chips may be AMCC's Model S2060. The module 220a also includes FPGAs 1540, 1542 which are involved in signal processing, as well as a control FPGA 1544. The FPGAs 1540, 1542 may be the Model XCV300 from Xilinx Corp., San Jose, Calif. Optical transceivers (TRx) 1550 and 1552 perform O-E and E-O conversions. In an ingress mode, where optical signals from an access network are ingressed into an OTS via the an ALI card, the MAC/PHY chips 1530–1536 receive input signals from the GbE transceivers 1525, and provide them to the associated FPGA 1540 or 1542, which in turn provides the data in an appropriate format for the SONET framers 1510 and 1520, respectively. The SONET framers 1510 or 1520 output SONET-compliant signals to the transceivers 1550 and 1552, respectively, for subsequent E-O conversion and communication to the OA_In cards 230 via the optical backplane.

In an egress mode, where optical signals are egressed from the all optical network to an access network via the OTS, SONET optical signals are received from the optical access egress cards 235 at the transceivers 1550 and 1552, where O-E conversion is performed, the results of which are provided to the SONET framers 1510 or 1520 for de-framing. The de-framed data is provided to the FPGAs 1540 and 1542, which provide the data in an appropriate format for the MAC/PHY chips 1530–1536. The MAC/PHY chips include FIFOs for storing the data prior to forwarding it to the GbE transceivers 1525.

The control FPGA 1544 communicates with the ALI card's associated LCM, and also provides control signals to the transceivers 1550 and 1552, FPGAs 1540 and 1542, SONET framers 1510 and 1520, and MAC/PHY chips 1530–1536. The FPGA 1544 may be the Model XCV150 from Xilinx Corp.

In summary, the ALI modules may include module types 220a–220c, having: 16 physical ports (8 input and 8 output) of GbE, OC-12, or OC-48, and four physical ports (two input and two output) of OC-192. Module 220d has four physical ports on either end. The ALI modules may support OC-12 to OC-192 bandwidths (or faster, e.g., OC-768), provide wavelength conversion, e.g., from the 1250–1600 nm range, to ITU-compliant grid, support shaping and re-timing through O-E-O conversion, provide optical signal generation and amplification, and may use a wavelength channel sharing technique.

Figure 28:
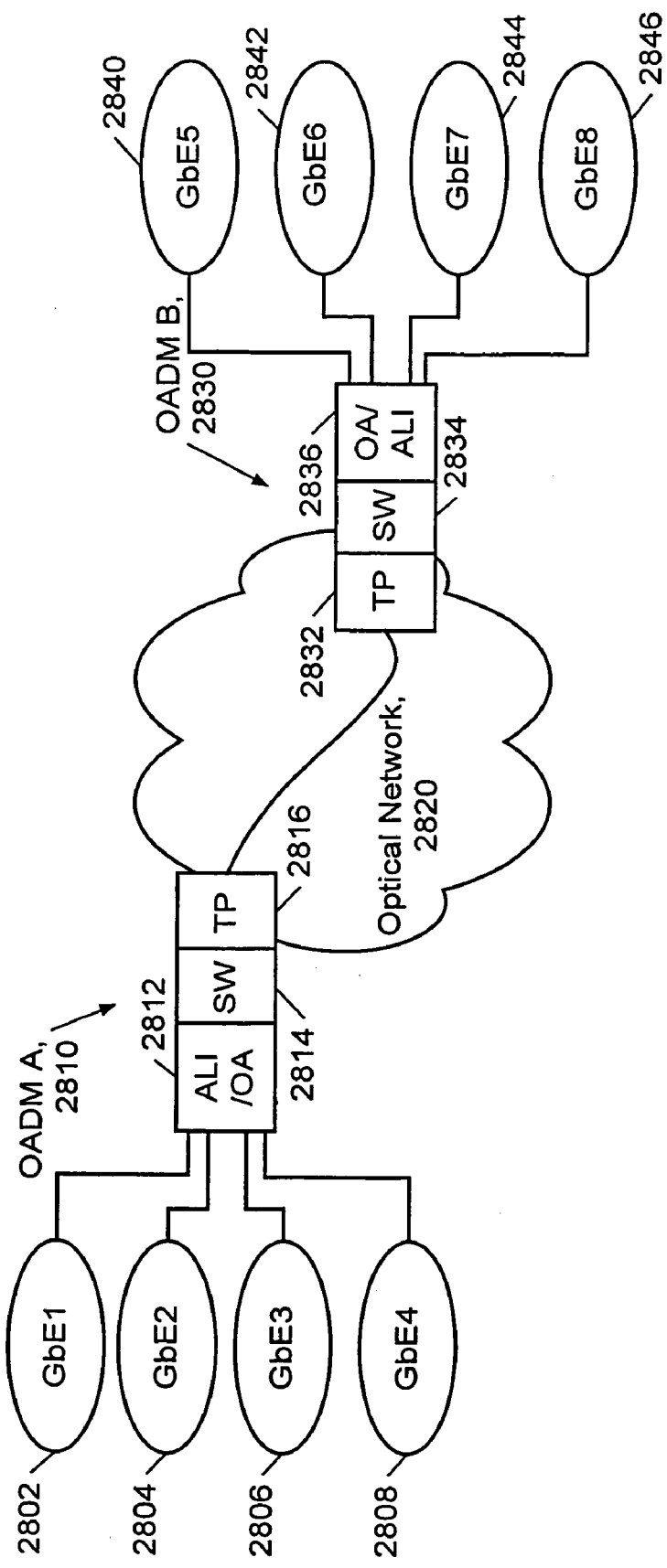
FIG. 28 illustrates Gigabit Ethernet networks accessing a managed optical network in accordance with the present invention.

See FIG. 28 for additional related information.

FIGS. 16, 17 and 18 show the architecture of the OC-12, OC-48, and OC-192 access line interface cards, respectively. See also FIG. 29 for additional related information.

FIG. 16 shows an OC-12 module 220b, which aggregates four or more OC-12 lines into each SONET framer 1610 or 1620, which support OC-48 data rates.

In an optical ingress mode, Quad PHY functions 1630 and 1640 each receive four signals from OC-12 interfaces via transceivers, shown collectively at 1625, and provide them to corresponding SONET framers 1610 and 1620, respectively. The SONET Framers may use AMCC's Model S4082 or Missouri chips. The Quad PHY functions may each include four of AMCC's Model S3024 chips. The SONET framers 1610 and 1620 provide the data in frames. Since four OC-12 signals are combined, a speed of OC-48 is achieved. The framed data is then provided to optical transceivers 1650 and 1652 for E-O conversion, and communication to the optical access ingress cards 230 via the optical backplane. The SONET framers 1610 and 1620 may also communicate with adjacent ALI cards via an electrical backplane to receive additional input signals, e.g., to provide a capability for switch protection mechanisms. The electrical backplane may comprise a parallel bus that allows ALI cards in adjacent bays to communicate with one another. The electrical backplane may also have a component that provides power to each of the cards in the OTS bay.

In an optical egress mode, optical signals are received by the transceivers 1650 and 1652 from the OA_Eg cards and provided to the SONET framers 1610 and 1620 following O-E conversion. The SONET framers 1610 and 1620 provide the signals in a format that is appropriate for the Quad PHY chips 1630 and 1640.

The control FPGA 1644 communicates with the ALI card's associated LCM, and also provides control signals to the transceivers 1650 and 1652, SONET framers 1610 and 1620, and Quad PHY chips 1630 and 1640.

FIG. 17 shows an OC-48 module 220c, which aggregates two or more OC-48 lines into each SONET framer 1710 and 1720, which support OC-192 data rates.

In an optical ingress mode, PHY chips 1730, 1732, 1734 and 1736 each receive two signals from OC-48 interfaces via transceivers 1725 and provide them to corresponding SONET framers 1710 and 1720, respectively. The SONET framers 1710 and 1720 provide the signals in frames. Since four OC-48 signals are combined, a speed of OC-192 is achieved. The signals are then provided to optical transceivers 1750 and 1752 for E-O conversion, and for communication to optical access ingress cards 230 via the optical backplane. The SONET framers 1710 and 1720 may also communicate with adjacent ALI cards.

In an optical egress mode, optical signals are received by the optical transceivers 1750 and 1752 from optical access egress cards and provided to the SONET framers 1710 and 1720 following O-E conversion at the transceivers 1650, 1652. The SONET framers 1710 and 1720 provide the signals in a format that is appropriate for the OC-48 interfaces. The formatted optical signals are provided to the OC-48 interfaces via the PHY chips 1730–1736. Moreover, dedicated ports may be provided, which obviate MAC processing.

The FPGA 1744 communicates with the ALI card's associated LCM, and also provides control signals to the transceivers 1750 and 1752, SONET framers 1710 and 1720, and PHY chips 1730–1736.

FIG. 18 shows an OC-192 module 220d, which provides one OC-192 line into each SONET framer 1810, 1820, which support OC-192 data rates.

In an optical ingress mode, PHY chips 1830 and 1832 each receive a signal from OC-192 interfaces via transceivers 1825 and provide it to corresponding SONET framers 1810 and 1820, respectively, which provide the signals in frames. The signals are then provided to optical transceivers 1850 and 1852 for E-O conversion, and communicated to OA_In cards 230 via the optical backplane. The SONET framers 1810 and 1820 may also communicate with adjacent ALI cards.

In an optical egress mode, optical signals are received by the optical transceivers 1850 and 1852 from the OA Eg cards and provided to the SONET framers 1810 and 1820 following O-E conversion. The SONET framers 1810 and 1820 provide the signals in a format that is appropriate for the OC-192 interfaces. The formatted signals are provided to the OC-192 interfaces via the PHY chips 1830 and 1832.

The FPGA 1844 communicates with the ALI card's associated LCM, and also provides control signals to the transceivers 1850 and 1852, SONET framers 1810 and 1820, and PHY chips 1830 and 1832.

12. Optical Performance Monitoring Module

Figure 19:
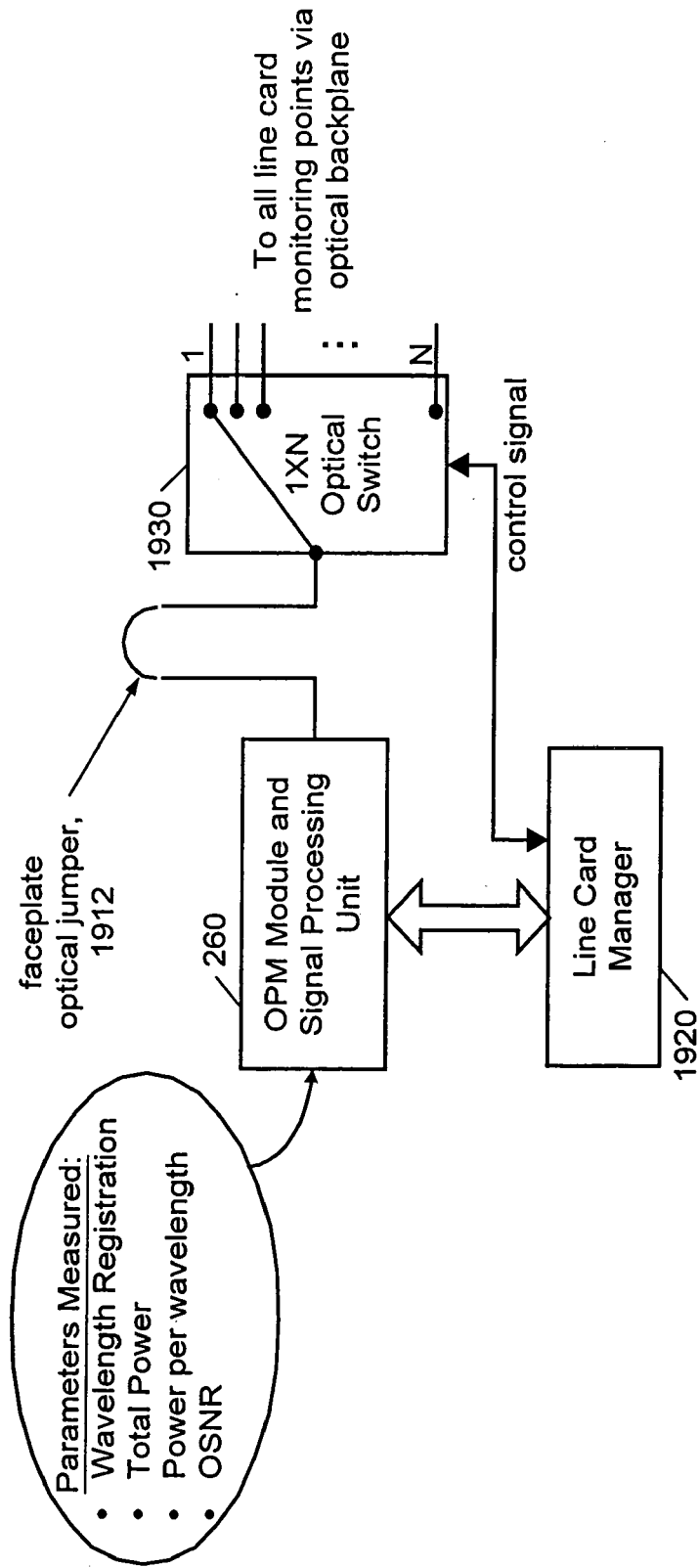
FIG. 19 illustrates an Optical Performance Monitoring module in accordance with the present invention.

Referring to FIG. 19, the Optical Performance Monitoring (OPM) module 260 is used for several activities. For example, it monitors the power level of a multi-wavelength signal, the power level of a single wavelength signal, and the optical signal-to-noise ratio (OSNR) of each wavelength. It also measures wavelength registration. Each incoming wavelength power variation should be less than 5 dB and each out-going wavelength power variation should be less than 1 dB.

In particular, the OPM acts as an optical spectrum analyzer. The OPM may sample customer traffic and determine whether the expected signals levels are present. Moreover, the OPM monitoring is in addition to the LCM monitoring of a line card, and generally provides higher resolution readings. The OPM is connected through the optical backplane, e.g., using optical fibers, to strategic monitoring points on the line cards. The OPM switches from point to point to sample and take measurements. Splitters, couplers and other appropriate hardware are used to access the optical signals on the line cards.

The OPM module and signal processing unit 260 communicates with a LCM 1920, and receives monitoring data from all the line card monitoring points from a 1×N optical switch 1930 via the optical backplane of the OTS. A faceplate optical jumper 1912 allows the OPM module and signal processing unit 260 and the optical switch 1930 to communicate. A conversion and filtering function may be used to provide local DC power.

The LCM 1920 (like all other LCMs of a node) communicates with the Node Manager via the intra-node LAN.

In summary, the OPM supports protection switching, fault isolation, and bundling, and measures optical power, OSNR of all wavelengths (by sweeping), and wavelength registration. Moreover, the OPM, which preferably has a high sensitivity and large dynamic range, may monitor each wavelength, collect data relevant to optical devices on the different line cards, and communicate with the NMS (via the LCM and Node Manager). The OPM is preferably built with a small form factor.

13. OTS Chassis Configurations

The OTS is designed to be flexible, particularly as a result of its modular system design that facilitates expandability. The OTS is based on a distributed architecture where each line card has an embedded controller. The embedded controller performs the initial configuration, boots up the line card, and is capable of reconfiguring each line card without any performance impact on the whole system.

Figure 20:
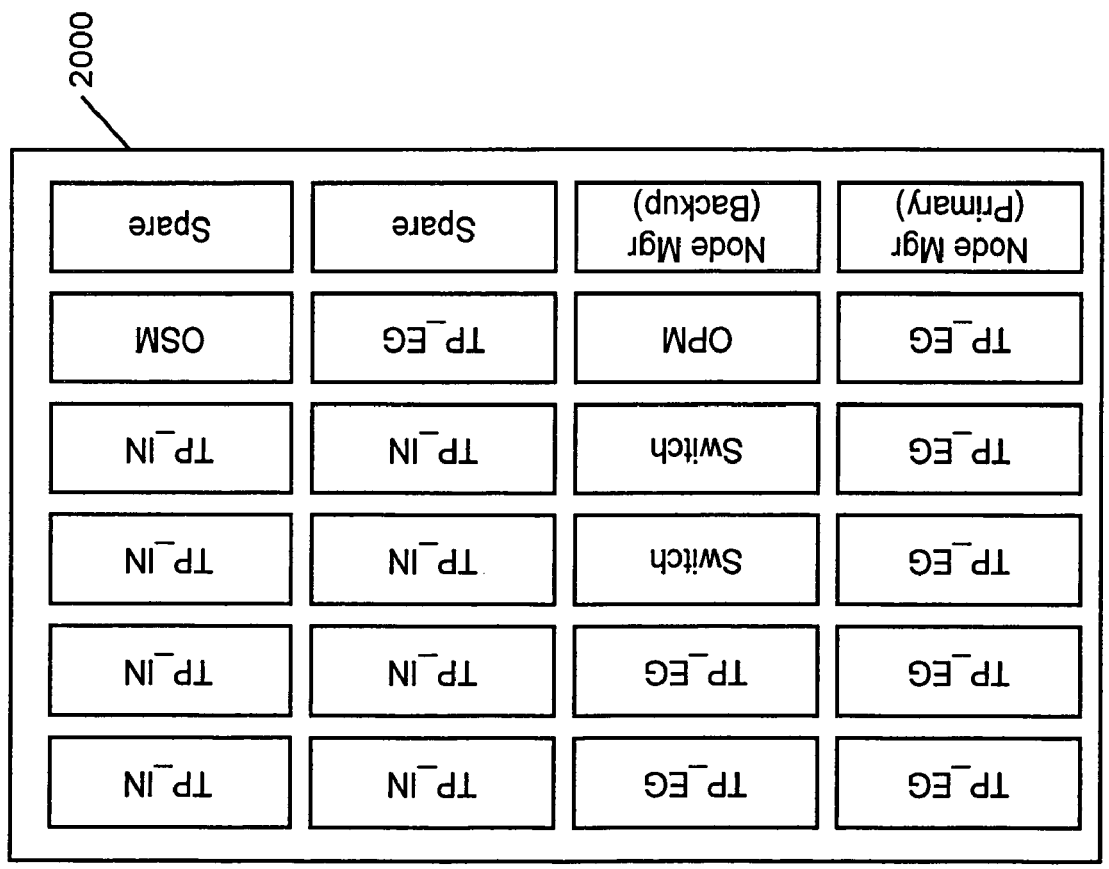
FIG. 20 illustrates a physical architecture of an OTS chassis in an OXC configuration in accordance with the present invention.

FIG. 20 illustrates a physical architecture of an OTS chassis or bay (receiving apparatus) in an OXC configuration 2000 in accordance with the present invention. There may be two OTS Node Manager circuit packs in each OTS node, namely a primary and a backup. Each of these circuit packs corresponds to Node Manager 250 of FIG. 2. In the example configuration of FIG. 20, a total of twenty-two circuit packs/line cards are provided in receiving locations or slots of the bay, with two of those twenty-two circuit packs being OTS Node Manager cards. An OTS is typically designed to provide a certain number of slots per shelf in its bay. Based upon the number of shelves, provision is made for up to a certain number of total circuit packs for the bay, such as, for example, twenty-four circuit packs in a bay, to allow for different configurations of OTS to be constructed. Communication to or from the bay is via the OTS Node Manager.

Figure 21:
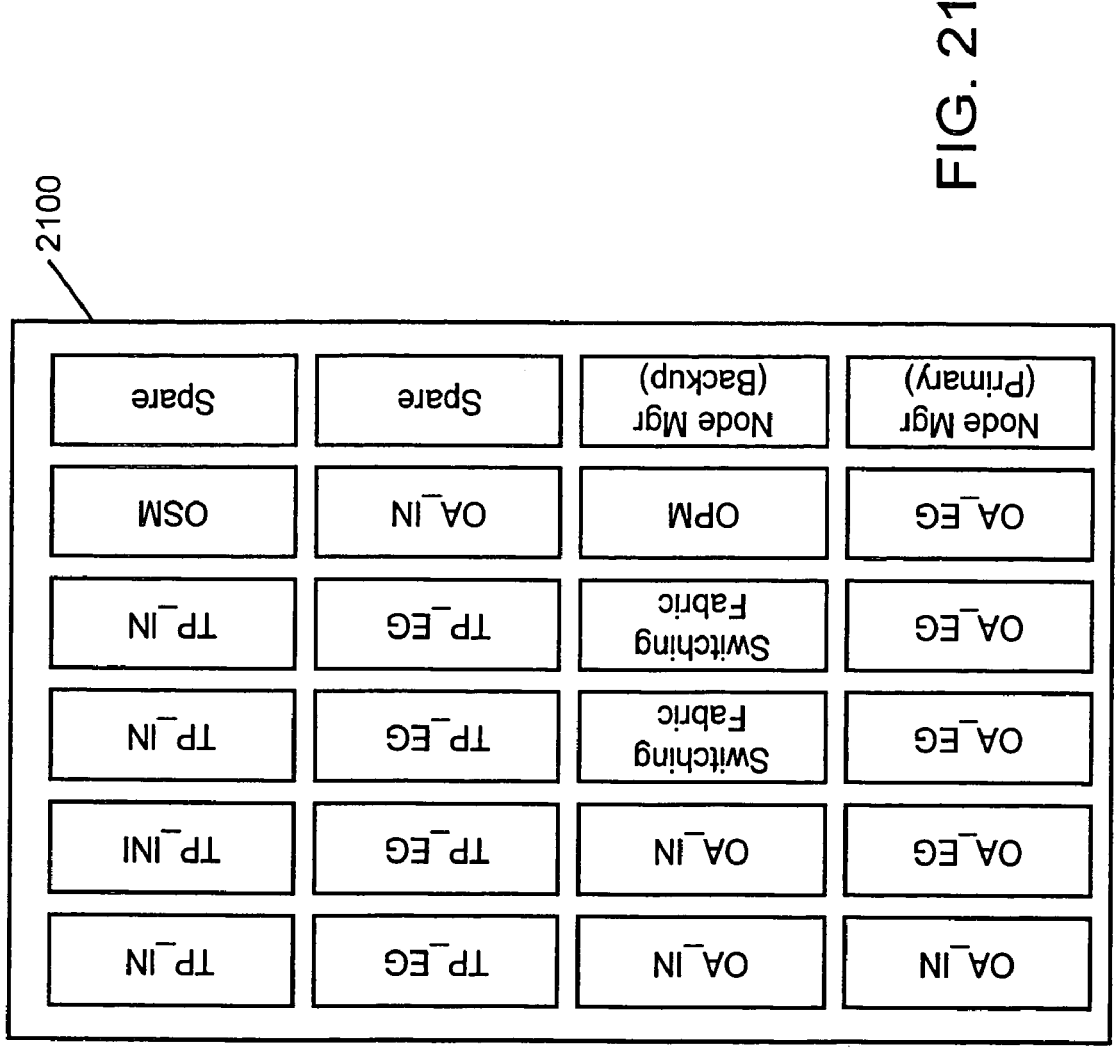
FIG. 21 illustrates a physical architecture of an OTS chassis in an OXC/OADM configuration in accordance with the present invention.
Figure 22:
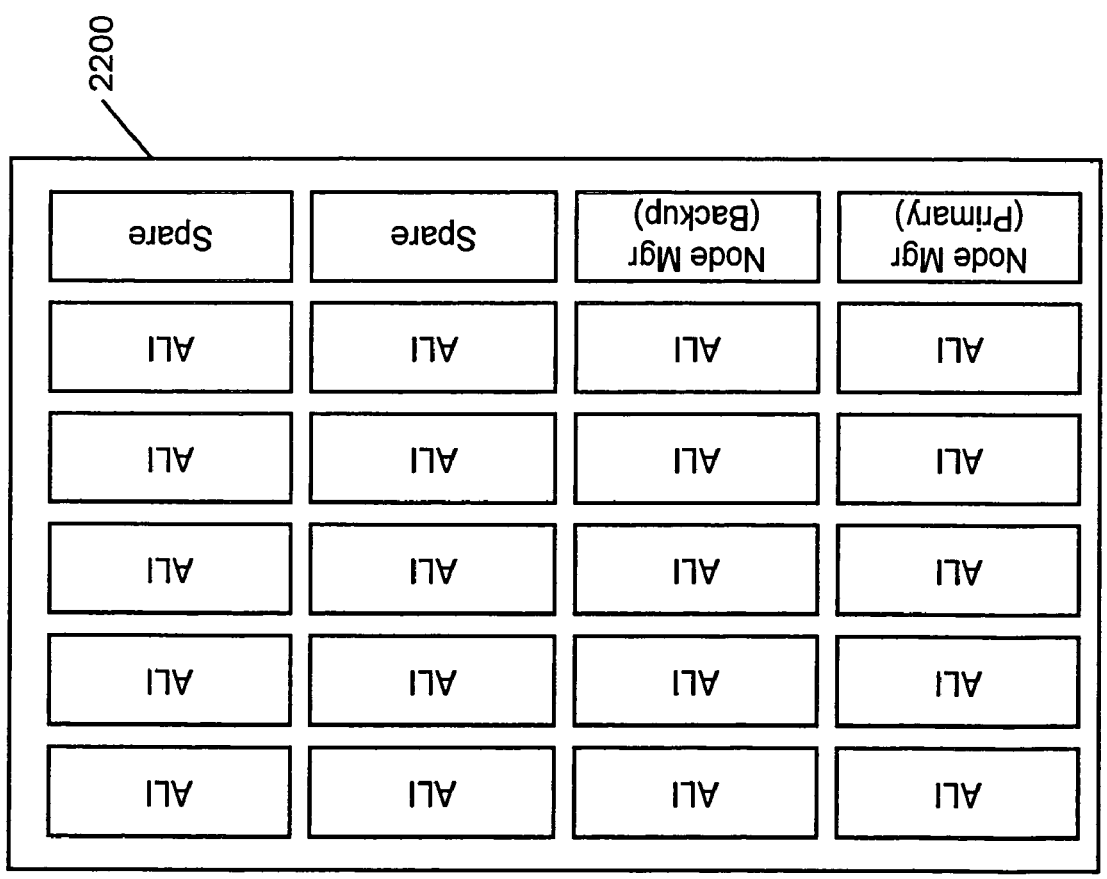
FIG. 22 illustrates a physical architecture of an OTS chassis in an ALI configuration in accordance with the present invention.

FIG. 21 shows a fully configured OTS 2100 in a OXC/OADM configuration. FIG. 22 shows a fully configured ALI card bay 2200.

Optical cables in an OTS are typically connected through the optical backplane to provide a simple and comprehensive optical cable connectivity of all of the optical modules. In addition to providing for the LAN, the electrical backplane handles power distribution, physical board connection, and supports all physical realizations with full NEBS level 3 compliance. Note that since "hot" plugging of cards into an OTS is often desirable, it may be necessary to equip such cards with transient suppression on their power supply inputs to prevent the propagation of powering-up transients on the electrical backplane's power distribution lines.

In one approach to managing the complexity of the optical backplane, locations or slots in the OTS bay may be reserved for specific types of line cards since the required optical coupling of a line card depends on its function, and it is desirable to minimize the complexity of the optical fiber connections in the optical backplane.

Each of the optical circuit cards also has a connection to an electrical backplane that forms the LAN for LCM-Node Manager communications. This connection is uniform for each card and may use an RJ-45 connector, which is an 8-wire connector used on network interface cards.

The OTS is flexible in that it can accommodate a mix of cards, including Optical Access and Transport line cards. Thus, largely generic equipment can be provided at various nodes in a network and then a particular network configuration can be remotely configured as the specific need arises. This simplifies network maintenance and provides great flexibility in reconfiguring the network. For example, the OTS may operate as a pure transport optical switch if it is configured with all cards are transport cards (FIG. 20), e.g., eight transport ingress (TP_In) cards and eight transport egress cards (TP_Eg). Moreover, each TP_In card has one input port/fiber and each TP_Eg card has one output port/fiber. In a particular implementation, each port/fiber supports eight wavelength-division multiplexed λ's, along with the OSC.

The OTS may operate as an Add/Drop terminal if it is configured with ALI, OA, and TP cards (FIGS. 21 and 22). A wide range of configurations is possible depending on the mix of compliant and non-compliant wavelengths supported. For example, a typical configuration might include sixteen ALI cards for conversion of non-compliant wavelengths, four OA_In cards, four OA_Eg cards, four TP_In cards, and four TP_Eg cards. Note that since the ALI cards provide wavelength conversion in this embodiment, no wavelength conversion need be performed within the optical fabric. However, wavelength conversion within the optical fabric is also a possibility as the switch fabric technology develops.

Moreover, the OTS is scalable since line cards may be added to the spare slots in the bay at a later time, e.g., when bandwidth requirements of the network increase. Furthermore, multiple OTS bays can be connected together to further expand the bandwidth-handling capabilities of the node and/or to connect bays having different types of line cards. This connection may be realized using a connection like the ALI card-to-OA card connection via the optical backplane.

Having now discussed the different types of modules/line cards and the OTS chassis configurations, some features of the OTS when configured as a OXC or OADM are summarized in Table 2 in terms of Access Line Interface, Transport/Switching, and Management functions. Since the OADM can be equipped with transport cards (TP_In and TP_Eg), it performs all of the functions listed, while the dedicated OXC configuration performs the switching/transport and management functions, but not the ALI functions.

For example, the Node Manager or NMS may control the OTS to configure it in the OXC or OADM modes, or to set up routing for light paths in the network.

TABLE 2

| Product Feature | OADM | OXC |
| --- | --- | --- |
| Access Line Interface | | |
| Adding/dropping of wavelengths | X | |
| Grooming of optical signals | X | |
| Non-ITU-compliant wavelength conversion | X | |
| Optical Signal Generation/Modulation (Timing/Shaping) | X | |
| Switching/Transport | | |
| Multiplexing and demultiplexing of multi-wavelength signals into individual wavelengths | X | X |
| Cross-connection of the individual wavelengths | X | X |
| Amplification of optical signals | X | X |
| Protection switching of wavelengths | X | X |
| Dynamic power equalization of the optical signals | X | X |
| Dynamic suppression of optical power transients of the multi-wavelength signal | X | X |
| Management | | |
| Performance monitoring of wavelengths | X | X |
| Operations and maintenance capabilities to support TMN | X | X |

14. System Configurations

Figure 23:
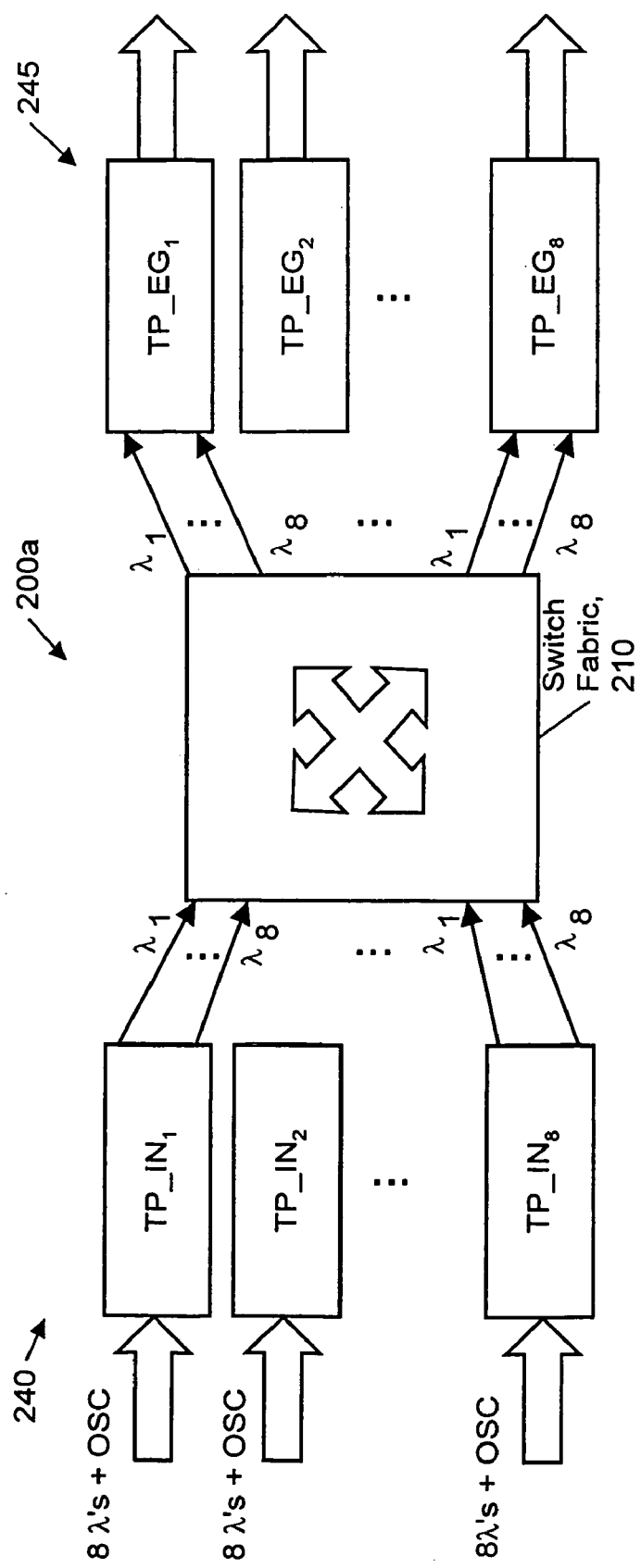
FIG. 23 illustrates a full wavelength cross-connect configuration in accordance with the present invention.

In an important aspect of the invention, each OTS can be used in a different configuration based on its position within an optical network. In the optical cross-connect (OXC) configuration, the input transport module, the switch fabric and the output transport module are used. FIG. 23 shows the modules used for the OXC configuration. In particular, the OTS 200*a* includes the TP_In modules 240 and the TP_Eg modules 245. Each TP_In card may receive one fiber that includes, e.g., eight multiplexed data channels and the OSC. Similarly, each TP_Eg card outputs eight data channels in a multiplex and the OSC on an associated fiber.

Figure 24:
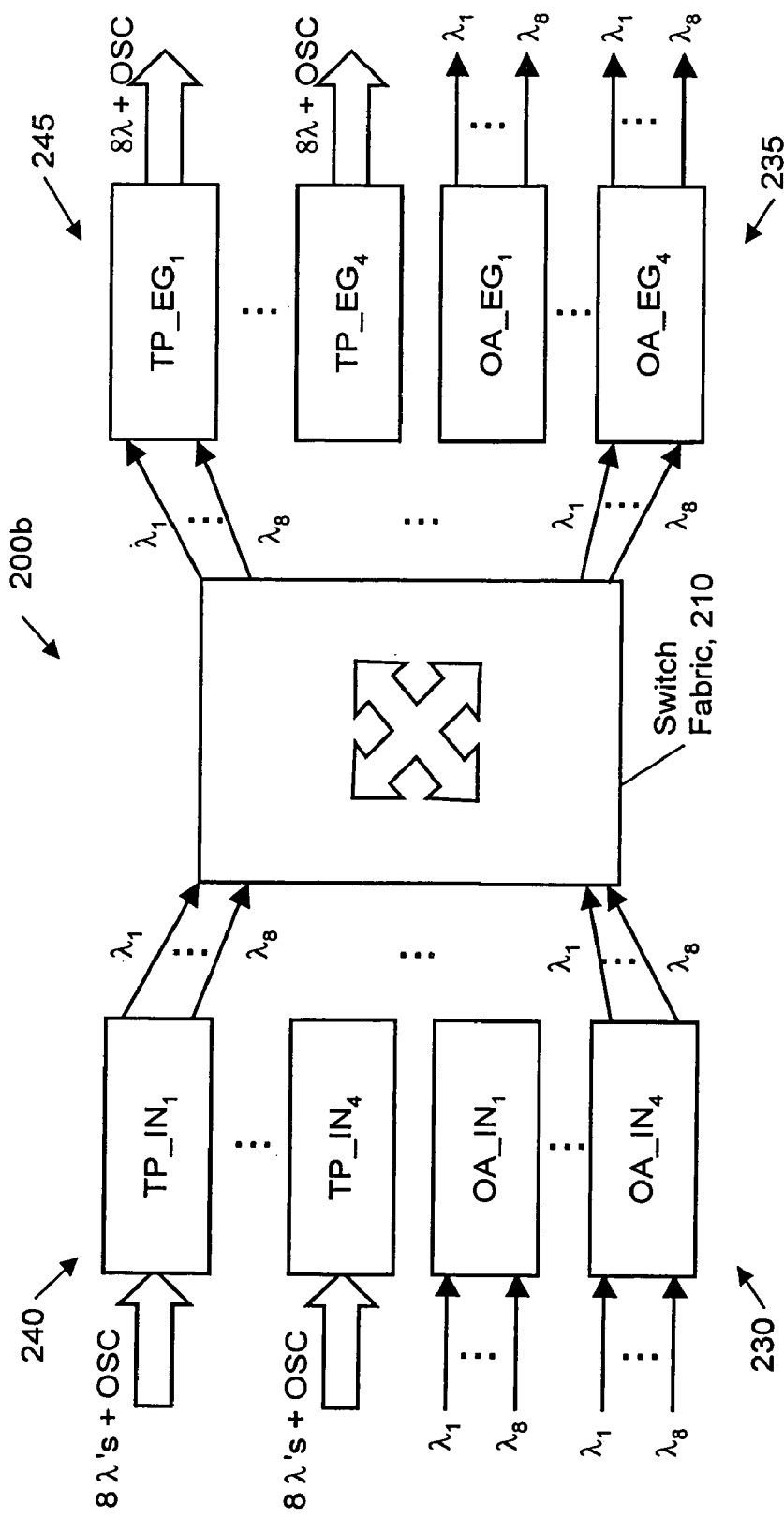
FIG. 24 illustrates an optical add/drop multiplexer configuration with compliant wavelengths in accordance with the present invention.

FIG. 24 shows the modules used for the OADM configuration when the incoming optical signals are compliant, e.g., with the ITU grid. In this case, the access line modules are not needed since the wavelengths are input directly from the access network to the OA_In cards. Here, the OTS 200*b* includes the TP_In modules 240, the TP_Eg modules 245, the OA_In modules 230, and the OA_Eg modules 235. Note that the OA_In and OA_Eg cards are typically provided in pairs to provide bi-directional signaling.

Figure 25:
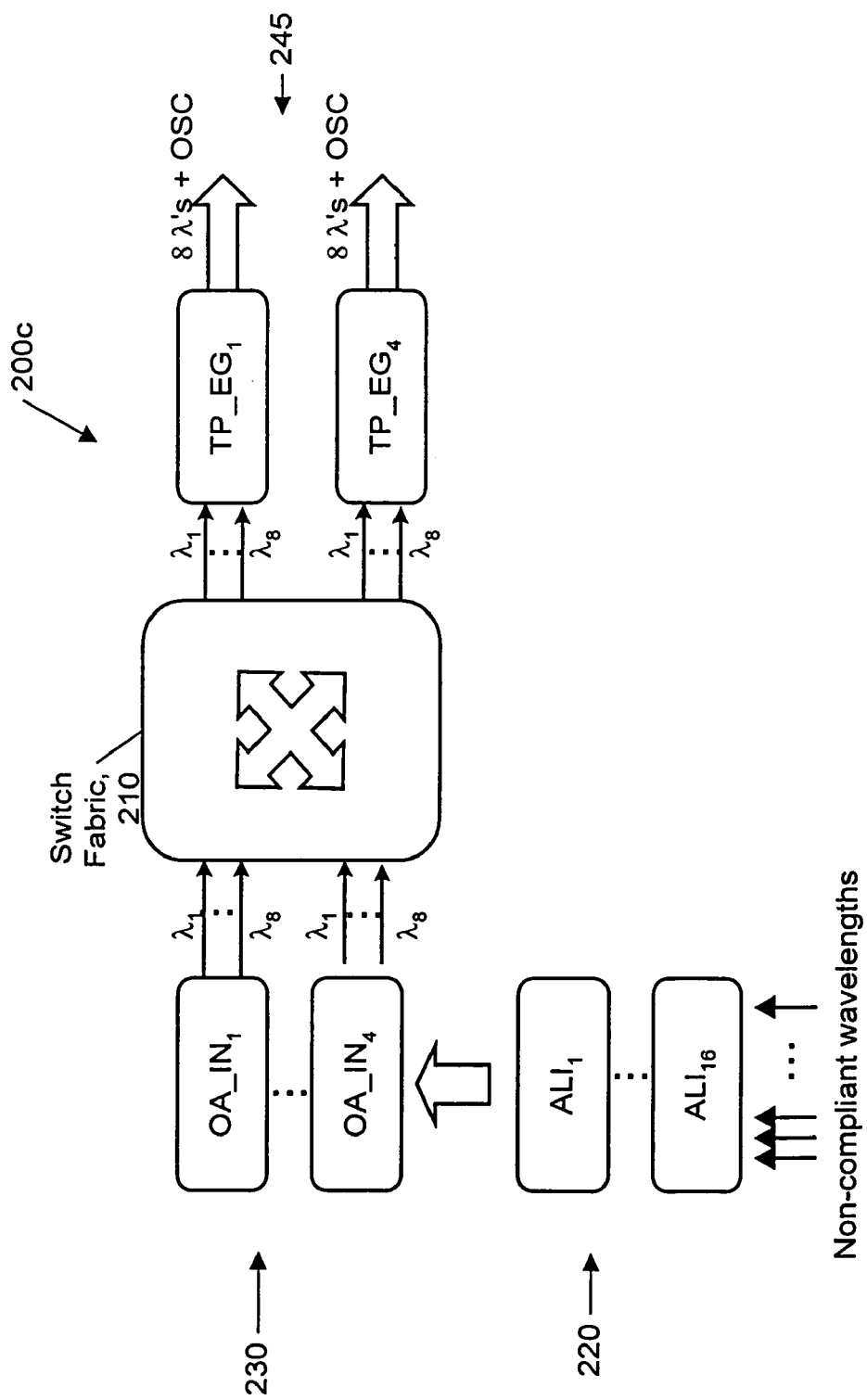
FIG. 25 illustrates an optical add multiplexer configuration in accordance with the present invention.
Figure 26:
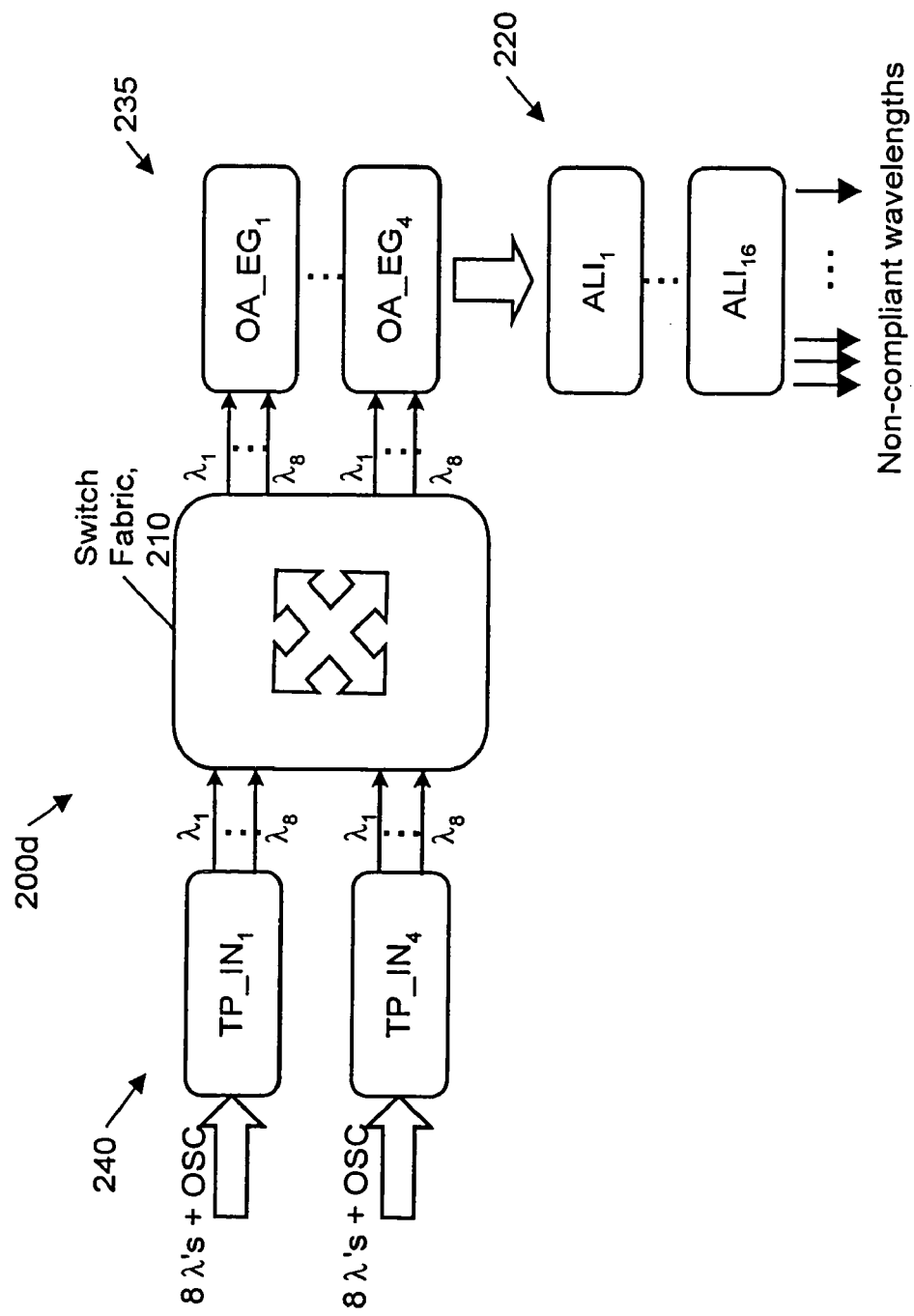
FIG. 26 illustrates an optical drop multiplexer configuration in accordance with the present invention.

FIGS. 25 and 26 show the OTS configurations when non-compliant wavelengths are used. The non-compliant wavelengths may include, e.g., eight OC-12 wavelengths and eight OC-48 wavelengths. In FIG. 25, in an add only multiplexing configuration, the OTS 200*c* uses the ALI modules 220 for converting the non-compliant wavelengths to compliant wavelengths, e.g., using any known wavelength conversion technique. The OA_In modules 230 receive the compliant wavelengths from the ALIs 220 and provide them to the switch fabric 210. The switched signals are then provided to the TP_Eg modules 245 for transport on optical fibers in the optical network. Note that, typically, bidirectional signaling is provided to/from the access network via the ALI cards. Thus, the processes of FIGS. 25 and 26 may occur at the same time via one or more ALI cards.

In FIG. 26, in a drop-only multiplexing configuration, the OTS 200*d* includes the TP_In module 240 for receiving the optical signal via the optical network, the OA Eg modules 235 for receiving the optical signals from the switch 210, and the ALI modules 220 for converting the compliant wavelengths to non-compliant wavelengths for use by the access network. The non-compliant wavelengths may be provided as, e.g., eight OC-12 wavelengths and eight OC-48 wavelengths.

For concurrent add and drop multiplexing of non-compliant signals, the ALI modules both provide inputs to the OA_In modules 230, and receive outputs from the OA_Eg modules 245.

Similarly, any concurrent combination of the following is possible: (a) inputting OTS-compliant signals from one or more access networks to the OA_In modules, (b) inputting non-OTS-compliant signals from one or more access networks to the ALI modules, (c) outputting signals, which are both OTS— and access-network compliant, from the OA_Eg modules to one or more access networks, and (d) outputting signals, which are OTS-compliant but non-compliant with an access network, to the ALI modules.

15. Transparent Data Transfer

A primary service enabled by the present invention is a transparent circuit-switched light path. Compared to conventional services, these flows are distinguished by a large quantity of bandwidth provided, and a setup time measured in seconds.

Figure 27:
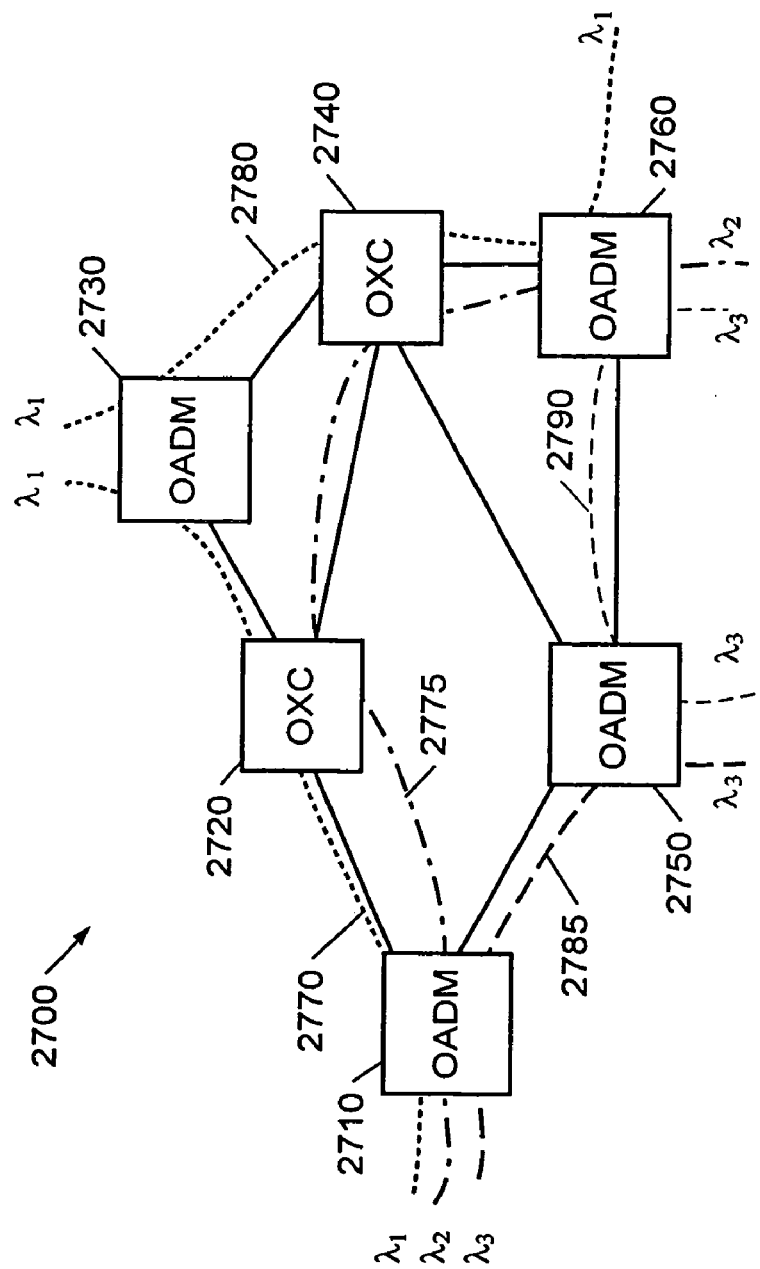
FIG. 27 illustrates an example data flow through optical switches, including add/drop multiplexers and wavelength cross-connects, in accordance with the present invention.

FIG. 27 shows a simple example of wavelength adding, dropping, and cross-connection. Generally, in an example network 2700, light paths are terminated at the OADMs 2710, 2730, 2750 and 2760 (at edge nodes of the network 2700), and switched through the OXCs 2720 and 2740 (at internal nodes of the network 2700). When no wavelength conversion is performed in the OXCs, the same wavelength carrying the light path is used on all links comprising the light path, but the wavelength can be reused on different links. For example, $\lambda 1$ can be used in light paths 2770 and 2780, $\lambda 2$ can be used in light path 2775, and $\lambda 3$ can be used in light paths 2785 and 2790.

From a user perspective, this transparent data transfer service is equivalent to a dedicated line for SONET services, and nearly equivalent to a dedicated line for GbE services. Since the OTS operation is independent of data rate and protocol, it does not offer a Quality of Service in terms of bit error rate or delay. However, the OTS may monitor optical signal levels to ensure that the optical path signal has not degraded. Also, the OTS may perform dynamic power equalization of the optical signals, and dynamic suppression of optical power transients of the multi-wavelength signal independently of the number of the surviving signals, and independently of the number of the added signals. The OTS may thus measure an Optical Quality of Service (OQoS) based on optical signal-to-noise ratio (OSNR), and wavelength registration.

Table 3 provides a summary of transparent data transfer functions performed by the OTS for each type of interface. The simplest case is the receipt of a compliant OC-12/48 signal by the Optical Access module.

TABLE 3

| Line Interface | Functions |
| --- | --- |
| Compliant Optical (SONET) | Channel Multiplexing/Demultiplexing<br>Signal Amplification<br>Switching/Cross-Connection |
| GbE | Packet Multiplexing/Demultiplexing<br>Aggregation/Grooming<br>SONET Framing<br>Modulation/Demodulation<br>O-E Conversion on input<br>E-O Conversion on output<br>Channel Multiplexing/Demultiplexing<br>Signal Amplification<br>Switching/Cross-Connection |
| Non-compliant Optical Waveforms | O-E-O translation from non-compliant wavelength (e.g., 1310 nm)<br>Aggregation/Grooming<br>Retiming/Reshaping<br>Channel Multiplexing/Demultiplexing<br>Signal Amplification<br>Switching/Cross-Connection |

The signal shaping and timing may be performed on the ALI cards using on-off keying with Non-Return-to-Zero signaling.

In one possible embodiment, eight compliant waveforms are supported based on the ITU-specified grid, with 200 Ghz or 1.6 nm spacing, shown in Table 4. These are eight wavelengths from the ITU grid.

TABLE 4

| Wavelength # | Wavelength registration |
| --- | --- |
| 1 | 1549.318 nm |
| 2 | 1550.921 nm |
| 3 | 1552.527 nm |
| 4 | 1554.137 nm |
| 5 | 1555.750 nm |
| 6 | 1557.366 nm |
| 7 | 1558.986 nm |
| 8 | 1560.609 nm |

For compliant wavelengths received on the OA modules, the received signal is optically amplified and switched to the destination.

For non-compliant wavelengths, signals are converted to electrical form and are groomed. If the current assignment has several lower rate SONET input streams, e.g., OC-12, going to the same destination, the ALI can groom them into one higher rate stream, e.g., OC-48. After being switched to the destination port, the stream is multiplexed by a TP module onto a fiber with other wavelengths for transmission. Moreover, for non-compliant wavelengths, the OTS performs a wavelength conversion to an ITU wavelength, and the stream is then handled as a compliant stream. Conversion of optical signals from legacy networks to ITU-compliant wavelengths listed in Table 4 may be supported.

FIG. 28 illustrates Gigabit Ethernet networks accessing a managed optical network in accordance with the present invention.

The GbE interface supports the fiber media GbE option, where the media access control and multiplexing are implemented in the electrical domain. Therefore, the flow is somewhat different from SONET. The GbE packetized data streams are received as Ethernet packets, multiplexed into a SONET frame, modulated (initial timing and shaping), and converted to a compliant wavelength. After the compliant wavelengths are formed, they are handled as compliant wavelength streams as described above.

The following example clarifies how Ethernet packets are handled. GbE1 2802, GbE2 2804, GbE3 2806, GbE4 2808, GbE5 2840, GbE6 2842, GbE7 2844 and GbE8 2846 are separate LANs. Typically, each of the active ports are going to a different destination, so dedicated wavelengths are assigned. If two or more GbE ports have the same destination switch, they may be multiplexed onto the same wavelength. In this example, each of four GbE ports are transmitted to the same destination (i.e., OADM B 2830) but to separate GbE LANs (GbE1 is transmitted to GbE5, GbE2 is transmitted to GbE6, etc.). The client can attach as many devices to the GbE as desired, but their packets are all routed to the same destination.

In this case, the processing flow proceeds as follows. First, the OADM A 2810 receives GbE packets on GbE1 2802, GbE2 2804, GbE3 2806, and GbE4 2808. The OADM A 2810 performs O-E conversion and multiplexes the packets into SONET frames at the ALI/OA function 2812. OADM A 2810 performs the E-O conversion at the assigned $\lambda$, also at the ALI/OA function 2812. The resulting optical signal is switched through the switch fabric (SW) 2814 to the transport module (egress portion) 2816, and enters the network 2820. The optical signal is switched through the optical network 2820 to the destination switch at OADM B 2830. At the OADM B 2830, the optical signal is received at the transport module (ingress portion) 2832, and switched through the switch fabric 2834 to the OA_Eg/ALI function 2836. The OADM B 2830 extracts the GbE packets from the SONET frame at the OA/ALI function 2836. Finally, the OADM B 2830 demultiplexes the packets in hardware at the OA/ALI function 2836 to determine the destination GbE port and transmits the packet on that port.

Since the ALI 2812 in the OADM A 2810 may receive packets on different ports at the same time, the ALI buffers one of the packets for transmission after the other. However, appropriate hardware can be selected for the ALI such that the queuing delays incurred are negligible and the performance appears to be like a dedicated line.

Note that, in this example, all GbE ports are connected to the same ALI. However, by bridging the Ethernets, the service provider can configure the traffic routing within the GbE networks to ensure that traffic going to the same destination is routed to the same input GbE port on the optical switch. Multiplexing GbE networks attached to different ALIs is also possible.

Refer also to FIG. 15 and the related discussion.

The QoS in terms of traditional measures is not directly relevant to the optical network. Instead, the client (network operator) may control these performance metrics. For example, if the client expects that the GbE ports will have a relatively modest utilization, the client may choose to assign four ports to a single OC-48 λ operating at 2.4 Gbps (assuming they all have the same destination port). In the worst case, the λ channel may be oversubscribed, but for the most part, its performance should be acceptable.

However, some QoS features can be provided on the GbE ALI cards. For example, instead of giving all of GbE streams equal priority using round robin scheduling, weighted fair queuing may be used that allows the client to specify the weights given to each stream. In this way, the client can control the relative fraction of bandwidth allocated to each stream.

Similarly, for ATM, the client may be operating a mix of CBR, VBR, ABR, and UBR services as inputs to the OADM module. However, the switching system does not distinguish the different cell types. It simply forwards the ATM cells as they are received, and outputs them on the port as designated during setup.

Figure 29:
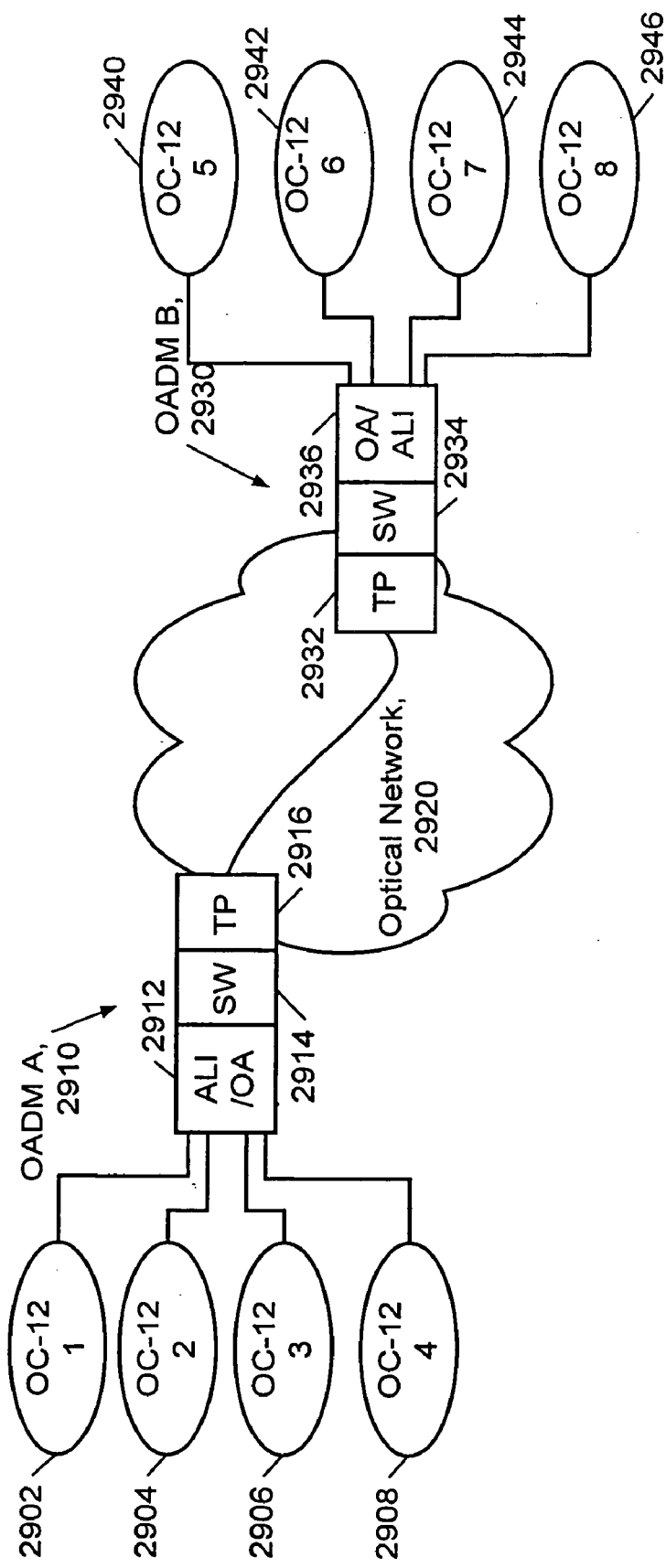
FIG. 29 illustrates SONET networks accessing a managed optical network in accordance with the present invention.

FIG. 29 shows an example of interconnectivity of the optical network with OC-12 legacy networks. Other OC-n networks may be handled similarly. Refer also to FIGS. 16–18 and the related discussions. The example shows four OC-12 networks 2902, 2904, 2906 and 2908, connected to the optical network 2920 through the OC-12 ALI card 2912. Similarly, four OC-12 networks 2940, 2942, 2944 and 2946 are connected to the OC-12 ALI card 2936 at the OADM B 2930.

In the example, the processing flow proceeds as follows. First, the OADM A 2910 receives packets on OC-12 1 (2902), OC-12 2 (2904), OC-12 3 (2906), and OC-12 4 (2908). The OADM A 2910 multiplexes the packets into SONET frames at OC-48 at the ALI/OA module 2912 using TDM. For compliant wavelengths, OC-n uses only the OA portion, not the ALI portion. For non-compliant wavelengths, the ALI is used for wavelength conversion, through an O-E-O process, then the OA is used for handling the newly-compliant signals. The resulting optical signal is switched through the switch fabric (SW) 2914 to the transport module (egress portion) (TP) 2916, and enters the network 2920. The optical signal is switched through the optical network 2920 to the destination switch at OADM B 2930. At the OADM B 2930, the optical signal is received at the transport module (ingress portion) 2932, and switched through the switch fabric (SW) 2934 to the OA/ALI function 2936. The OADM B 2930 extracts the packets from the SONET frame at the OA/ALI function 2936. The OADM B 2930 demultiplexes the packet in hardware at the OA/ALI function 2936 to determine the destination port, and transmits the packet on that port.

16. Routing and Wavelength Assignment

Figure 31:
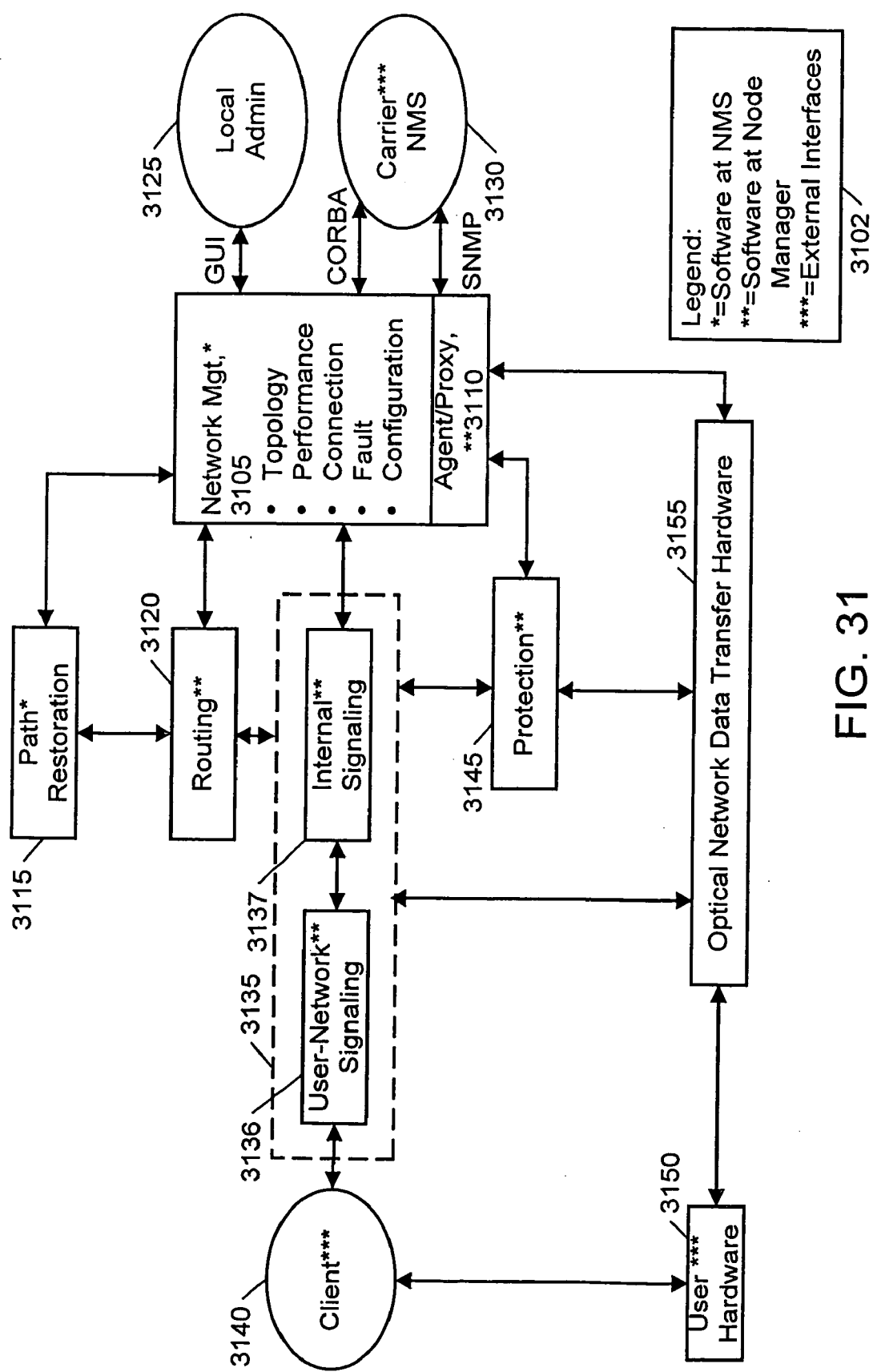
FIG. 31 illustrates a system functional architecture in accordance with the present invention.

The routing block 3120 of FIG. 31 refers to a Routing and Wavelength Assignment (RWA) function that may be provided as software running on the NMS for selecting a path in the optical network between endpoints, and assigning the associated wavelengths for the path. For implementations where the OTS does not provide wavelength conversion, the same wavelength is used on each link in the path, i.e., there is wavelength continuity on each link.

A "Light Wave OSPF" approach to RWA, which is an adaptive source based approach based on the Open Shortest Path First (OSPF) routing as enhanced for circuit-switched optical networks, may be used. Developed originally for (electrical) packet networks, OSPF is a link state algorithm that uses link state advertisement (LSA) messages to distribute the state of each link throughout the network. Knowing the state of each link in the network, each node can compute the best path, e.g., based on OSPF criteria, to any other node. The source node, which may be the Node Manager associated with the path tail, computes the path based on the OSPF information.

OSPF is particularly suitable for RWA since it is available at low risk, e.g., easily extended to support traffic engineering and wavelength assignment, scalable, e.g., able to support large networks using one or two levels of hierarchies, less complex than other candidate techniques, and widely commercially accepted.

Several organizations have investigated the enhancement of OSPF to support optical networks and several alternative approaches have been formulated. The major variation among these approaches involves the information that should be distributed in the LSA messages. As a minimum, it is necessary to distribute the total number of active wavelengths on each link, the number of allocated wavelengths, the number of pre-emptable wavelengths, and the risk groups throughout the networks. In addition, information may be distributed on the association of fibers and wavelengths such that nodes can derive wavelength availability. In this way, wavelength assignments may be made intelligently as part of the routing process. The overhead incurred can be controlled by "re-advertising" only when significant changes occur, where the threshold for identifying significant changes is a tunable parameter.

Furthermore, the optical network may support some special requirements. For example, in the ODSI Signaling Control Specification, the client may request paths that are disjoint from a set of specified paths. In the Create Request, the client provides a list of circuit identifiers and request that the new path be disjoint from the path of each of these paths. When the source node determines the new path, the routing algorithm must specifically exclude the links/switches comprising these paths in setting up the new path.

It is expected that the light paths will be setup and remain active for an extended period of time. As a result, the incremental assignment of wavelengths may result in some inefficiency. Therefore, it may improve performance to do periodic re-assignments.

17. Flash Memory Architecture

Flash memory is used on all controllers for persistent storage. In particular, the Node Manager flash memory may have 164 Mbytes while LCM flash memories may have 16 Mbytes. The Intel 28F128J3A flash chip, containing 16 Mbytes, may be used as a building block. Designing flash memory into both controllers obviates the need for ROM on both controllers. Both controllers boot from their flash memory. Should either controller outgrow its flash storage, the driver can be modified to apply compression techniques to avoid hardware modifications.

The flash memory on all controllers may be divided into fixed partitions for performance. The Node Manager may have five partitions, including (1) current version Node Manager software, (2) previous version (rollback) Node Manager software, (3) LCM software, (4) Core Embedded software data storage, and (5) application software/data storage.

The LCM may have 3 partitions, including (1) LCM software, (2) previous version (rollback) LCM software, and (3) Core Embedded software data storage.

The flash memory on both the Node Manager and LCM may use a special device driver for read and write access since the flash memory has access controls to prevent accidental erasure or reprogramming.

For write access, the flash driver requires a partition ID, a pointer to the data, and a byte count. The driver first checks that the size of the partition is greater than or equal to the size of the read buffer, and returns a negative integer value if the partition is too small to hold the data in the buffer. The driver then checks that the specified partition is valid and, if the partition is not valid, returns a different negative integer. The driver then writes a header containing a timestamp, checksum, and user data byte count into the named partition. The driver then writes the specified number of bytes starting from the given pointer into the named partition. The flash driver returns a positive integer value indicating the number of user data bytes written to the partition. If the operation fails, the driver returns a negative integer value indicating the reason for failure (e.g., device failure).

For read access, the flash driver requires a partition ID, a pointer to a read data buffer, and the size of the data buffer. The driver checks that the size of the read buffer is greater than or equal to the size of the data stored in the partition (size field is zero if nothing has been stored there). The driver returns a negative integer value if the buffer is too small to hold the data in the partition. The driver then does a checksum validation of the flash contents. If checksum validation fails, the driver returns a different negative integer. If the checksum validation is successful, the driver copies the partition contents into the provided buffer and return a positive integer value indicating the number of bytes read. If the operation fails, the driver returns a negative integer value indicating the reason for failure (e.g., device failure).

18. Hierarchical Optical Network Structure

The all-optical network architecture is based on an open, hierarchical structure to provide interoperability with other systems and accommodate a large number of client systems.

Figure 30:
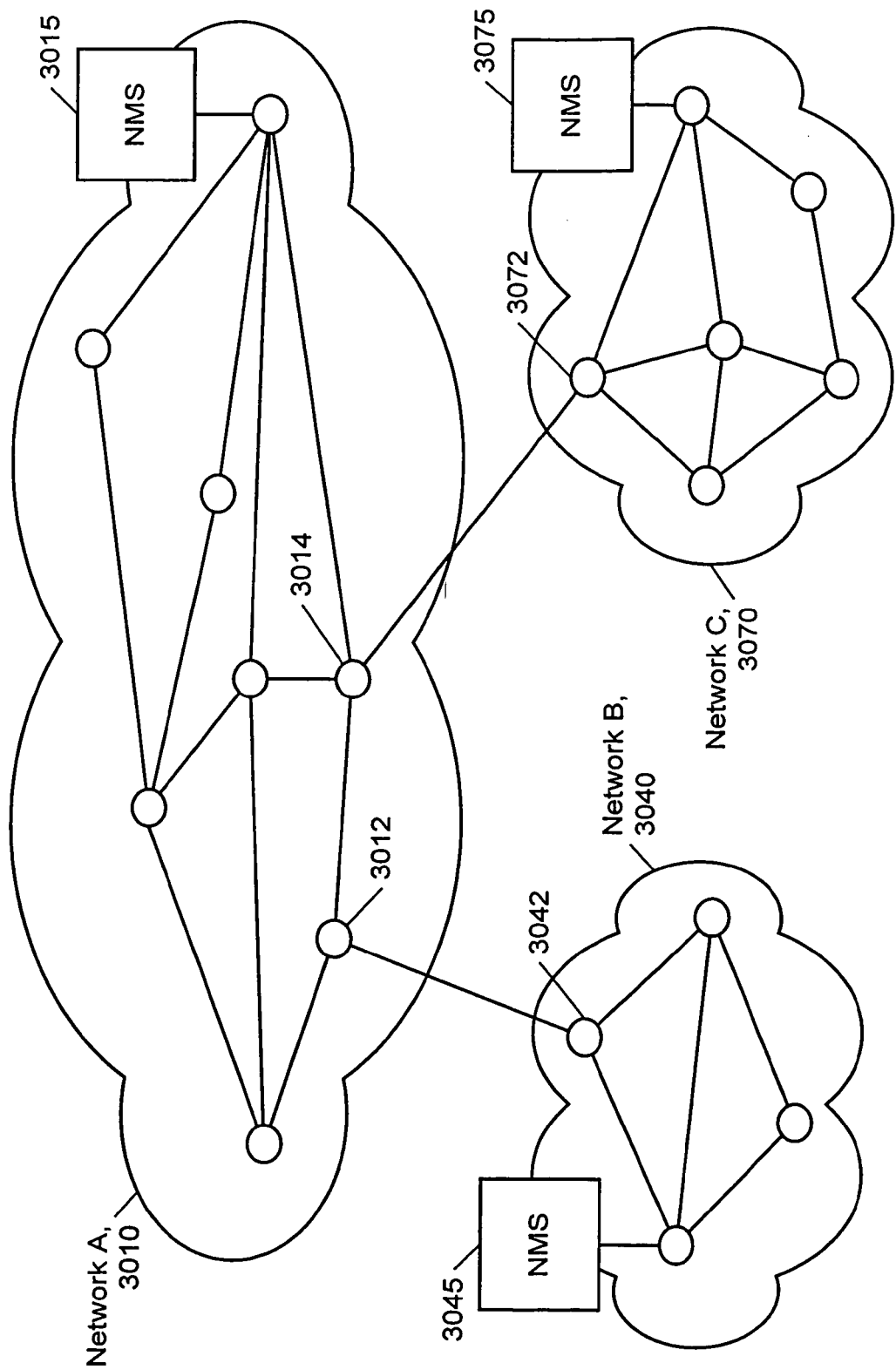
FIG. 30 illustrates a hierarchical optical network structure in accordance with the present invention.

FIG. 30 depicts the hierarchical structure of the all-optical network architecture for a simple case with three networks, network A 3010, network B 3040 and network C 3070. Typically, a network is managed by a three-tiered control architecture: i) at the highest level a leaf NMS manages the multiple OTSs of its network, ii) at the middle level each OTS is managed individually by its associated Node Manager, and iii) at the lowest level each line card of a node (except the Node Manager) is managed by an associated Line Card Manager.

The nodes, such as nodes 3012, 3014, 3042 and 3072 depict the optical switching hardware (the OTSs). Moreover, network A 3010 and network B 3040 communicate with one another via OTSs 3012 and 3042, and network A 3010 and network C 3040 communicate with one another via OTSs 3014 and 3072. In this example, each network has its own NMS. For example, network A 3010 has an NMS 3015, network B 3040 has an NMS 3045, and network C 3070 has an NMS 3075.

When multiple NMSs are present, one is selected as a master or root NMS. For example, the NMS 3015 for Network A 3010 may be the root NMS, such that the NMSs 3045 and 3075 for Networks B and C, respectively, are subservient to it.

Each NMS includes software that runs separate and apart from the network it controls, as well as NMS agent software that runs on each Node Manager of the NMS's network. The NMS agent software allows the each NMS to communicate with the Node Managers of each of its network's nodes.

Moreover, each NMS may use a database server to store persistent data, e.g., longer-life data such as configuration and connection information. The database server may use LDAP, and Oracle® database software to store longer-life data such as configuration and connection information.

LDAP is an open industry standard solution that makes use of TCP/IP, thus enabling wide deployment. Additionally, a LDAP server can be accessed using a web-based client, which is built into many browsers, including the Microsoft Explorer® and Netscape Navigator® browsers. The data can be stored in a separate database for each instance of a network, or multiple networks can share a common database server depending on the size of the network or networks. As an example, separate databases can be provided for each of networks A, B and C, where each database contains information for the associated network, such as connection, configuration, fault, and performance information. In addition, the root NMS (e.g., NMS 3015) can be provided with a summary view of the status and performance data for Networks B and C.

The hierarchical NMS structure is incorporated into the control architecture as needed.

19. System Functional Architecture

The functionality provided by the OTS and NMS, as well as the external network interfaces are shown in FIG. 31. As indicated by the legend 3102, the path restoration 3115 and network management 3105 functionalities are implemented in the NMS, while the routing 3120, signaling 3135 including user-network signaling 3136 and internal signaling 3137 (internal to the network), agent/proxy 3110, and protection 3145 are real-time functionalities implemented in the Node Manager.

External interfaces to the optical network system include: (1) a client system 3140 requesting services, such as a light path, from the optical network via the UNI protocol, (2) a service provider/carrier NMS 3130 used for the exchange of management information, and (3) a hardware interface 3150 for transfer of data. An interface to a local GUI 3125 is also provided.

The client system 3140 may be resident on the service provider's hardware. However, if the service provider does not support UNI, then manual (e.g., voice or email) requests can be supported. Light path (i.e., optical circuit) setup may be provided, e.g., using a signaled light path, a provisioned light path, and proxy signaling. In particular, a signaled light path is analogous to an ATM switched virtual circuit, such that a service provider acts as UNI requestor and sends a "create" message to initiate service, and the Optical Network Controller (ONC) invokes NNI signaling to create a switched lightpath. A provisioned lightpath is analogous to an ATM permanent virtual circuit (PVC), such that a service provider via the NMS requests a lightpath be created (where UNI signaling is not used), and the NMS commands the switches directly to establish a lightpath. The NMS can also use the services of a proxy signaling agent to signal for the establishment of a lightpath.

The service provider/carrier NMS interface 3130 enables the service provider operator to have an integrated view of the network using a single display. This interface, which may be defined using CORBA, for instance, may also be used for other management functions, such as fault isolation.

The local GUI interface 3125 allows local management of the optical network by providing a local administrator/network operator with a complete on-screen view of topology, performance, connection, fault and configuration management capabilities and status for the optical network.

The control plane protocol interface between the service provider control plane and the optical network control plane may be based on an "overlay model" (not to be confused with an overlay network used by the NMS to interface with the nodes), where the optical paths are viewed by the service provider system as fibers between service provider system endpoints. In this model, all of the complexities of the optical network are hidden from the user devices. Thus, the routing algorithm employed by the optical network is separate from the routing algorithms employed by the higher layer user network. The internal optical network routing algorithm, internal signaling protocols, protection algorithms, and management protocols are discussed in further detail below. The all-optical network based on the OTS may be modified from the "overlay model" architecture to the "peer model" architecture, where the user device is aware of the optical network routing algorithm and the user level. The optical network and user network routing algorithms are integrated in the "peer model" architecture.

20. Internal Network Signaling 20.1 Protocol Description

The Internal Signaling function 3137 of FIG. 31 uses a Network-Network Interface (NNI) protocol for internal network signaling or for signaling between private networks. The NNI may be specified by extending the UNI protocol (ATM Forum 3.1 Signaling Protocol) by specifying additional messages fields, states, and transitions. UNI is a protocol by which an external network accesses an edge OTS of the optical network.

For example, the NNI may include a path Type-Length-Value field in its "create" message. It may also have to support a crankback feature in case the setup fails. The major requirements for the NNI are listed below.

| Capability | Description |
| --- | --- |
| Create light path | Normal and crankback |
| Modify light path | Change bandwidth parameters |
| Disjoint light path | Establish light path disjoint from specified existing light paths |
| Destroy light path | Teardown channel |
| Failure Recovery | Link or node failure |
| Traffic Pre-emption | Terminate low priority traffic in case of failure |

-continued

| Capability | Description |
| --- | --- |
| Backup | Establish pre-defined backup links |
| NMS Interface | Set MIB variables |
| External Network Interface | Backbone Network Interconnection |

20.2 Signaling Subnetwork (OSC)

The primary function of the signaling network is to provide connectivity among the Node Managers of the different OTSs. An IP network may be used that is capable of supporting both signaling as well as network management traffic. For signaling messages, TCP may be used as the transport protocol. For network management, either TCP or UDP may be used, depending upon the specific application.

Figure 32:
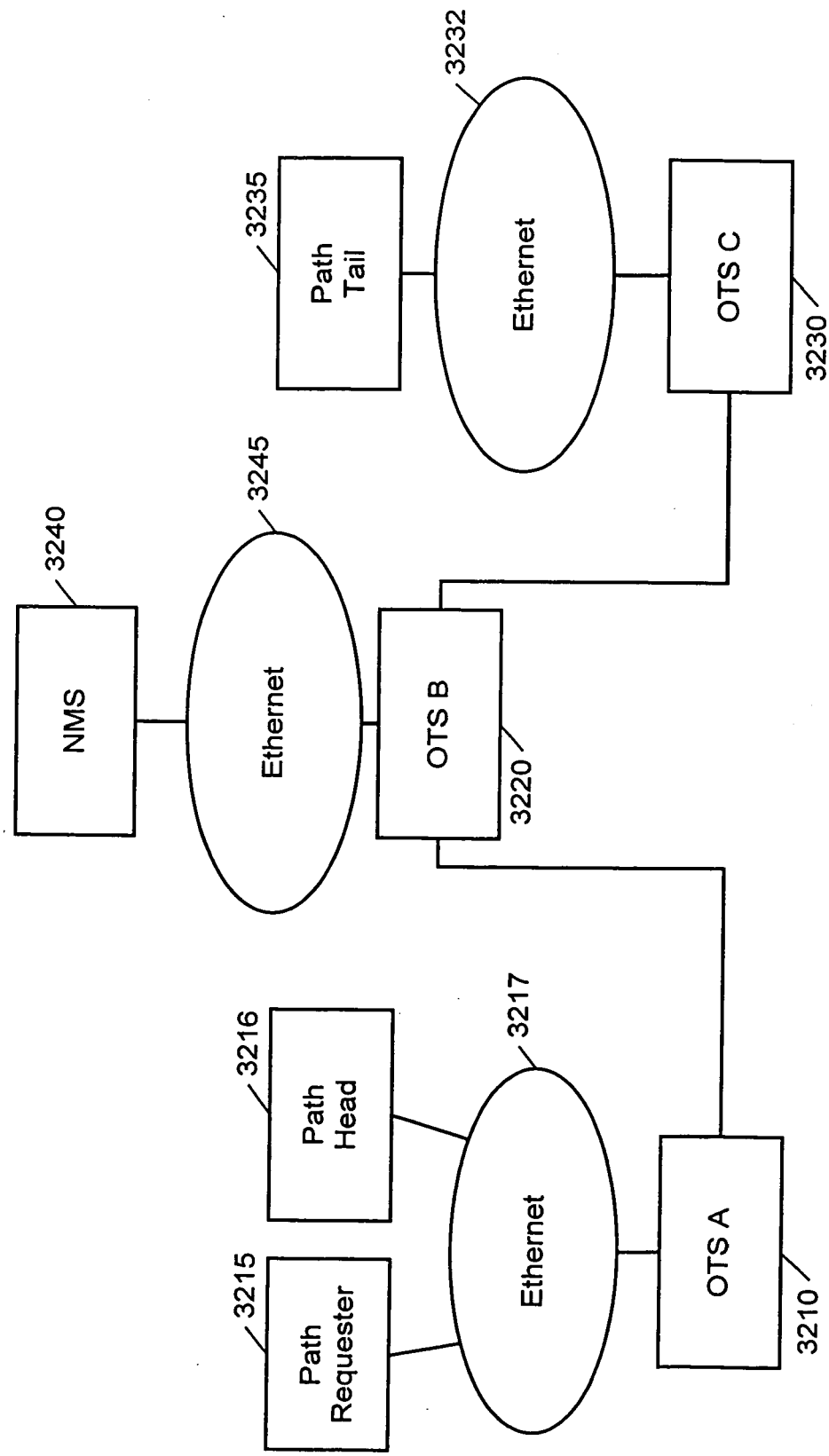
FIG. 32 illustrates network signaling in accordance with the present invention.

FIG. 32 depicts an example of a signaling network having three OTSs, OTS A (3210), OTS B (3220), and OTS C (3230), an NMS 3240 that communicates with OTS B 3220 (and all other OTSs via OTS B) via an Ethernet 3245, a path requester 3215 and path head 3216 that communicate with the OTS A 3210 via an Ethernet 3217, and a path tail 3235 that communicates with the OTS C 3230 via an Ethernet 3232. The path requester 3215, path head 3216 and path tail 3235 denote client equipment that is external to the all-optical network. The internal signaling network may use the OSC within the optical network, in which case the facilities are entirely within the optical network and dedicated to the signaling and management of the optical network. The OSC is not directly available to external client elements.

Each Node Manager may have its own Ethernet for local communication with the client equipment. Also, a gateway node may have an additional Ethernet link for communication with the NMS manager if they are co-located. The signaling network has its own routing protocol for transmission of messages between OTSs as well as within an NMS. Moreover, for fail-safe operation, the signaling network may be provided with its own NMS that monitors the status and performance of the signaling network, e.g., to take corrective actions in response to fault conditions, and generate performance data for the signaling network.

21. Protection/Restoration Flow

Referring to the Path Restoration function 3115 and Protection function 3145 of FIG. 31, the all-optical network may provide a service recovery feature in response to failure conditions. Both line and path protection may be provided such that recovery can be performed within a very short period of time comparable to SONET (<50 ms). In cases where recovery time requirements are less stringent, path restoration under the control of the NMS may provide a more suitable capability.

Moreover, for SONET clients, client-managed protection may be provided by allowing the client to request disjoint paths, in which case the protection mechanisms utilized by the client are transparent to the optical network.

The recovery capability may include 1:1 line protection by having four optical fibers between OTSs—a primary and a backup in each direction. When a link or node fails, all paths in the affected link are re-routed (by pre-defined links) as a whole (e.g., on a line basis) rather than by individual path (e.g., on a path basis). While this is less bandwidth efficient, it is simpler to implement than path protection and is equivalent to SONET layer services. The re-routing is predefined via Network Management in a switch table such that when a failure occurs, the re-routing can be performed in real-time (<50 ms per hop).

Path protection re-routes each individual circuit when a failure occurs. Protection paths may be dedicated and carry a duplicate data stream (1+1), dedicated and carry a pre-emptable low priority data stream (1:1), or shared (1:N).

FIGS. 33(a)–(c) compare line and path protection where two light paths, shown as $\lambda_1$ and $\lambda_2$, have been setup. FIG. 33(a) shows the normal case, where two signaling paths are available between nodes "1" and "6" (i.e., path 1-2-4-5-6 and path 1-2-3-5-6). $\lambda_1$ traverses nodes 1-2-3-5-6 in travelling toward its final destination, while $\lambda_2$ traverses nodes 1-2-3 in travelling toward its final destination.

FIG. 33(b) shows the case where line protection is used. In particular, consider the case where link 2-3 fails. With line protection, all channels affected by the failure are re-routed over nodes 2-4-5-3. In particular, $\lambda_1$ is routed from node 5-3, and then back from 3-5-6, which is inefficient since $\lambda_1$ travels twice between nodes "3" and "5", thereby reducing the availability of the 3-5 path for backup traffic.

FIG. 33(c) shows the case where path protection is used. With path protection, the light paths $\lambda_1$ and $\lambda_2$ are each routed separately in an optimum way, which eliminates the inefficiency of line protection. In particular, $\lambda_1$ is routed on nodes 1-2-4-5-6, and $\lambda_2$ is routed on nodes 1-2-4-5-3.

Moreover, the backup fiber (here, the fiber between nodes 2-4-5) need not be used under normal conditions (FIG. 33(a)). However, pre-emptable traffic, e.g., lower priority traffic, may be allowed to use the backup fiber until a failure occurs. Once a failure occurs, the pre-emptable traffic is removed from the backup fiber, which is then used for transport of higher-priority traffic. The client having the lower-priority traffic is preferably notified of the preemption.

Protection and restoration in large complex mesh networks may also be provided. Protection features defined by the ODSI, OIF, and IETF standards bodies can also be included as they become available.

Protection services can also include having redundant hardware at the OTSs, such as for the Node Manager and other line cards. The redundancy of the hardware, which may range from full redundancy to single string operation, can be configured to meet the needs of the service provider. Moreover, the hardware can be equipped with a comprehensive performance monitoring and analysis capability so that, when a failure occurs, a switch over to the redundant, backup component is quickly made without manual intervention. In case of major node failures, traffic can be re-routed around the failed node using line protection.

22. Network Management System Software

The Network Management System is a comprehensive suite of management applications that is compatible with the TMN model, and may support TMN layers 1 to 3. Interfaces to layer 4, service layer management, may also be provided so that customer Operational Support Systems (OSSs) as well as third party solutions can be deployed in that space.

Figure 34:
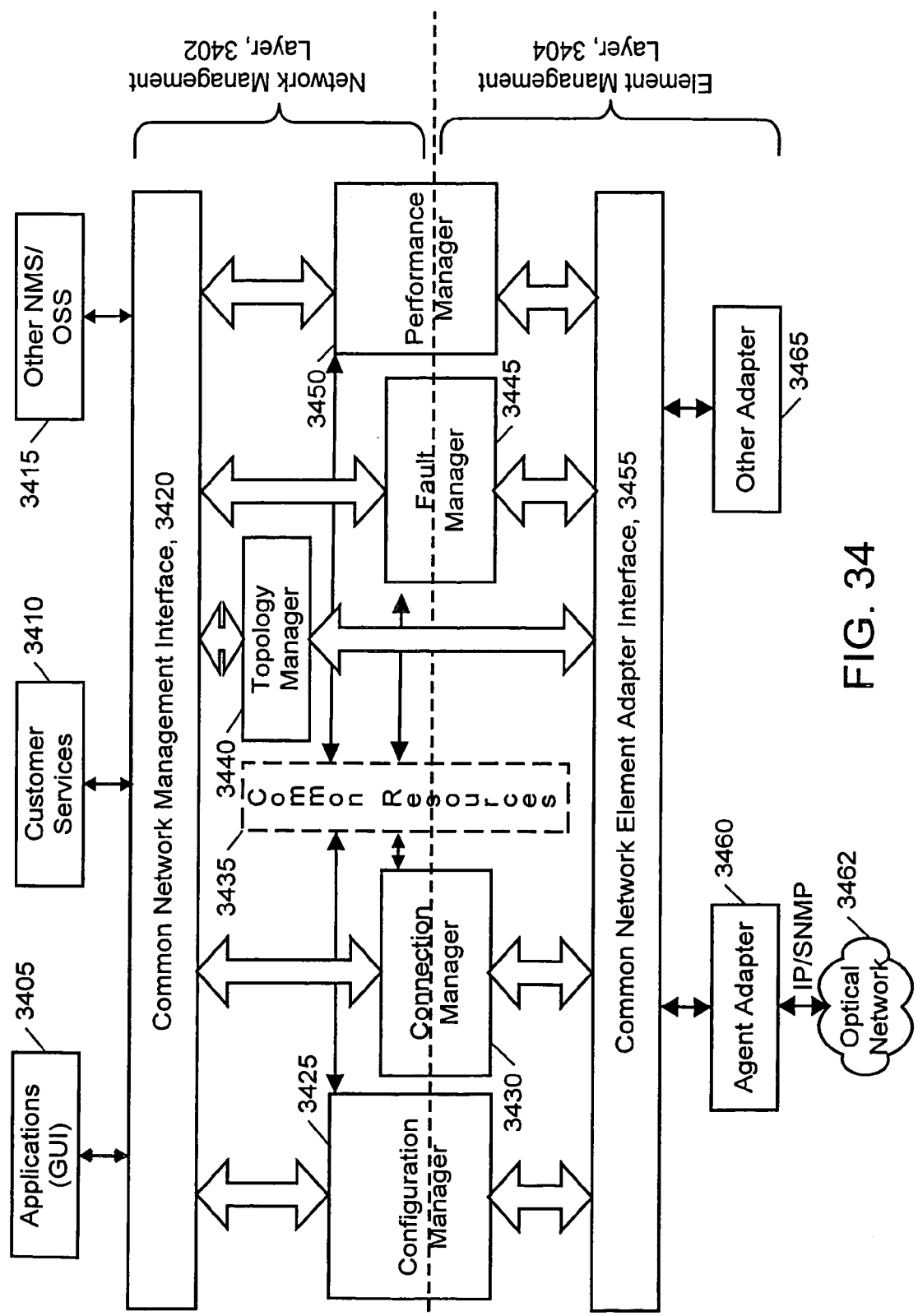
FIG. 34 illustrates a high-level Network Management System functional architecture in accordance with the present invention.

The overall architecture of the NMS is depicted in FIG. 34. The Element Management Layer 3404 corresponds to layer 2 of the TMN model, while the Network Management Layer 3402 components correspond to layer 3 of the TMN model. The functions shown are achieved by software running on the NMS and NMS agents at the Node Managers.

A common network management interface 3420 at the Network Management Layer provides an interface between: (a) applications 3405 (such as a GUI), customer services 3410, and other NMSs/OSSs 3415, and (b) a configuration manager 3425, connection manager 3430, 3440, fault manager 3445, and performance manager 3450, which may share common resources/services 3435, such as a database server, which uses an appropriate database interface, and a topology manager 3440. The database server or servers may store information for the managers 3425, 3430, 3445 and 3450. The interface 3420 may provides a rich set of client interfaces that include RMI, EJB and CORBA, which allow the carrier to integrate the NMS with their systems to perform end-to-end provisioning and unify event information. Third-party services and business layer applications can also be easily integrated into the NMS via this interface. The interface 3420 may be compatible with industry standards where possible.

The GUI 3405 is an integrated set of user interfaces that may be built using Java (or other similar object oriented) technology to provide an easy-to-use customer interface, as well as portability. The customer can select a manager from a menu of available GUI views, or drill down to a new level by obtaining a more detailed set of views.

The customer services may include, e.g., protection and restoration, prioritized light paths, and other services that are typically sold to customers of the network by the network operator.

The "other NMSs" 3415 refer to NMSs that are subservient to a root NMS in a hierarchical optical network structure or an NMS hierarchy. The OSSs are switching systems other than the OTS system described herein.

The configuration manager 3425 provides a switch level view of the NMS, and may provide functions including provisioning of the Node Managers and LCMs, status and control, and installation and upgrade support. The configuration manager 3425 may also enable the user, e.g., via the GUI 3405, to graphically identify the state of the system, boards, and lower level devices, and to provide a point and click configuration to quickly configure ports and place them in service. The configuration manager may collect switch information such as IP address and switch type, as well as card-specific information such as serial number and firmware/software revision.

The connection manager 3430 provides a way to view existing light path connections between OTSs, including connections within the OTS itself, and to create such connections. The connection manager 3430 supports simple cross connects as well as end-to-end connections traversing the entire network. The user is able to dictate the exact path of a light path by manually specifying the ports and cross connects to use at an OTS. Or, the user may only specify the endpoints and let the connection manager set up the connection automatically. Generally, the endpoints of a connection are OA ports, and the intermediate ports are TP ports. The user may also select a wavelength for the connection. The types of connections supported include Permanent Optical Circuit (POC), Switched Optical Circuit (SOC), as well as Smart Permanent Optical Circuit (SPOC). SOC and SPOC connections are routed by the network element routing and signaling planes. SOC connections are available for viewing only.

The topology manager 3440 provides a NMS topological view of the network, which allows the user to quickly determine, e.g., via the GUI 3405, all resources in the network, including links and OTSs in the network, and how they are currently physically connected. The user can use this map to obtain more detailed views of specific portions of the network, or of an individual OTS, and even access a view of an OTS's front panel. For instance, the user can use the topological view to assist in making end-to-end connections, where each OTS or subnet in the path of a connection can be specified. Moreover, while the topology manager 3440 provides the initial view, the connection manager 3430 is called upon to set up the actual connection.

The fault manager 3445 collect faults/alarms from the OTSs as well as other SNMP-compliant devices, and may include functions such as alarm surveillance, fault localization, correction, and trouble administration. Furthermore, the fault manager 3445 can be implemented such that the faults are presented to the user in an easy to understand way, e.g., via the GUI 3405, and the user is able to sort the faults by various methods such as device origination, time, severity, etc. Moreover, the faults can be aggregated by applying rules that are predefined by the network administrator, or customer-defined.

The performance manager 3450 performs processing related to the performance of the elements/OTSs, as well as the network as a whole. Specific functionalities may include performance quality assurance, performance monitoring, performance management control, and performance analysis. An emphasis may be on optical connections, including the QoS and reliability of the connection. The performance manager 3450 allows the user to monitor the performance of a selected port of channel on an OTS. In particular, the performance manager may display data in real-time, or from archived data.

These managers 3425, 3430, 3445 and 3450 may provide specific functionality and share information, e.g., via Jini, and using an associated Jini server. Moreover, the manager may store associated data in one or more database servers, which can be configured in a redundant mode for high availability.

Furthermore, a common network management interface 3455 at the Element Management Layer provides an interface between: (a) the configuration manager 3425, connection manager 3430, fault manager 3445 and performance manager 3450, and (b) an agent adapter function 3460 and an "other adapter" function 3465. The agent adapter 3460 may communicate with the OTSs in the optical network 3462 using SNMP and IP, in which case corresponding SNMP agents and IP agents are provided at the OTSs. The SNMP agent at the OTSs may also interface with other NMS applications. SNMP is an industry standard interface that allows integration with other NMS tools. The interface from the NMS to the OTS in the optical network 3462 may also use a proprietary interface, which allows greater flexibility and efficiency than SNMP alone. The other adapter function 3465 refers to other types of optical switches other than the OTSs described herein that the NMS may manage.

In summary, the NMS provides a comprehensive capability to manage an OTS or a network of OTSs. A user-friendly interface allows intuitive control of the element/OTS or network. Finally, a rich set of northbound interfaces allows interoperability and integration with OSS systems.

Moreover, the NMS may be an open architecture system that is based on standardized Management Information Bases (MIBs). At this time, ODSI has defined a comprehensive MIB for the UNI. However, additional MIBs are required, e.g., for NNI signaling and optical network enhancements to OSPF routing. The NMS of the present invention can support the standard MIBs as they become available, while using proprietary MIBs in areas where the standards are not available.

The NMS may be implemented in Java (or similar object oriented) technology, which allows the management applications to easily communicate and share data, and tends to enable faster software development, a friendlier (i.e., easier to use) user interface, robustness, self-healing, and portability. In particular, Java tools such as Jini, Jiro, Enterprise Java Beans (EJB), and Remote Method Invocation (RMI) may be used.

RMI, introduced in JDK 1.1, is a Java technology that allows the programmer to develop distributed Java objects similar to using local Java objects. It does this by keeping separate the definition of behavior, and the implementation of the behavior. In other words, the definition is coded using a Java interface while the implementation on the remote server is coded in a class. This provides a network infrastructure to access/develop remote objects.

The EJB specification defines an architecture for a transactional, distributed object system based on components. It defines an API that that ensures portability across vendors. This allows an organization to build its own components or purchase components. These server-side components are enterprise beans, and are distributed objects that are hosted in EJB containers and provide remote services for clients distributed throughout the network.

Jini, which uses RMI technology, is an infrastructure for providing services in a network, as well as creating spontaneous interactions between programs that use these services. Services can be added or removed from the network in a robust way. Clients are able to rely upon the availability of these services. The Client program downloads a Java object from the server and uses this object to talk to the server. This allows the client to talk to the server even though it does not know the details of the server. Jini allows the building of flexible, dynamic and robust systems, while allowing the components to be built independently. A key to Jini is the Lookup Service, which allows a client to locate the service it needs.

Jiro is a Java implementation of the Federated Management Architecture. A federation, for example, could be a group of services at one location, i.e., a management domain. It provides technologies useful in building an interoperable and automated distributed management solution. It is built using Jini technology with enhancements added for a distributed management solution, thereby complementing Jini. Some examples of the benefits of using Jiro over Jini include security services and direct support for SNMP.

Figure 35:
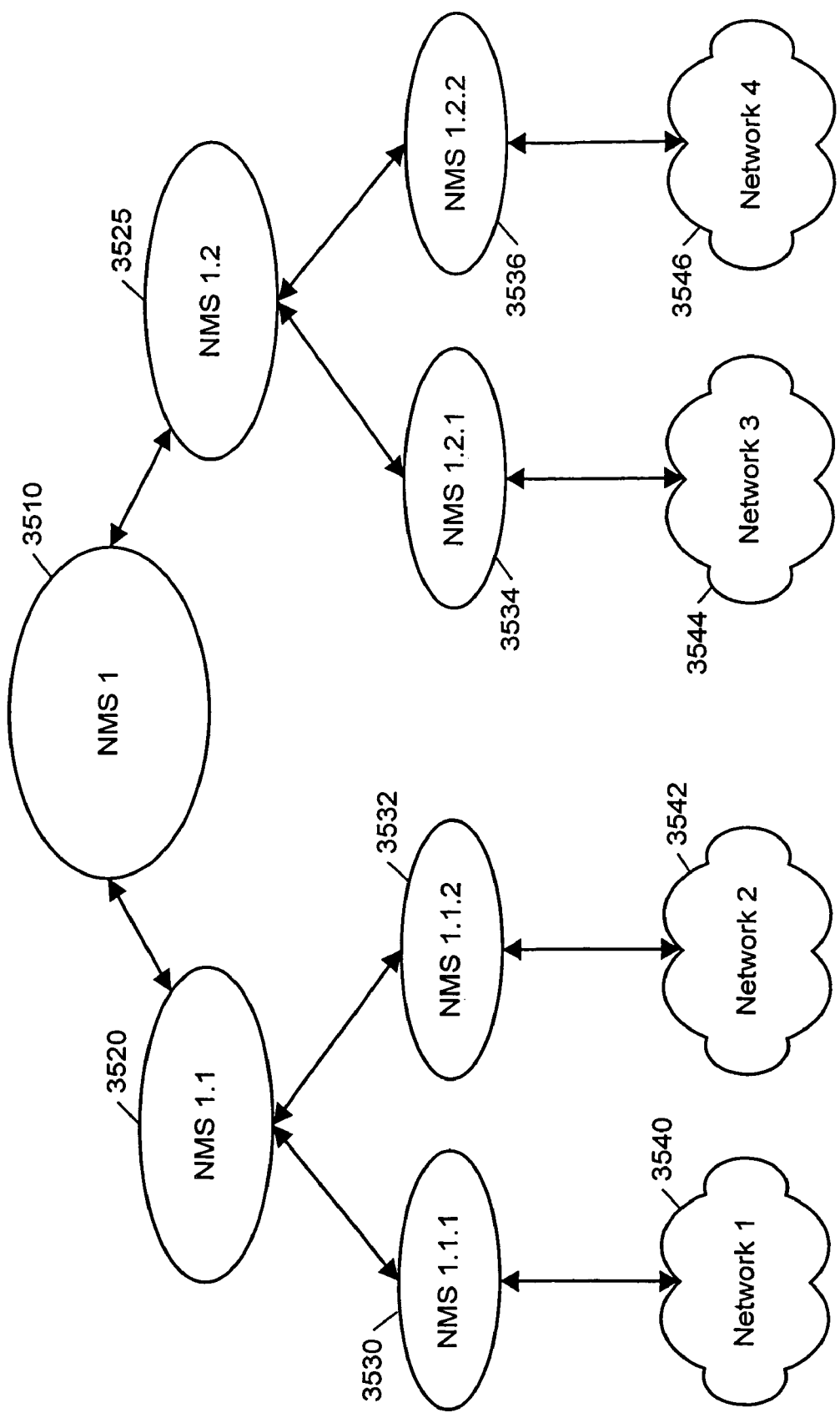
FIG. 35 illustrates a Network Management System hierarchy in accordance with the present invention.

FIG. 35 illustrates an NMS hierarchy in accordance with the present invention. Advantageously, scalability may be achieved via the NMS hierarchical architecture, thus allowing a networks from a few OTSs to hundreds of OTSs to still be manageable and using only the processing power of the necessary number of managing NMSs. In such an architecture, each NMS instance in an NMS hierarchy (which we may also refer to as "manager"), manages a subset of OTSs (with the "root" NMS managing, at least indirectly through its child NMSs, all the OTSs managed by the hierarchy). For example, NMS 1 (3510) manages NMS 1.1 (3520) and NMS 1.2 (3525). NMS 1.1 (3520) manages NMS 1.1.1 (3530), which in turn manages a first network 3540, and NMS 1.1.2 (3532), which in turn manages a second network 3542. NMS 1.2 (3525) manages NMS 1.2.1 (3534), which in turn manages a third network 3544, and NMS 1.2.2 (3536), which in turn manages a fourth network 3546. Each instance of the NMS in the hierarchy may be implemented as shown in FIG. 34, including having one more database servers for use by the managers of the different functional areas.

The number of OTSs that an NMS instance can manage depends on factors such as the performance and memory of the instance's underlying processor, and the stability of the network configuration. The hierarchy of NMS instances can be determined using various techniques. In the event of failure of a manager, another manager can quickly recover the NMS functionality. The user can see an aggregated view of the entire network or some part of the network without regard to the number of managers being deployed.

One feature of multiple NMSs controlling multiple networks is the robustness and scalability provided by the hierarchical structure of the managing NMSs. The NMSs form a hierarchy dynamically, through an election process, such that a management structure can be quickly reconstituted in case of failure of some of the NMSs. Furthermore, the NMS provide the capability to configure each OTS and dynamically modify the connectivity of OTSs in the network. The NMS also enables the network operators to generate on-the-fly statistical metrics for evaluating network performance.

23. Node Manager Software

Figure 36:
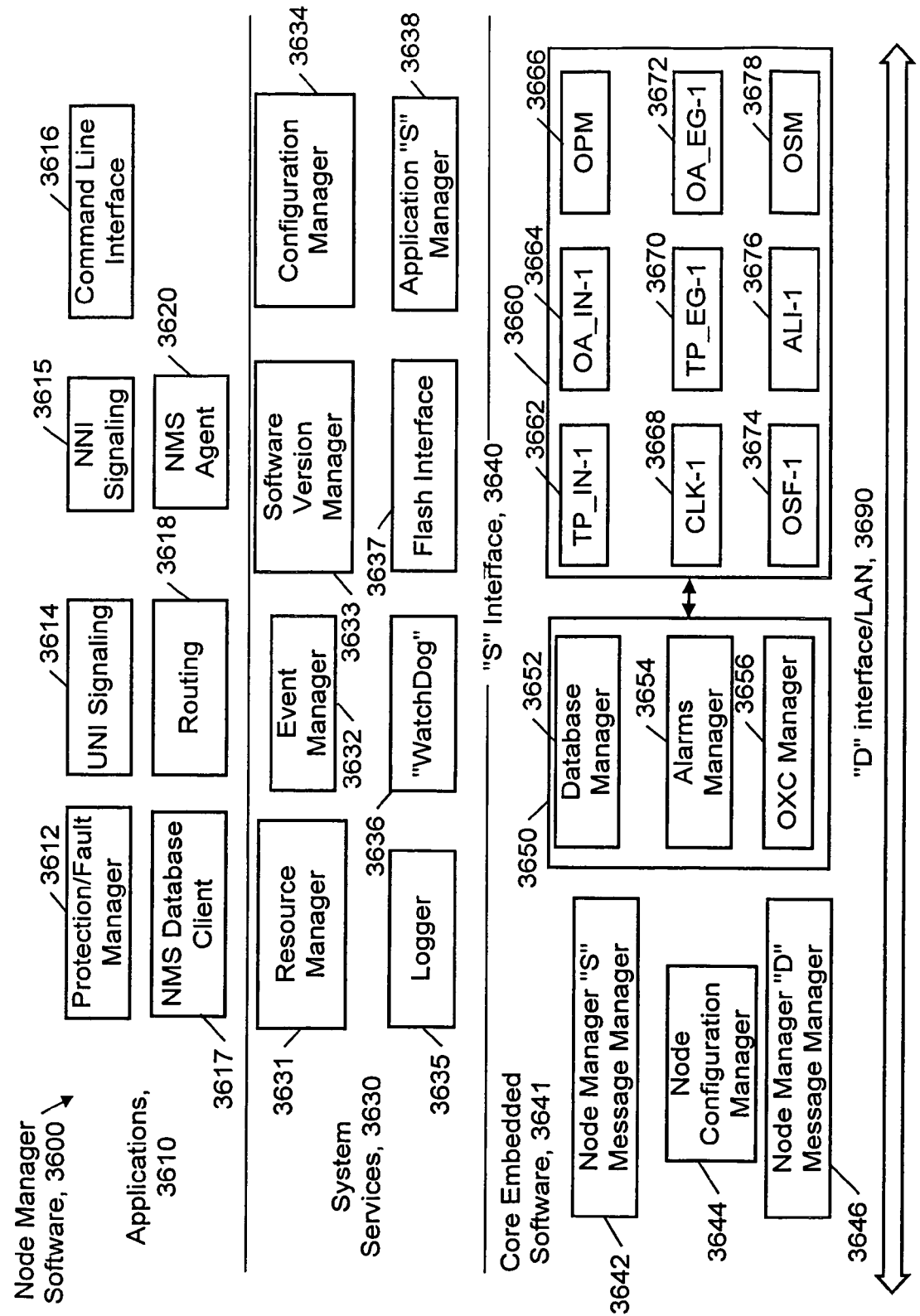
FIG. 36 illustrates a Node Manager software architecture in accordance with the present invention.

The control software at the OTS includes the Node Manager software and the Line Card Manager software. As shown in FIG. 36, the Node Manager software 3600 includes Applications layer software 3610 and Core Embedded System Services layer 3630 software running on top of an operating system such as VxWorks (Wind River Systems, Inc., Alameda, Calif.). The LCM software has Core Embedded System Services device drivers for the target peripheral hardware such as the GbE and OC-n SONET interfaces.

The Applications layer 3610 enables various functions, such as signaling and routing functions, as well as node-to-node communications. For example, assume it is desired to restore service within 50 msec for a customer using a SONET service. The routing and signaling functions are used to quickly communicate from one node to another when an alarm has been reported, such as "the link between Chicago and New York is down." So, the Applications software 3610 enables the nodes to communicate with each other for selecting a new route that does not use the faulty link.

Generally, to minimize the amount of processing by the Applications software 3610, information that is used there is abstracted as much as possible by the Core Embedded Software 3641 and the System Services 3630.

In particular, the Applications layer 3610 may include applications such as a Protection/Fault Manager 3612, UNI Signaling 3614, NNI Signaling 3615, Command Line Interface (CLI) 3616, NMS Database Client 3617, Routing 3618, and NMS agent 3620, each of which is described in further detail below.

The System Services layer software 3630 may include services such as Resource Manager 3631, Event Manager 3632, Software Version Manager 3633, Configuration Manager 3634, Logger 3635, Watchdog 3636, Flash Memory Interface 3637, and Application "S" Message Manager 3638, each of which is described in further detail below.

The Node Manager's Core Embedded Control Software 3641 is provided below an "S" interface and the System Services software 3630.

23.1 Node Manager Core Embedded Software

The Node Manager Core Embedded software 3641 is provided between the "S" interface 3640 and the "D" interface 3690. The "D" (drivers) message interface 3690 is for messages exchanged between the LCMs and the Node Manager via the OTS's internal LAN, while the "S" (services) message interface 3640 is for messages exchanged between the application software and the Core Embedded software on the Node Manager.

Generally, these managers ensure that inter-process communication can take place. In particular, the Node Manager "D" message manager 3646 receives "D" messages such as raw Ethernet packets from the LCM and forwards them to the appropriate process. The Node Manager "S" Message Manager 3642 serves a similar general function: providing inter-process communication between messages from the System Services layer 3630 and the Node Manager Core Embedded software. The inter-process communication provided by the "S" Interface is typically implemented quite differently from the "D" Interface since it is not over a LAN but within a single processor. These interfaces, which may use, e.g., header files or tables, are described further in the section entitled "Node Manager Message Interfaces."

Below the "S" interface 3640, the Node Manager's Core Embedded software further includes a Node Configuration Manager 3644, which is a master task for spawning other tasks, shown collectively at 3660, at the Node Manager, and may therefore have a large, complex, body of code. This manager is responsible for managing the other Node Manager processes, and knows how to configure the system, such as configuring around an anomaly such as a line card removal or insertion. Moreover, this manager 3644 determines how many of the tasks 3662, 3664, 3666, 3668, 3670, 3672, 3674, 3676 and 3678 need to be started to achieve a particular configuration.

The tasks at the Node Manager Core Embedded software are line card tasks/processes for handling the different line card types. These include a TP_IN task 3662, an OA_IN task 3644, an OPM task 3666, a clock task 3668, a TP_EG task 3670, an OA_EG task 3672, an OSF task 3674, an ALI task 3676 and an OSM task 3678. The "−1" notation denotes one of multiple tasks that are running for corresponding multiple line cards of that type when present at the OTS. For example, TP_IN-1 represents a task running for a first TP_IN card. Additional tasks for other TP_IN cards are not shown specifically, but could be denoted as TP_IN-2, TP_IN-3, and so forth.

Managers, shown collectively at 3650, manage resources and system services for the line card tasks. These managers include a Database Manager 3652, an Alarms Manager 3654, and an Optical Cross Connect (OXC) Manager 3656.

In particular, the Database Manager 3652 may manage a database of non-volatile information at the Node Manager, such as data for provisioning the LCMs. This data may include, e.g., alarm/fault thresholds that are to be used by the LCMs in determining whether to declare a fault if one of the monitored parameters of the line cards crosses the threshold. Generally, the Database Manager 3652 manages a collection of information that needs to be saved if the OTS fails/goes down—similar to a hard disk. As an example of the use of the Database Manager 3652, when the OTS is powered up, or when a line card is inserted into a slot in the OTS bay, the associated LCM generates a discovery packet for the Node Manager to inform it that the line card is up and exists. This enables the line cards to be hot swappable, that is, they can be pulled from and re-inserted into the slots at any time. After receiving the discovery packet, the Node Manager uses the Database manager 3652 to contact the database to extract non-volatile data that is needed to provision that line card, and communicates the data to the LCM via the OTS's LAN. The Node Manager's database may be provided using the non-volatile memory resources discussed in connection with FIG. 5.

The Alarms Manager 3654 receives alarm/fault reports from the LCMs (e.g., via any of the tasks 3660) when the LCMs determine that a fault condition exists on the associated line card. For example, the LCM may report a fault to the Alarms Manager 3654 if it determines that a monitored parameter such as laser current consumption has crossed a minimum or maximum threshold level. In turn, the Alarms Manager 3654 may set an alarm if the fault or other anomaly persists for a given amount of time or based on some other criteria, such as whether some other fault or alarm condition is present, or the status of one or more other monitored parameters. Furthermore, the presence of multiple alarms may be analyzed to determine if they have a common root cause. Generally, the Alarms Manager 3654 abstracts the fault and/or alarm information to try to extract a story line as to what caused the alarm, and passes this story up to the higher-level Event Manager 3632 via the "S" interface 3640.

Using the push model, the Event Manager 3632 distributes the alarm event to any of the software components that have registered to receive such an event. A corrective action can then be implemented locally at the OTS, or at the network-level.

The OXC Manager 3656 makes sense of how to use the different line cards to make one seamless connection for the customer. For example, using a GUI at the NMS, the customer may request a light path connection from Los Angeles to San Francisco. The NMS decides which OTSs to route the light path through, and informs each OTS via the OSC of the next-hop OTS in the light path. The OTS then establishes a light path, e.g., by using the OXC Manager 3656 to configure an ALI line card, TP_IN line card, OA_EG line card, a wavelength, and several other parameters that have to be configured for one cross connect. For example, the OXC Manager 3656 may configure the OTS such that port 1 on TP_IN is connected to port 2 on TP_OUT. The OXC Manager 3656 disassembles the elements of a cross connection and disseminates the relevant information at a low level to the involved line cards via their LCMs.

23.2 System Services 23.2.1 Resource Manager

Figure 43:
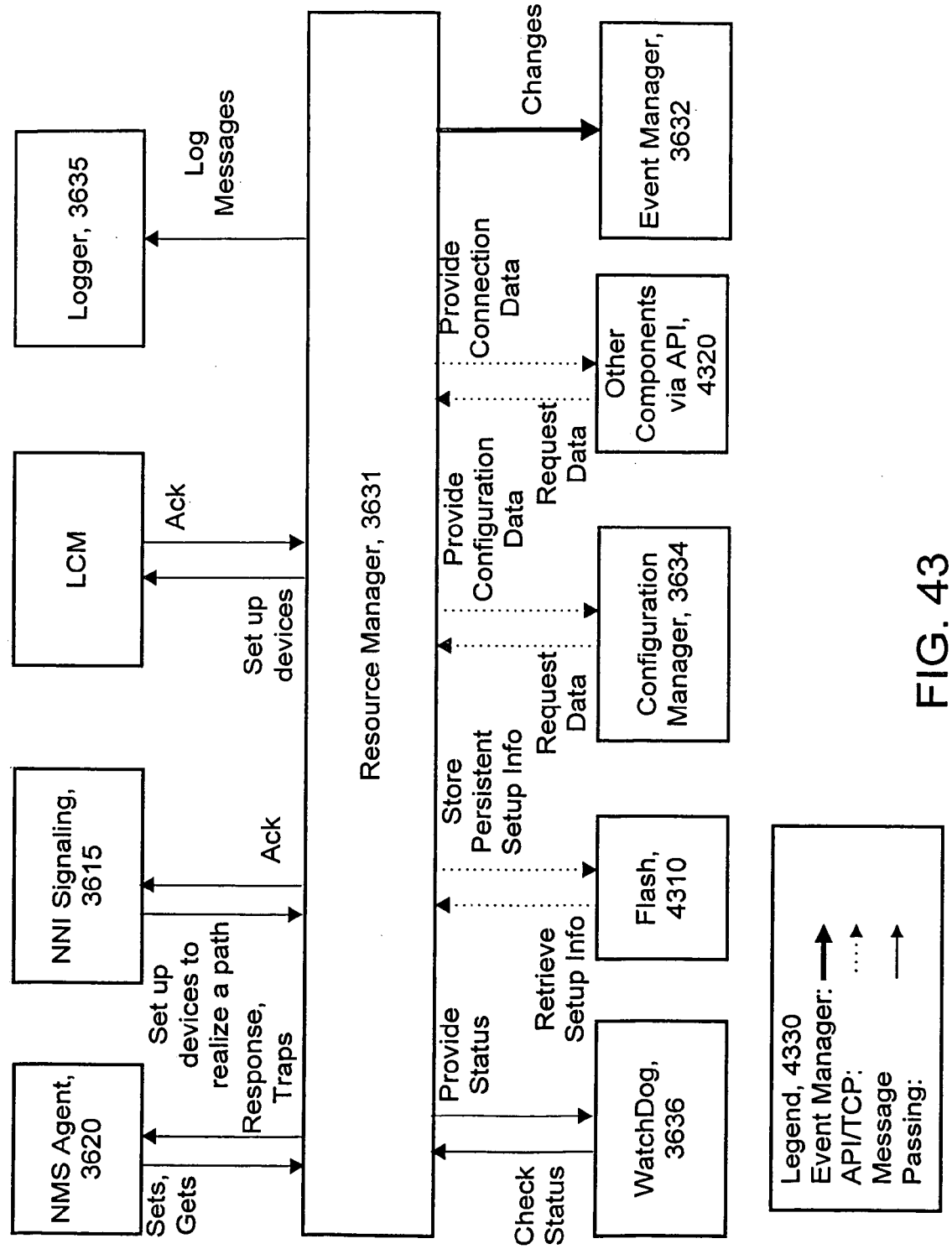
FIG. 43 illustrates a Resource Manager context diagram in accordance with the present invention.

The Resource Manager 3631 performs functions such as maintaining information on resources such as wavelengths and the state of the cross-connects of the OTS, and providing cross-connect setup and teardown capability. In particular, the Resource Manager performs the interaction with the switch hardware during path creation, modification, and termination. The context diagram of the Resource Manager is shown in FIG. 43. The legend 4330 indicates whether the communications between the components use the Event Manager, an API and TCP, or message passing. The Resource Manager is responsible for setting up network devices upon receiving requests from the NMS Agent (in case of provisioning) or the Signaling component (for a signaled setup). The Resource Manager provides an API that enables other components 4320 to obtain current connection data. Also, the Resource Manager obtains configuration data via an API provided by the Configuration Manager.

For the provisioned requests, which may be persistent, the associated parameters are stored in flash memory 4310, e.g., via the Flash interface 3637, which may be DOS file based. Upon reset, the Resource Manager retrieves the parameters from flash memory via the Flash Interface and restores them automatically.

For signaled requests, which may be non-persistent, the associated parameters may be stored in RAM at the Node Manager. Upon reset, these lightpaths must be re-established based on user requests, or other switches could re-establish them.

The Resource Manager component also logs all relevant events via the Logger, updates its MIB, and provides its status to the Watchdog component.

23.2.2 Event Manager

Figure 44:
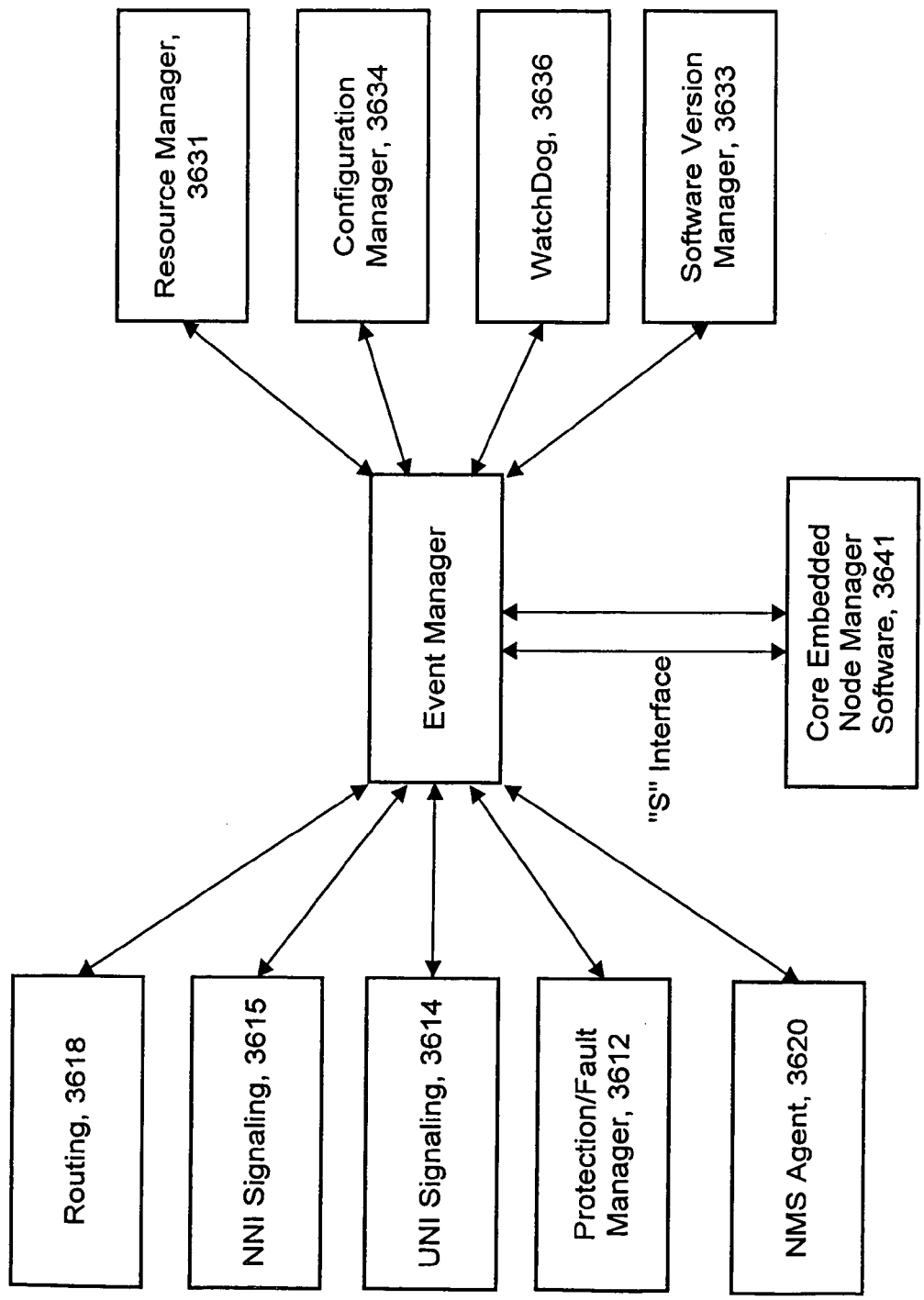
FIG. 44 illustrates an Event Manager context diagram in accordance with the present invention.

The Event Manager 3632 receives events from the Core Embedded system software 3641 and distributes those events to high level components (e.g., other software components/functions at the System Services 3630 and Applications 3610). It is also used for communication between high level components in cases where the communication is one-way (as opposed to request/response). FIG. 44 depicts its context diagram.

The Event Manager sends events to components based on their registrations/subscriptions to the events. That is, in an important aspect of the push model of the present invention, components can subscribe/unsubscribe to certain events of interest to them. Any application that wants to accept events registers with the Event Manager 3632 as an event listener. Moreover, there is anonymous delivery of events so that specific destinations for the events do not have to be named. For example, when something fails in the hardware, an alarm is sent to whoever (e.g., which application) has registered for that type of alarm. Advantageously, the sender of the alarm does not have to know who is interested in particular events, and the receivers of the events only receive the types of events in which they are interested. The OTS software architecture thus uses a push model since information is pushed from a lower layer to a higher layer in near real-time.

The Event Manager may be used as a middleman between two components for message transfer. For example, a component A, which wants to send a message X to another component B, sends it to the Event Manager. Component B must subscribe to the message X in order to receive it from the Event Manager.

In particular, the event library software (EventLib) may include the following routines:

EventRegister( )—register for an event to get an event message when the event occurs;

EventUnRegister( )—un-register for an event; and

EventPost( )—post an event.

These routines return ERROR when they detect an error. In addition, they set an error status that elaborates the nature of the error.

Normally, high-level applications, e.g. signaling, routing, protection, and NMS agent components, register for events that are posted by Core Embedded components, such as device drivers. High-level components register/un-register for events by calling EventRegister( )/EventUnRegister( ). Core Embedded components use EventPost( ) to post events.

The Event Dispatcher may be implemented via POSIX message queues for handling event registration, un-registration, and delivery. It creates a message queue, ed_dispQ, when it starts. Two priority levels, high and low, are supported by ed_dispQ. When a component registers for an event by calling EventRegister( ), a registration event is sent to ed_dispQ as a high priority event. Event Dispatcher registers the component for that event when it receives the registration event. If the registration is successful an acknowledgment event is sent back to the registering component. A component should consider the registration failed if it does not receive an acknowledgment within a short period of time. It is up to the component to re-register for the event. A component may register for an event for multiple times with the same or different message queues. If the message queue is the same, later registration will over-write earlier registration. If the message queues are different, multiple registrations for the same event will co-exist, and events will be delivered to all message queues when they are posted.

Furthermore, event registration may be permanent or temporary. Permanent registrations are in effect until cancelled by EventUnRegister( ). EventUnRegister( ) sends a un-register event (a high priority event) to ed_dispQ for Event Dispatcher to un-register the component for that event. Temporary registrations are cancelled when the lease time expired. A component may pre-maturely cancel a temporary registration by calling EventUnRegister( ). If the un-registration is successful, an acknowledgment event is delivered to the message queue of the component.

When a component uses EventPost( ) to post an event, the posted event is placed in ed_dispQ, too. An event is either a high priority or a low priority event. To prevent low priority events from filling up ed_dispQ, the low priority event is not queued when posted if ed_dispQ is more than half full. This way, at least half of ed_dispQ is reserved for high priority events. Event Dispatcher delivers an event by moving the event from ed_dispQ to the message queues of registered components. So, a component must create a POSIX message queue before registering for an event and send the message queue name to the Event Dispatcher when it registers for that event. Moreover, a component may create a blocking or non-blocking message queue. If the message queue is non-blocking, the component may set up a signal handler to get notification when an event is placed in its message queue.

If the message queue of a component is full when Event Dispatcher tries to deliver an event, the event is silently dropped. Therefore, components should ensure there is space in its message queue to prevent an event from being dropped.

23.2.3 Software Version Manager

Figure 45:
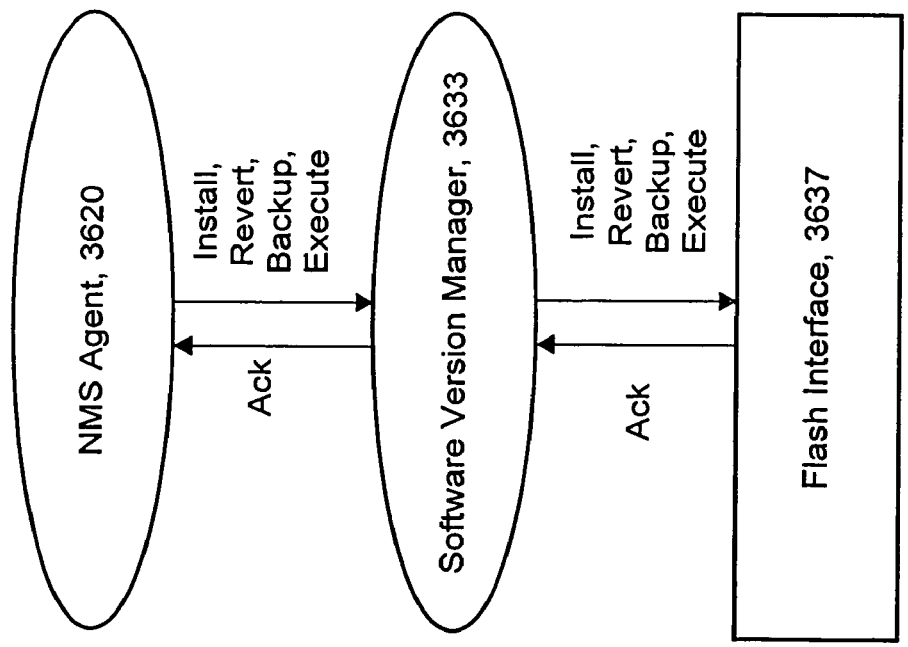
FIG. 45 illustrates a Software Version Manager context diagram in accordance with the present invention.

The Software Version Manager (SVM) 3633 is responsible for installing, reverting, backing up and executing of software in the Node Manager and LCMs. Its context diagram is depicted in FIG. 45. The SVM maintains and updates software on both the Node Manager and the LCMs by keeping track of the versions of software that are used, and whether a newer version is available. Generally, different versions of Node Manager software and LCM software can be downloaded remotely from the NMS to the Node Manager from time to time as new software features are developed, software bugs are fixed, and so forth. The Node Manager distributes the LCM software to the LCMs. The SVM keeps a record of which version of software is currently being used by the Node Manager and LCMs.

In particular, the SVM installs new software by loading the software onto flash memory, e.g., at the Node Manager. The SVM performs backing up by copying the current software and saving it on another space on the flash memory. The SVM performs the reverting operation by copying the back up software to the current software. Finally, the SVM performs the execution operation by rebooting the Node Manager or the LCMs.

In particular, for installation, the SVM receives an install command from the NMS agent that contains the address, path and filename of the code to be installed. The SVM may perform a File Transfer Protocol (FTP) operation to store the code into its memory. Then, it uses the DOS Flash interface services 3637 to store the code into the flash memory. In performing the backup operation for the Node Manager software, the SVM receives the backup command from the NMS agent. The SVM uses the DOS Flash interface to copy the current version of the code to a backup version. In the revert operation for the Node Manager software, the SVM receives the revert command from the NMS agent and uses the DOS Flash interface to copy the backup version of the software to the current version.

The Node Manager software is executed by rebooting the Node Manager card.

The Installation, reverting, backing up and executing operations can also be performed on the software residing on the line cards. In particular, for installation, the software/ firmware is first "FTPed" down to the Node Manager's flash memory. Then, the new firmware is downloaded to the line card. This new code is stored in the line card's flash memory. The new code is executed by rebooting the line card.

23.2.4 Configuration Manager

Figure 46:
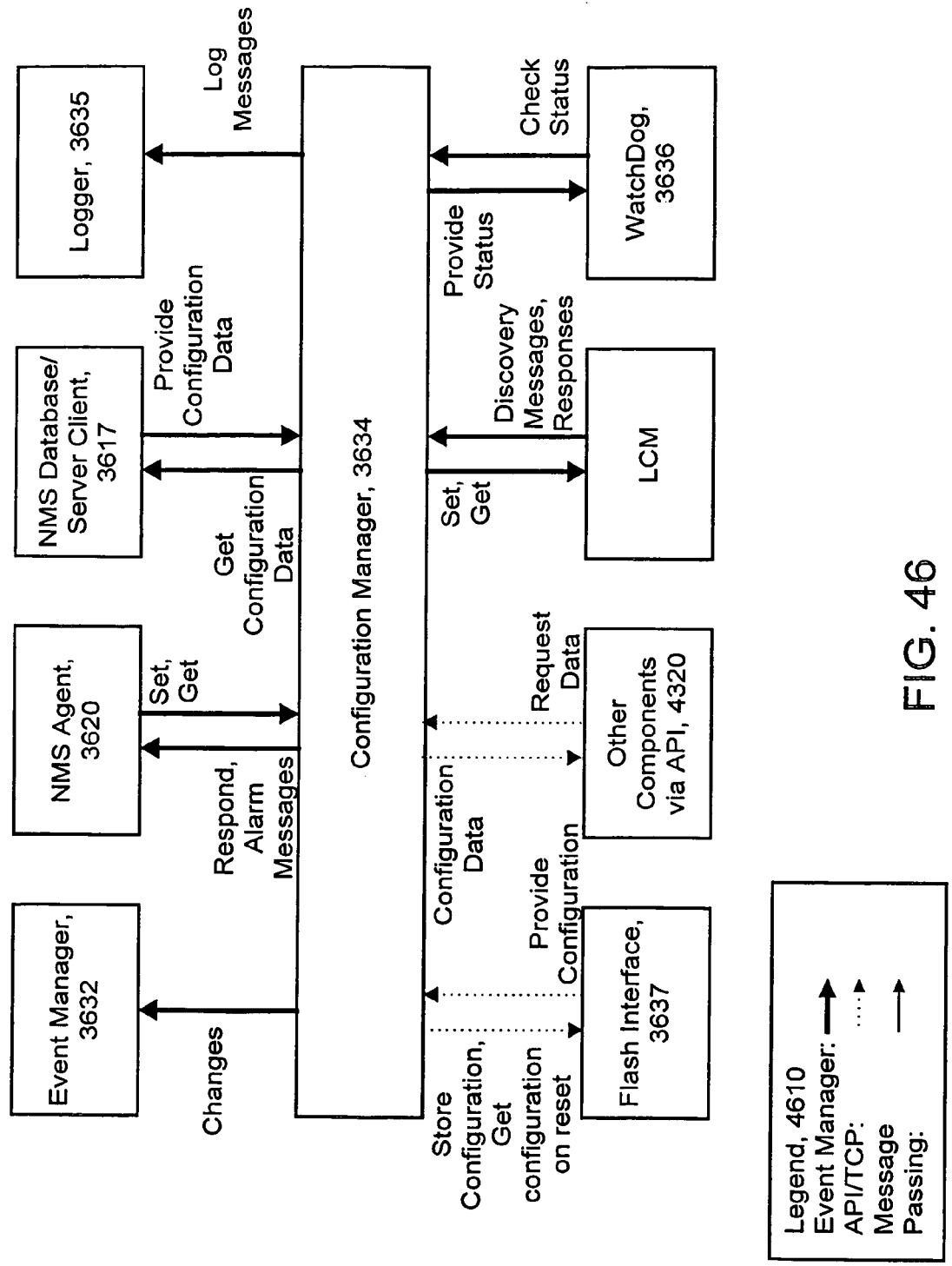
FIG. 46 illustrates a Configuration Manager context diagram in accordance with the present invention.

The Configuration Manager 3634 maintains the status of all OTS hardware and software components. Its context diagram is shown in FIG. 46. The legend 4610 indicates whether the communications between the components use the Event Manager, an API and TCP, or message passing. During the first OTS system boot up, the Configuration Manager obtains the desired configuration parameters from the database/server (or possibly a configuration file) at the NMS. The LCMs are responsible for monitoring the status of the line cards. When a line card becomes active, it immediately generates a Discovery message that the LCM for each optical card forwards to the Event Manager 3632 that is running on the Node Manager. The Configuration Manager receives these messages by subscribing to them at the Event Manager. It then compares the stored configuration versus the reported configuration. If there is a difference, the Configuration Manager sets the configuration according to the stored data by sending a message to the LCM via the Event Manager and S-Interface. It also reports an error and stores the desired configuration in the Node Manager's flash memory.

When the system is subsequently re-booted, the operation is identical, except the desired configuration is stored in flash memory.

The LCMs are configured to periodically report a status of their optical line cards. Also, when a device fails or has other anomalous behavior, an event message such a fault or alarm is generated. The Configuration Manager receive these messages via the Event Manager, and issues an event message to other components. Moreover, while not necessary, the Configuration Manager may poll the LCMs to determine the line card status if it is desired to determine the status immediately.

If the configuration table in the Node Manager's flash memory is corrupted, the Configuration Manager may request that the database/server client gets the information (configuration parameters) via the database/server, which resides in the NMS host system. After configuring the devices, the Configuration Manager posts an event to the Event Manager so that other components (e.g., NMS Agent and the Resource Manager) can get the desired status of the devices.

The desired configuration can be changed via CLI or NMS command. After the Configuration Manager receives a request from the NMS or CLI to change a device configuration, the Configuration manager sends an "S" message down to the LCMs to satisfy the request. Upon receiving the acknowledge message that the request was carried out successfully, the Configuration Manager sends an acknowledgement message to the requester, stores the new configuration into the database service, logs a message to the Logger, and post an event via the Event Manager.

Moreover, the NMS/CLI can send queries to the Configuration Manager regarding the network devices' configurations. The Configuration Manager retrieves the information from the database and forwards them to the NMS/CLI. The NMS/CLI can also sends a message to the Configuration Manager to change the reporting frequency or schedule of the device/line card.

23.2.5 Logger

The Logger 3635 sends log messages to listening components such as debugging tasks, displays, printers, and files. These devices may be directly connected to the Node Manager or connected via a socket interface.

Figure 47:
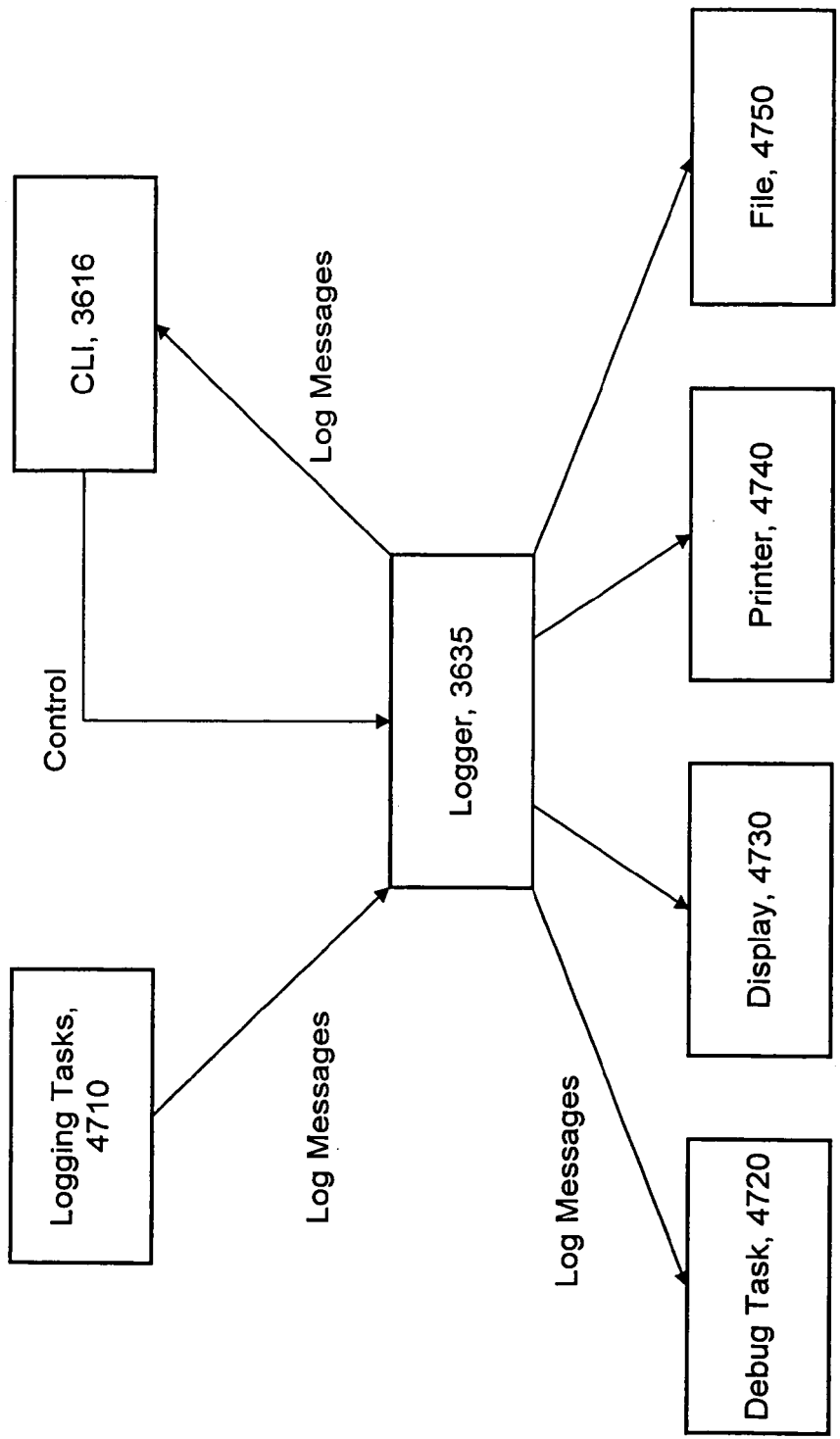
FIG. 47 illustrates a Logger context diagram in accordance with the present invention.

The Logger's context diagram is shown in FIG. 47. The Logger is controlled via the CLI, which may be implemented as either a local service or remote service via Telnet. The control may specify device(s) to receive the Logging messages (e.g., displays, files, printers—local or remote), and the level of logging detail to be captured (e.g., event, error event, parameter set).

23.2.6 Watchdog

The Watchdog component 3638 monitors the state ("health") of other (software) components in the Node Manager by verifying that the components are working.

23.2.7 Flash Memory Interface

Figure 48:
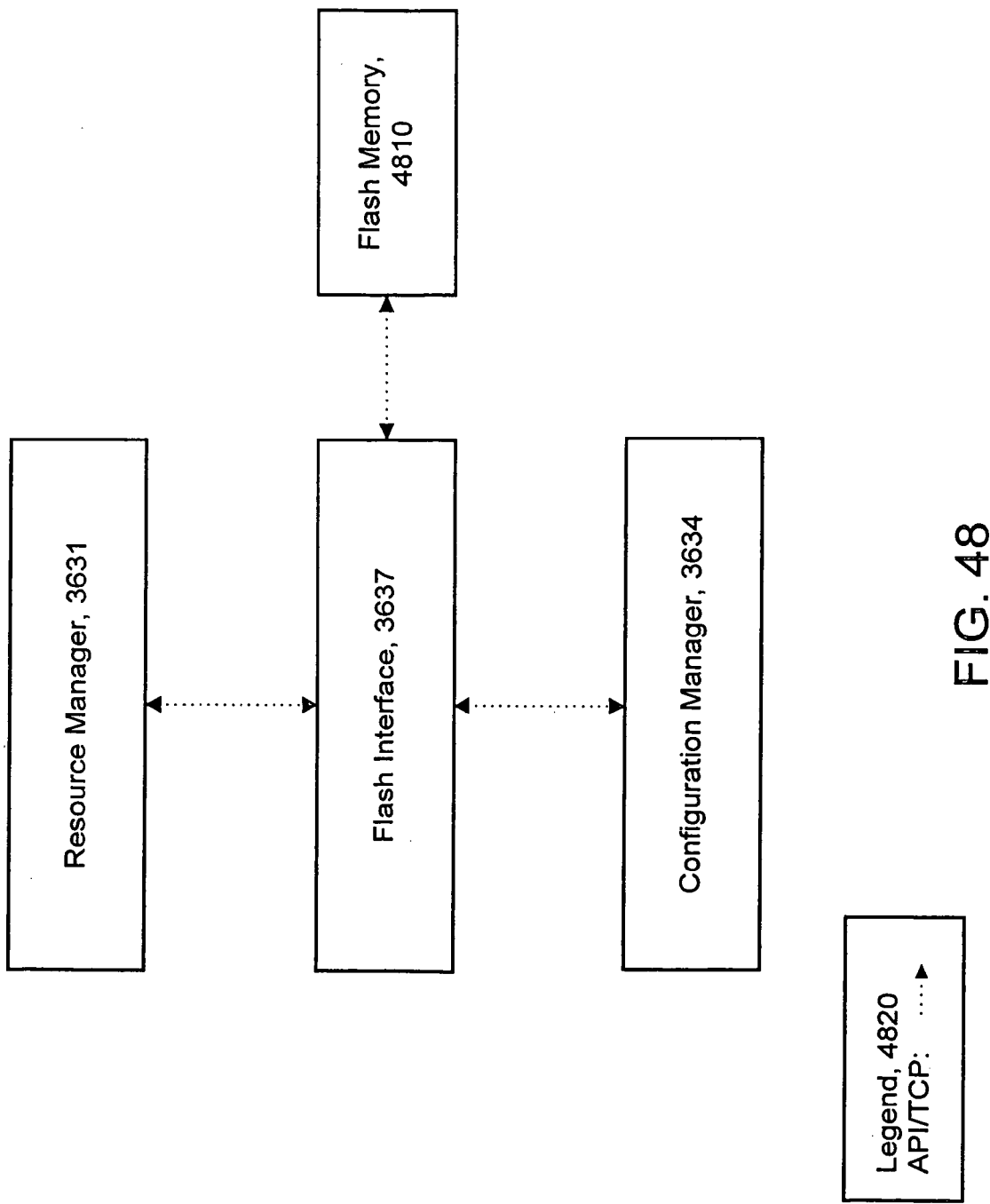
FIG. 48 illustrates a Flash Interface context diagram in accordance with the present invention.

A Disk Operating System (DOS) file interface may be used to provide an interface 3637 to the flash memory on the Node Manager for all persistent configuration and connection data. Its context diagram is depicted in FIG. 48. The legend 4820 indicates that the components communicate using an API and TCP. The Resource Manager 3631 and Configuration Manager 3634 access the Flash Memory 4810 as if it were a DOS File System. Details of buffering and actual writing to flash are vendor-specific.

23.2.8 Application "S" Message Manager

The Application "S" Message Manager receives messages from the Node Manager's Core Embedded software, also referred to as control plane software.

23.3 Applications Layer 23.3.1 Protection/Fault Manager

Figure 37:
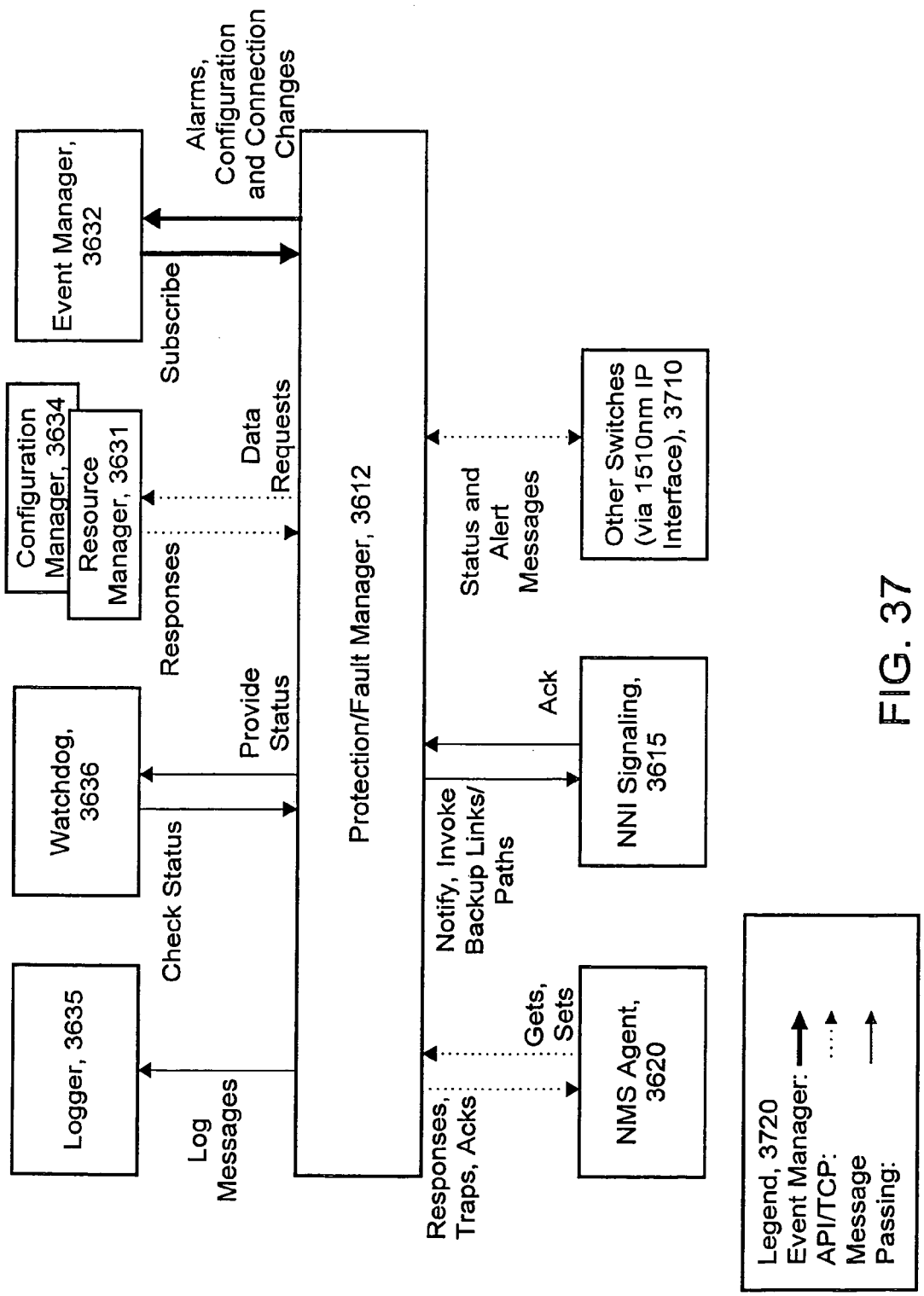
FIG. 37 illustrates a Protection/Fault Manager context diagram in accordance with the present invention.

The primary function of the Protection/Fault Manager component is to respond to alarms by isolating fault conditions and initiating service restoration. The Protection/Fault Manager isolates failures and restores service, e.g., by providing alternate link or path routing to maintain a connection in the event of node or link failures. As depicted in FIG. 37, the Protection/Fault Manager interfaces with the Logger 3635, WatchDog 3636, Resource Manager 3631, Configuration Manager 3634, Event Manager 3632, NMS Agent 3620, NNI Signaling 3615 and Other Switches/OTSs 3710. The legend 3720 indicates the nature of the communications between the components. The Protection/Fault Manager subscribes to the Event Manager to receive events related to the failure of links or network devices. When the Protection/Fault Manager receives a failure event and isolates the cause of the alarm, it determines the restorative action and interacts with the appropriate application software to implement it. If there is problem isolating or restoring service, the problem is handed over to the NMS for resolution.

Some service providers may elect to perform their own protection by requesting two disjoint paths. With this capability, the service provider may implement 1+1 or 1:1 protection as desired. When a failure occurs, the service provider can perform the switchover without any assistance from the optical network. However, the optical network is responsible for isolating and repairing the failure.

Using the Event Manager, the Protection/Fault component also logs major events via the Logger component, updates its MIB, and provides its status to the Watchdog component. It also updates the Protection parameters in the shared memory.

23.3.2 UNI Signaling

The Signaling components includes the User-Network Interface (UNI) signaling and the internal Network-Network Interface (NNI) signaling. The primary purpose of signaling is to establish a lightpath between two endpoints. In addition to path setup, it also performs endpoint Registration and provides a Directory service such that users can determine the available endpoints.

Figure 38:
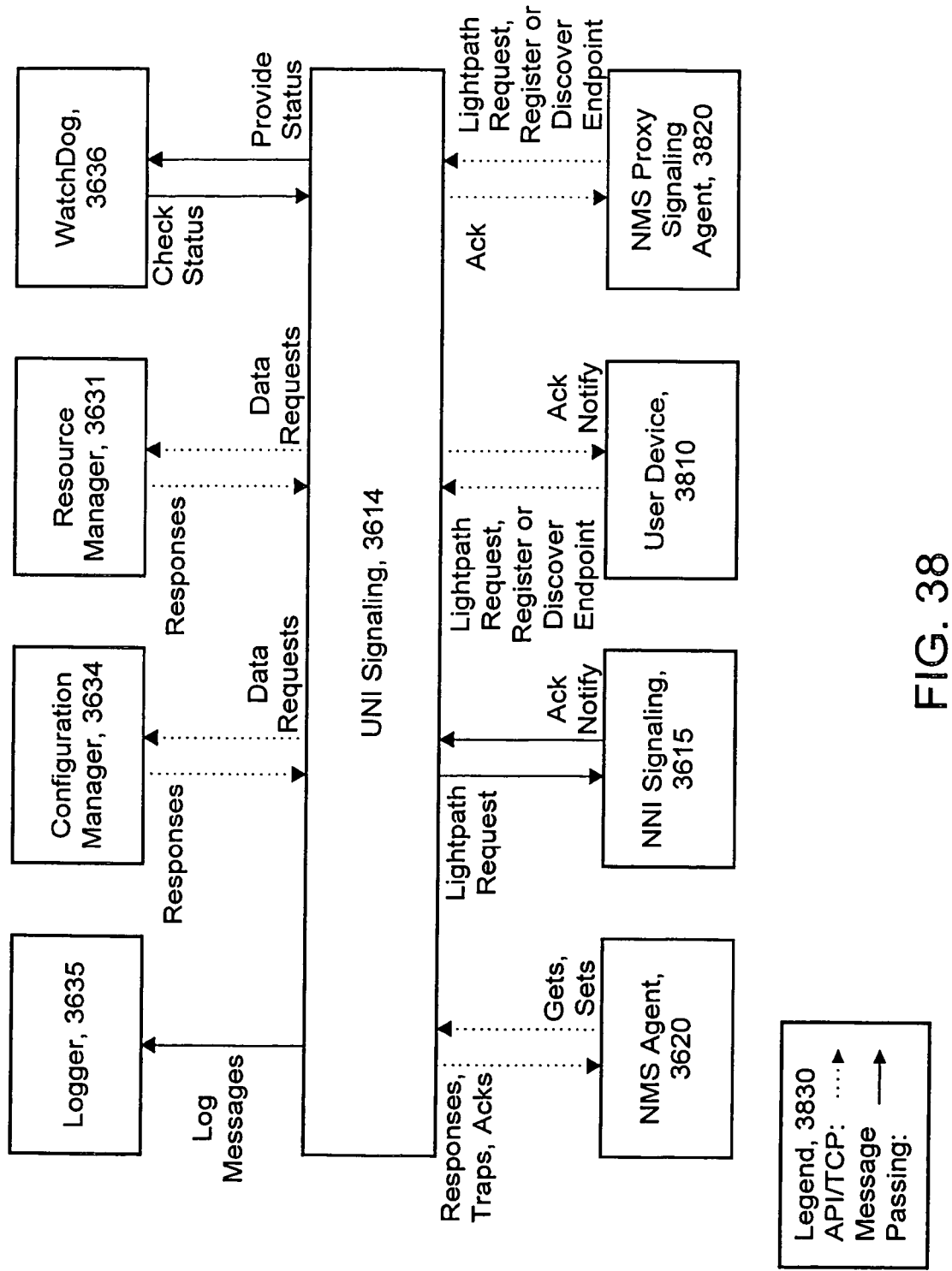
FIG. 38 illustrates a UNI Signaling context diagram in accordance with the present invention.

The UNI signaling context diagram is depicted in FIG. 38. The UNI uses both message passing and APIs provided by other components to communicate with other components. The legend 3830 indicates whether the communications between the components use an API and TCP, or message passing.

The UNI component provides a TCP/IP interface with User devices 3810, e.g., devices that access the optical network via an OTS. If the User Device does not support signaling, a NMS proxy signaling agent 3820 resident on an external platform performs this signaling.

When a valid "create lightpath" request is received, the UNI invokes the NNI to establish the path. In addition to creating a lightpath, users may query, modify or delete a lightpath.

The UNI Signaling component 3614 obtains current configuration and connection data from the Configuration and Resource Managers, respectively. It logs major events via the Logger component, updates its MIB used by the SNMP Agent, and provides a hook to the WatchDog component to enable the WatchDog to keep track of its status.

23.3.3 NNI Signaling

Figure 39:
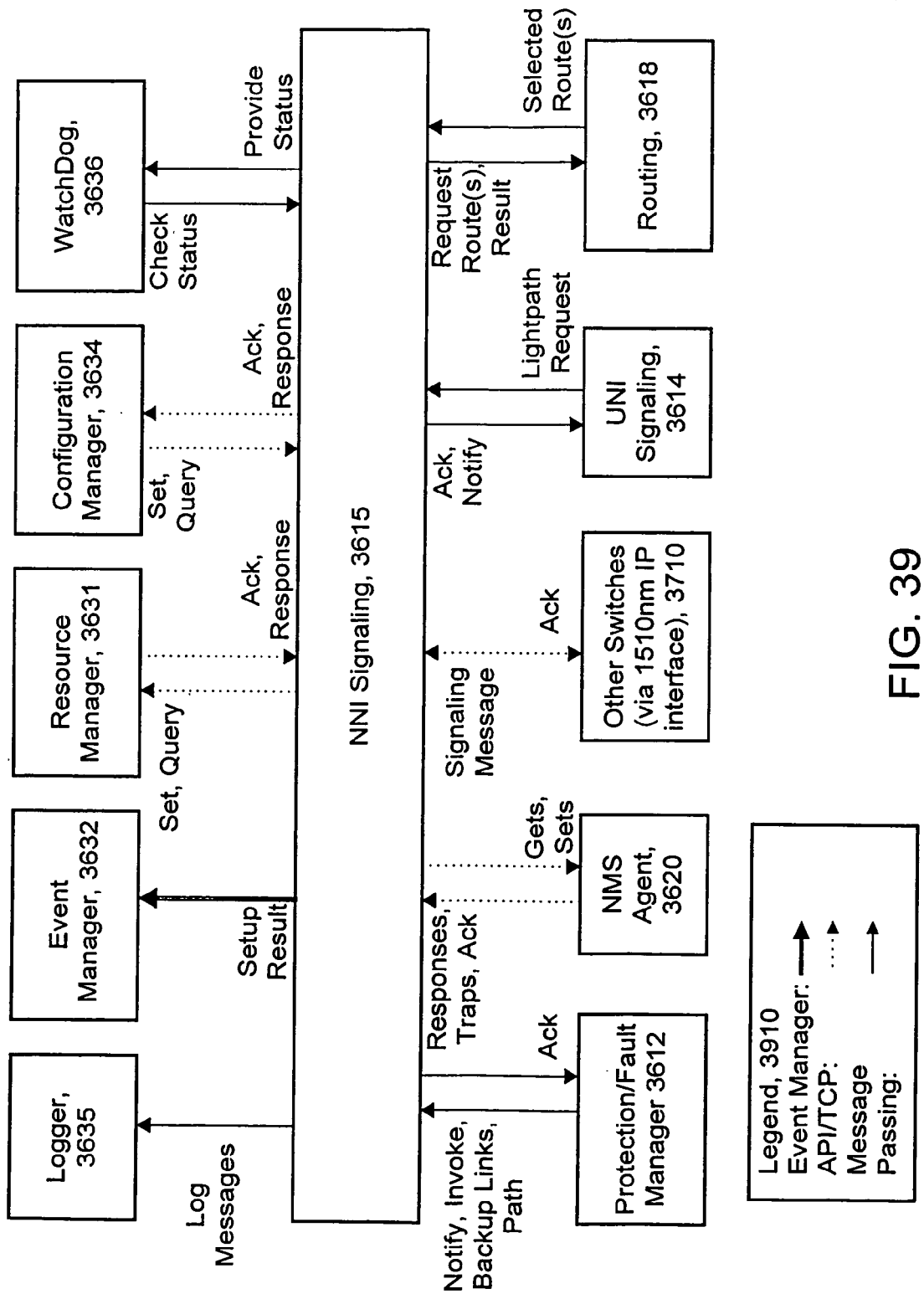
FIG. 39 illustrates a NNI Signaling context diagram in accordance with the present invention.

The NNI signaling component 3615, depicted in FIG. 39, performs the internal signaling between switches in the optical network, e.g., using MPLS signaling. The legend 3910 indicates whether the communications between the components use the Event Manager, an API and TCP, or message passing.

As discussed, requests for service to establish a lightpath between two endpoints may be received over the UNI from an external device or a proxy signaling agent. Upon receipt of the request, UNI signaling validates the request and forwards it, with source and destination endpoints, to the NNI signaling function for setup. Source-based routing may be used, in which case NNI must first request a route from the Routing component 3618. Several options are available, e.g., the user may request a path disjoint from an existing path.

The Routing component 3618 returns the selected wavelength and set of switches/OTSs that define the route. Then, the NNI signaling component requests the Resource Manager 3631 to allocate the local hardware components implementing the path, and forwards a create message to the next switch in the path using TCP/IP over the OSC.

Each OTS has its local Resource Manager allocate hardware resources to the light path. When the path is completed, each OTS returns an acknowledgment message along the reverse path confirming the successful setup, and that the local hardware will be configured. If the attempt failed due to unavailability of resources, the resources that had been allocated along the path are de-allocated. In order for other components (other than UNI, e.g., Routing) to learn if an attempt if the path setup was successful, the NNI distributes (posts) a result event using the Event Manager 3632.

Moreover, the NNI Signaling component 3615 obtains current configuration data from the Configuration Manager 3634, and connection data from the Resource Manager 3631. It also logs major events via the Logger component 3635, updates its MIB used by the SNMP Agent, and provides a hook to the WatchDog component 3636 to enable the WatchDog to keep track of its status.

23.3.4 Command Line Interface

The CLI task 3616, an interface that is separate from the GUI interface, provides a command-line interface for an operator via a keyboard/display to control or monitor OTSs. The functions of the CLI 3616 include setting parameters at bootup, entering a set/get for any parameter in the Applications and System Services software, and configuring the Logger. The TL-1 craft interface definition describes the command and control capabilities that are available at the "S" interface. Table 5 lists example command types that may be supported.

TABLE 5

TL-1 Craft Command List

| Craft Command | Parameters | Description |
| --- | --- | --- |
| Rtrv-alm | Type, slot, severity | Retrieve alarm messages |
| Rtrv-crs | Type, port | Retrieves cross connect information |
| Rtrv-eqpt | Address-id | Retrieves the equipage (configuration) of the OTS node |
| Rtrv-hist | Start, end | Retrieves the event history |
| Rtrv-ali | Port, wavelength, mode | Retrieves the ALI port parameters |
| Rtrv-node | N/A | Retrieves OTS node parameters |
| Rtrv-pmm | Slot, port, wavelength | Retrieves the performance monitor meas. |
| Rtrv-port | Port | Retrieves per port performance measurements |
| Rtrv-prot-sws | Port | Retrieves path protection connections |
| Set-ali | Out-port, in-port, mode | Sets ALI port parameters |
| Set-node | Id, date, time, alm-delay | Sets OTS node parameters |
| Set-port | Port, wavelength, thresh | Sets port and wavelength thresholds |

23.3.5 NMS Database Client

Figure 40:
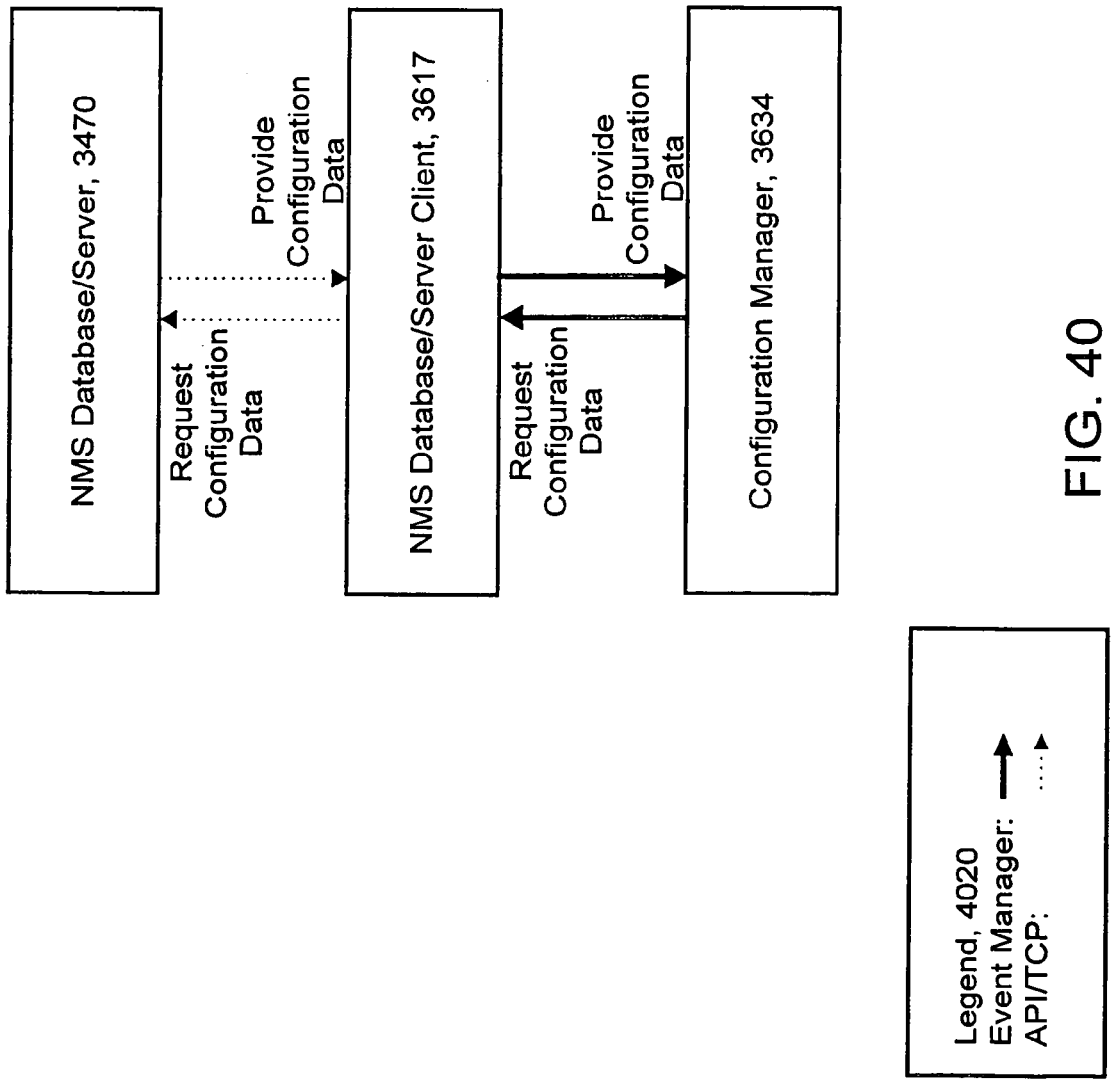
FIG. 40 illustrates an NMS Database/Server Client context diagram in accordance with the present invention.

Optionally, an NMS database client 3617 may reside at the Node Manager to provide an interface to one or more database servers at the NMS. One possibility is to use LDAP servers. Its context diagram is depicted in FIG. 40. As shown, the database/server client 3617 interacts with the NMS's database server, and with the Configuration Manager 3634. Upon request from the Configuration manager, the database client contacts the server for configuration data. Upon receiving a response from the server, the client forwards the data to the Configuration Manager. The legend 4020 indicates whether the communications between the components use the Event Manager, or an API and TCP.

Since the Configuration Data is stored in the Node Manager's flash memory, the database client may be used relatively infrequently. For example, it may be used to resolve problems when the stored configuration is not consistent with that obtained via the LCM's discovery process.

Moreover, there may be primary and backup database servers, in which case the client keeps the addresses of both servers. If the primary server does not function, after waiting for a pre-determined period, the client forwards the request to the backup server.

Moreover, when the Configuration Manager makes changes to its configuration table, the Configuration Manager posts an event to the Event Manager. The Event Manager forwards the event to the NMS Agent, which in turn forwards the event to the NMS application. The NMS application recognizes the event and contacts the server to update its table.

23.3.6 Routing

Figure 41:
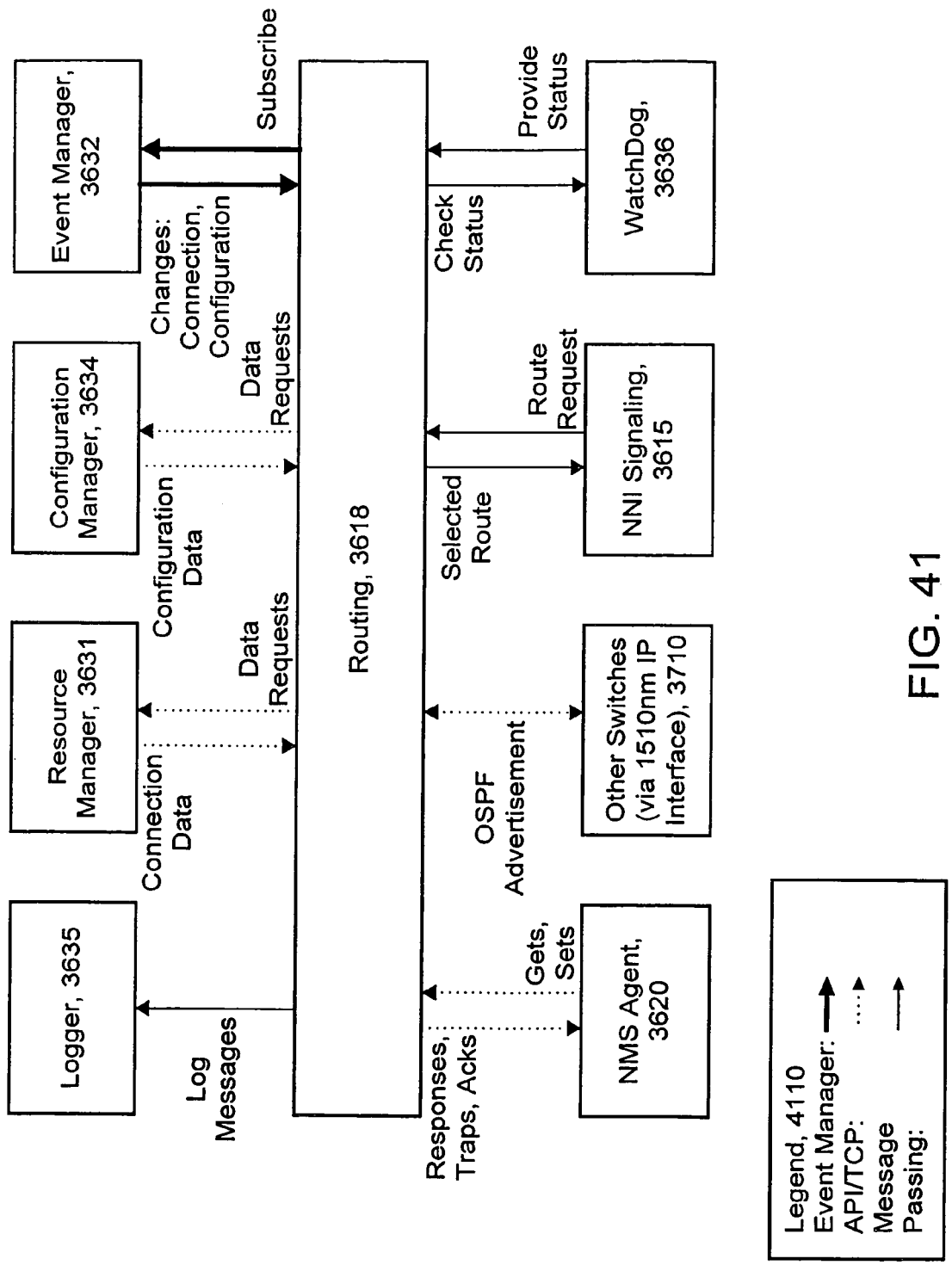
FIG. 41 illustrates a Routing context diagram in accordance with the present invention.

The Routing Component 3618 computes end-to-end paths in response to a request from the NNI component. The context diagram, FIG. 41, depicts its interfaces with the other components. The legend 4110 indicates whether the communications between the components use the Event Manager, an API and TCP, or message passing.

The Routing Component, which may implement the OSPF routing algorithm with optical network extensions, is invoked by the NNI Signaling component at the path source during setup. Routing parameters are input via the SNMP Agent.

Routing is closely related to the Protection/Fault Manager. As part of the protection features, the Routing component may select paths that are disjoint (either link disjoint or node and link disjoint as specified by signaling) from an existing path.

Moreover, as part of its operation, the Routing component exchanges Link State Advertisement messages with other switches. With the information received in these messages, the Routing component in each switch maintains a complete view of the network such that it can compute a path.

23.3.7 NMS Agent

Figure 42:
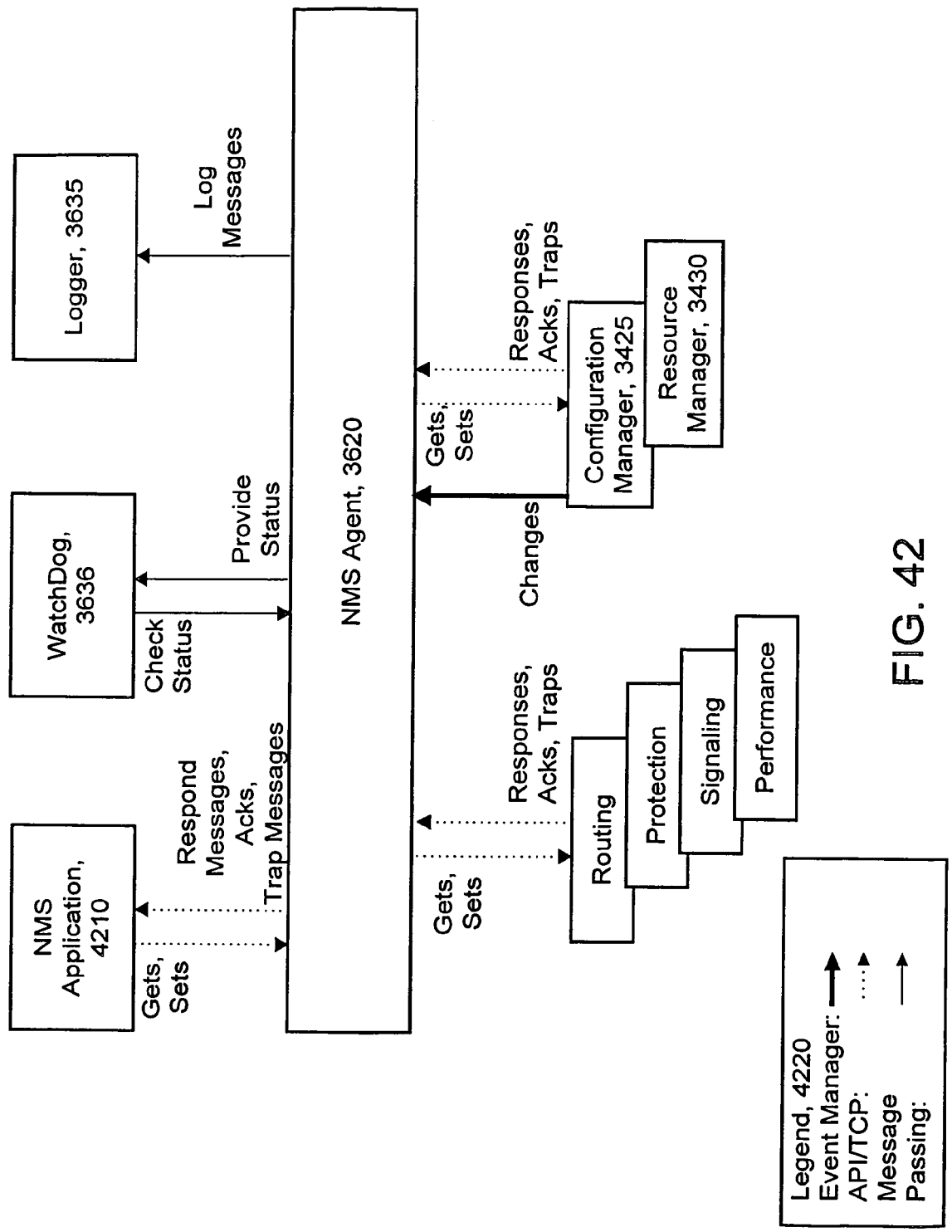
FIG. 42 illustrates an NMS Agent context diagram in accordance with the present invention.

The embedded NMS Agent 3620 provides the interface between NMS applications 4210 (e.g., configuration, connection, topology, fault/alarm, and performance) and the Applications resident on the Node Manager. The NMS agent may use SNMP and a proprietary method. FIG. 42 shows the context diagram of the NMS Agent. The legend 4220 indicates whether the communications between the components use the Event Manager, an API and TCP, or message passing. The NMS Agent operates using a "pull model"—all of the SNMP data is stored locally with the relevant component (e.g., UNI, NNI, Routing, Protection). When the NMS Agent must respond to a Get request, it pulls the information from its source.

The NMS Agent receives requests from an NMS application and validates the request against its MIB tables. If the request is not validated, it sends an error message back to the NMS. Otherwise, it sends the request using a message passing service to the appropriate component, such as the Signaling, Configuration Manager, or Resource Manager components.

For non-Request/Response communications, the NMS agent may subscribe to events from the Event managers. The events of interest include the "change" events posted by the Resource Manager, Configuration Manager and the UNI and NNI components, as well as messages from the LCMs. Upon receiving events from the Event Manager or unsolicited messages from other components (e.g., Signaling), the NMS Agent updates its MIB and, when necessary, sends the messages to the NMS application using a trap.

24. Line Card Manager Software

Figure 49:
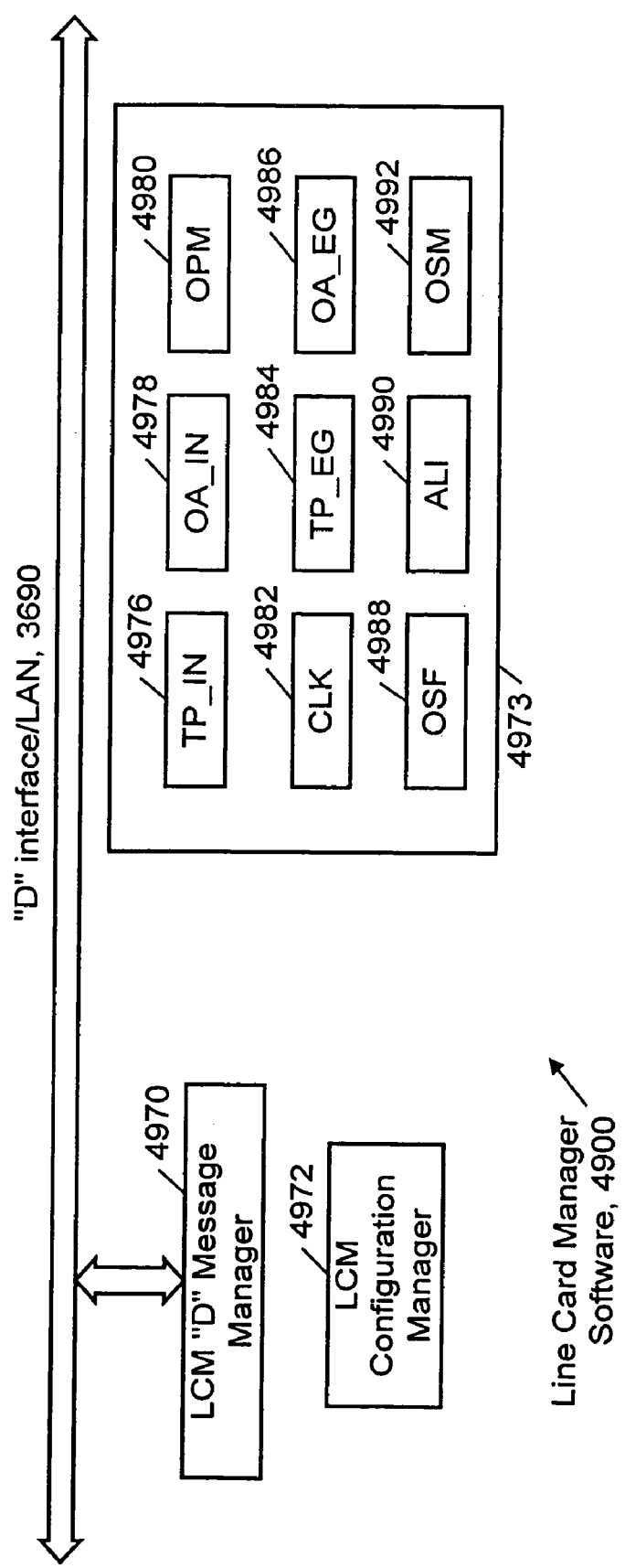
FIG. 49 illustrates a Line Card Manager software process diagram in accordance with the present invention.

FIG. 49 illustrates a Line Card Manager software architecture in accordance with the present invention.

In the OTS control hierarchy, the LCM software 4900 is provided below the "D" interface 3690, and generally includes a Core Embedded control layer to provide the data telemetry and I/O capability on each of the physical interfaces, and an associated operating system that provides the protocols (e.g., TCP/IP) and timer features necessary to support real-time communications. The LCM software 4900, which may run on top of an operating system such as VxWorks, includes an LCM "D" Message Manager 4970 for sending messages to, and receiving messages from, the Node Manager "D" Message Manager 3646 via the "D" interface 3690. This manager 4970 is an inter-process communication module which has a queue on it for queuing messages to the Node Manager. An LCM Configuration Manager 4972 is a master process for spawning and initializing all other LCM tasks, and performs functions such as waking up the LCM board, configuring the LCM when the system/line card comes up, and receiving voltages and power.

The LCM line card tasks 4973 include tasks for handling a number of line cards, including an TP_IN handler or task 4976, an OA_IN handler 4978, a OPM handler 4980, a clock (CLK) handler 4982, a TP_EG handler 4984, an OA_EG handler 4986, an OSF handler 4988, an ALI handler 4990, and an OSM handler 4992. Here, the line card handlers can be thought of as being are XORed such that when the identity of the pack (line card) is discovered, only the corresponding pack handler is used. Advantageously, the LCM software 4900 is generic in that it has software that can handle any type of line card, so there is no need to provide a separate software load for each LCM according to a certain line card type. This simplifies the implementation and maintenance of the OTS. Alternatively, it is possible to provide each LCM with only the software for a specific type of line card.

Each of the active line card handlers can declare faults based on monitored parameters that they receive from the respective line card. Such faults may occur, e.g., when a monitored parameter is out of a pre-set, normal range. The line card handlers may signal to the customer that fault conditions are present and should be examined in further detail, by using the Node Manager and NMS.

Moreover, the line card handlers use push technology in that they push event information up to the next layer, e.g., the Node Manager, as appropriate. This may occur, for example, when a fault requires attention by the Node Manager or the NMS. For example, a fault may be pushed up to the Alarms Manager 3654 at the Node Manager Core Embedded Software, where an alarm is set and pushed up to the Event manager 3632 for distribution to the software components that have registered to receive that type of alarm. Thus, a lower layer initiates the communication to the higher layer.

The clock handler 4982 handles a synchronizing clock signal that is propagated via the electrical backplane (LAN) from the Node Manager to each LCM. This is necessary, for example, for the line cards that handle SONET signals and thereby need a very accurate clock for multiplexing and demultiplexing.

Generally speaking, the LCM performs telemetry by constantly collecting data from the associated line card and storing it in non-volatile memory, e.g., using tables. However, only specific information is sent to the Node Manager, such as information related to a threshold crossing by a monitored parameter of the line card, or a request, e.g., by the NMS through the Node Manager, to read something from the line card. A transparent control architecture is provided since the Node Manager can obtain fresh readings from the LCM memory at any time.

The Node Manager may keep a history log of the data it receives from the LCM.

25. Node Manager Message Interfaces

As mentioned, the Node Manager supports two message interfaces, namely the "D" Message Interface, which is for messages exchanged between the LCMs and the Node Manager, and the "S" Message interface, which is for messages exchanged between the application software and the Core Embedded system services software on the Node Manager.

25.1 "D" Message Interface Operation

The "D" message interface allows the Node Manager to provision and control the line cards, retrieve status on demand and receive alarms as the conditions occur. Moreover, advantageously, upgraded LCMs can be connected in the future to the line cards using the same interface. This provides great flexibility in allowing baseline LCMs to be fielded while enhanced LCMs are developed. Moreover, the interface allows the LCMs and Node Manager to use different operating systems.

The Core Embedded Node Manager software builds an in-memory image of all provisioned data and all current transmission-specific monitored parameters. The Node Manager periodically polls each line card for its monitored data and copies this data to the in-memory image in SDRAM. The in-memory image is modified for each alarm indication and clearing of an alarm, and is periodically saved to flash memory to allow rapid restoration of the OTS in the event of a system reboot, selected line card reboot or selected line card swap. The in-core memory image is organized by type of line card, instance of line card and instances of interfaces or ports on the type of line card. Each LCM has a local in-memory image of provisioning information and monitored parameters specific to that board type and instance.

The "D" message interface uses a data link layer protocol (Layer 2) that is carried by the OTS's internal LAN. The line cards and Node Manager may connect to this LAN to communicate "D" message using RJ-45 connectors, which are standard serial data interfaces. A "D" Message interface dispatcher may run as a VxWorks task on the LCM. The LCM is able to support this dispatcher as an independent process since the LCM processor is powerful enough to run a multi-tasking operating system. The data link layer protocol, which may use raw Ethernet frames (including a destination field, source field, type field and check bits), avoids the overhead of higher-level protocol processing that is not warranted inside the OTS. All messages are acknowledged, and message originators are responsible for re-transmitting a message if an acknowledgement is not received in a specified time. A sniffer connected to the OTS system's internal LAN captures and display all messages on the LAN. A sniffer is a program and/or device that monitors data traveling over a network. The messages should be very easy to comprehend.

Preferably, all messages are contained in one standard Ethernet frame payload to avoid message fragmenting on transmission, and reassembly upon receipt. Moreover, this protocol is easy to debug, and aids in system debugging. Moreover, this scheme avoids the problem of assigning a network address to each line card. Instead, each line card is addressed using its built-in Ethernet address. Moreover, the Node Manager discovers all line cards as they boot, and adds each line card's address to an address table.

This use of discovery messages combined with periodic audit messages obviates the need for equipage leads (i.e., electrical leads/contacts that allow monitoring of circuits or other equipment) in the electrical backplane, and the need for monitoring of such leads by the Node Manager. In particular, when it reboots, an LCM informs the Node Manager of its presence by sending it a Discovery message. Audit messages are initiated by the Node Manager to determine what line cards are present at the OTS.

25.1.1 "D" Interface Message Types

The following message types are defined for the "D" interface.

READ Message Pair—Used by the Node Manager to retrieve monitored parameters from the LCMs. The Node Manager sends Read Request messages to the LCMs, and they respond via Read Acknowledge messages.

WRITE Message Pair—Used by the Node Manager to write provisioning data to the LCMs. The Node Manager sends Write Request messages to the LCMs, and they respond via Write Acknowledge messages.

ALARM Message Pair—Used by the LCM to inform the Node Manager of alarm conditions. A LCM sends an Alarm message to the Node Manager indicating the nature of the alarm, and the Node Manager responds with an Alarm Acknowledge message.

DISCOVERY message (autonomous)—Used by the LCM to inform the Node Manager of its presence in the OTS when the line card reboots. The Node Manager responds with a Discovery Acknowledge message.

AUDIT message—Used by the Node Manager to determine what line cards are present in the OTS. The LCM responds with a Discovery Acknowledge message.

25.1.2 "D" Interface Message Definitions

Tables 6–11 define example "D" message interface packets. Note that some of the messages, such as the "discovery" and "attention" messages, are examples of anonymous push technology since they are communications that are initiated by a lower layer in the control hierarchy to a higher layer.

TABLE 6

Instruction Codes in LCM to Node Manager Packets

| Code (hex) | Name | Description |
| --- | --- | --- |
| 60 | Discovery | first packet sent after power-up |
| 61 | attention | sending alarm and data |
| 11 | data | sending data requested |
| 31 | ack | acknowledge data write packet |
| 36 | nack | error - packet not accepted |

TABLE 7

LCM originated "Discovery" Packet

| Function | Size (16-bit words) | Description |
| --- | --- | --- |
| Dest. address (Node Manager) | 3 | hex FF:FF:FF:FF:FF:FF |
| Source address (LCM) | 3 | hex <OTS LCM MAC PREFIX>: pack pos. ID |
| protocol key | 1 | hex BEEF |
| sw process tag | 2 | initially 0, after time-out 1 |
| instruction | 1 | hex 0060 |
| pack type | 1 | pack type, version, serial number |
| data size | 1 | hex 0000 |

TABLE 8

LCM originated "Attention" Packet

| Function | Size (16-bit words) | Description |
| --- | --- | --- |
| Dest. address (Node Manager) | 3 | Node Manager MAC address from received packet |
| Source address (LCM) | 3 | hex <OTS LCM MAC PREFIX>: pack position ID |
| Protocol key | 1 | hex BEEF |
| Sw process tag | 2 | initially 0, after time-out 1 |
| Instruction | 1 | hex 0061 |
| Pack type | 1 | pack type, version, serial number |
| Data size | 1 | number of 16-bit data words to follow |
| ADC measures | 16 | last measured values of analog inputs |
| Limit select | 1 | 16 limit select bits in use |
| Alarm mask | 1 | 16 alarm mask bits in use |

TABLE 8-continued

LCM originated "Attention" Packet

| Function | Size (16-bit words) | Description |
| --- | --- | --- |
| Status reg. | 4 | 64 pack status bits |
| Status reg. level select | 4 | 64 status alarm level select bits |
| Status reg. mask | 4 | 64 status alarm mask bits in use |
| ADC attn bits | 2 | 16 analog limit exception bits |
| Status attn bits | 4 | 64 status exception bits |
| Device results | 32 | control and results registers |

TABLE 9

LCM "Response" Packet

| Function | Size (16-bit words) | Description |
| --- | --- | --- |
| Dest. address (Node Manager) | 3 | Node Manager address from received packet |
| Source address (LCM) | 3 | hex <OTS LCM MAC PREFIX>: pack position ID |
| Protocol key | 1 | hex BEEF |
| Sw process tag | 2 | copied from request packet |
| Instruction | 1 | see Table 8 |
| Address | 1 | copied from request packet |
| Data size | 1 | number of 16-bit data words to follow |
| Data | n | payload |

TABLE 10

Instruction Codes in Node Manager to LCM Packets

| Code (Hex) | Name | Description |
| --- | --- | --- |
| 50 | First ack | acknowledging the "Discovery" packet |
| 51 | Alarm ack | acknowledging "Attention" packet |
| 01 | Read | read data from address indicated |
| 02 | Write | write data to address indicated |
| 03 | Wsw | write switch |
| 15 | Bitwrite | bit position to change: where mask word bit = 1 data to write: data word |
| 41 | Reload | causes re-loading the MPC8255 microcontroller from EPROMs |
| 42 | Soft reset | causes "soft reset" of the pack |
| 43 | Hard reset | causes "hard reset" of the pack |

TABLE 11

Node Manager - originated packets

| Function | Size (16-bit words) | Description |
| --- | --- | --- |
| Dest. address (Node Manager) | 3 | hex <OTS LCM MAC PREFIX>: pack pos. ID |
| Source address (LCM) | 3 | MAC address of OTS Node Manager |
| Protocol key | 1 | hex BEEF |
| sw process tag | 2 | sequence number |
| Instruction | 1 | see Table 8 |
| Address | 1 | LCM register, or other valid on-pack location |

TABLE 11-continued

Node Manager - originated packets

| Function | Size (16-bit words) | Description |
| --- | --- | --- |
| data size | 1 | number of 16-bit data words to follow |
| Data | n | payload |

25.2 "S" Message Interface

The "S" message interface of the Node Manager provides the application layer software with access to the information collected and aggregated at the "D" message interface. Information is available on the Core Embedded software side (control plane) of the "S" message interface by line card type and instance for both read and write access. An example of read access is "Get all monitored parameters for a particular line card instance." An example of write access is "Set all control parameters for a specific line card instance." Performance can be increased by not supporting Gets and Sets on individual parameters.

For example, these messages may register/deregister an application task for one or more alarms from all instances of a line card type, provide alarm notification, get all monitored parameters for a specific line card, or set all control parameters for a specific line card.

The "S" message interface is an abstraction layer: it abstracts away, from the application software's perspective, the details by which the lower-level Node Manager software collected and aggregated information. While providing an abstract interface, the "S" Message Interface still provides the application layer software with access to the aggregated information and control obtained from the hardware via the "D" Message Interface, and from the Node Manager state machines. Moreover, the "S" interface defines how the TL-1 craft interface is encoded/decoded by the Node Manager. The TL-1 craft interface definition describes the command and control capabilities that are available at the "S" interface. See section 23.3.4, entitled "Command Line Interface."

The application software using the "S" Message interface may run as, e.g., one or more VxWorks tasks. The Core Embedded software may run as a separate VxWorks task also. To preserve the security afforded by the RTOS to independent tasks, the "S" Message Interface may be implemented using message queues, which insulates both sides of the interface from a hung or rebooting task on the opposite side of the interface. As for the LCM, this division of the Node Manager software into independent tasks is possible because the Node Manager is powerful enough to run a multi-tasking operating system. Therefore, the present inventive control architecture utilizes the presence of a multi-tasking operating system at all three of its levels: LCM, Node Manager and NMS. This multi-tasking ability has been exploited at all levels of control to produce a system that is more modularized, and therefore more reliable, than prior approaches to optical network control.

26. Example OTS Embodiment

Summary information of an example embodiment of the OTS is as follows:

Optical Specs:

| | |
| --- | --- |
| Wavelength capacity: | 64 wavelength channels |
| Fiber wavelength density: | 8 wavelengths |
| Data rate: | Totally transparent |
| Physical topology: | Point-to-Point |
| Lightpath topology: | Point-to-Point |
| Wavelength spacing: | 200 GHz (ITU-grid) |
| Optical bandwidth (channels): | C and L bands |
| Wavelength protection: | Selectable on a per lightpath basis |

Optical Modules:

(i) Optical transport Modules
(ii) Optical switching module
(iii) Optical add/drop module
(iv) Optical performance monitoring module Access Line Interface Modules:

Optical line interface cards: GbE, OC-n/STM-n
(i) 16-ports (8 input & 8 output) OC-12 line card
(ii) 16-ports (8 input & 8 output) OC-48 line card
(iii) 16-ports (8 input & 8 output) Gigabit Ethernet line card
(iv) 4-ports (2 input and 2 output) OC-192 line card Optical Signaling Module:

4-Ports using Ethernet Signaling
Support IP, Ethernet Packets

Node Manager:

| | |
| --- | --- |
| Processors: | MPC8260, MPC755 |
| SDRAM: | 256 MB upgradable to 512 MB |
| Flash Memory: | 64 Mbytes |
| Ethernet Port: | 100 BaseT with Auto-Sensing |
| Ethernet Hubs: | OEM assembly 10 ports, 1 per shelf |
| Serial Port: | 1 EIA 232-D Console Port |
| Software Upgrades: | Via remote download |

Line Card Manager:

| | |
| --- | --- |
| Processor: | MPC8260 |
| SDRAM: | 64 MB upgradable to 128 MB |
| Flash Memory: | 16 Mbytes |
| Ethernet Port: | 100 BaseT with Auto-Sensing |
| Serial Port: | 1 EIA 232-D Console Port |
| Software Upgrades: | Via local download |

Backplanes:

Optical backplane
Electrical backplane
Ethernet LAN interconnecting Node Manager and LCMs 27. Glossary

| | |
| --- | --- |
| A/D | Analog-to-Digital |
| ABR | Available Bit Rate |
| ADM | Add-Drop Multiplexer |
| ALI | Access Line Interface |
| API | Application Programming Interface |
| ATM | Asynchronous Transfer Mode |
| CBR | Constant Bit Rate |
| CIT | Craft Interface Terminal |
| CORBA | Common Object Request Broker Architecture |
| DAC | Digital-to-Analog Converter |
| DMA | Direct Memory Access |
| DWDM | Dense Wavelength Division Multiplexing |
| EDFA | Erbium Doped Fiber Amplifier |
| EJB | Enterprise Java Beans |
| EEPROM | Electrically Erasable PROM |
| EPROM | Erasable Programmable Read-Only Memory |
| FCC | Fast Communication Channel |
| Gbps | Giga bits per second |
| GbE | Gigabit Ethernet |
| GPIO | General Purpose Input-Output (interface) |
| GUI | Graphical User Interface |
| HDLC | High-Level Data Link Control |
| IETF | Internet Engineering Task Force |
| I$^2$C | Inter Integrated Circuit (bus) |
| IP | Internet Protocol |
| ITU | International Telecommunications Union |
| JDK | Java Development Kit (Sun Microsystems, Inc.) |
| L2 | Level 2 (cache) or Layer 2 (of OSI model) |

27. Glossary (continued)

| | |
|---|---|
| LCM | Line Card Manager |
| LDAP | Lightweight Directory Access Protocol (IETF RFC 1777) |
| LSR | Label Switch Router |
| MAC | Medium Access Control (layer) |
| MB | Megabyte |
| MEMS | Micro-Electro-Mechanical System |
| MIB | Management Information Base |
| MPC | Motorola ® PowerPC (microprocessor) |
| MPLS | Multi Protocol Label Switching |
| NEBS | Network Equipment Building Standards |
| NMS | Network Management System |
| nm | Nanometers |
| OA | Optical Access Or Optical Amplifier |
| OA_Eg | Optical Access Egress |
| OA_In | Optical Access Ingress |
| OADM | Optical Add Drop Multiplexer |
| OC-n | Optical Carrier - specifies the speed (data rate) of a fiber optic network that conforms to the SONET standard. "n" denotes the speed as a multiple of 51.84 Mbps, such that OC-12 = 622.08 Mbps, OC-48 = 2.488 Gbps, etc. |
| ODSI | Optical Domain Service/System Interconnect |
| OEO | Optical To Electrical To Optical (conversion) |
| OEM | Original Equipment Manufacturer |
| OPM | Optical Performance Monitoring Module |
| OSC | Optical Signaling Channel |
| OSF | Optical Switch |
| OSI | Open Standards Interconnection |
| OSM | Optical Signaling Module |
| OSNR | Optical Signal To Noise Ratio |
| OSPF | Open Shortest Path First |
| OSS | Operational Support Systems |
| OTS | All-Optical Transport Switching System |
| OXC | Optical Cross Connect |
| PCI | Peripheral Component Interconnect |
| PCMCIA | Personal Computer Memory Card International Association |
| PHY | Physical (layer) |
| PIN | Photo Intrinsic |
| POP | Point Of Presence |
| PVC | Permanent Virtual Circuit |
| QoS | Quality of Service |
| RISC | Reduced Instruction Set Computer |
| RMI | Remote Method Invocation |
| RWA | Routing and Wavelength Assignment |
| RTOS | Real-Time Operating System |
| Rx | Receiver |
| SDH | Synchronous Digital Hierarchy (Networks) |
| SDRAM | Synchronous Dynamic Random Access Memory |
| SerDes | Serializer/Deserializer |
| SMC | Shared Memory Cluster |
| SNMP | Simple Network Management Protocol |
| SONET | Synchronous Optical Network |
| SPI | Special Peripheral Interface |
| STM | Synchronous Transport Mode |
| SW | Software or Switch |
| TCP | Transmission Control Protocol |
| TDM | Time Division Multiplexing |
| TMN | Telecommunication Management Network (an ITU-T standard) |
| TP | Trunk Port/Transport |
| TP_Eg | Transport Egress |
| TP_In | Transport Ingress |
| Tx | Transmitter |
| UBR | Unspecified Bit Rate |
| VBR | Variable Bit Rate |
| VME | VersaModule Eurocard (bus) |
| WAN | Wide Area Network |
| WDD | Wavelength Division Demultiplexer |
| WDM | Wavelength Division Multiplexer |
| WXC | Wavelength Cross Connect |

Accordingly, it can be seen that the present invention provides an all-optical switch that can be selectively configured to provide cross-connection and add/drop multiplexing functions in an optical network. Optical circuit cards are provided in a chassis, and connected by an optical backplane. A local area network enables control and monitoring of the cards by a local node manager. The all-optical switch can be used in an optical network that allows external access networks to access the optical network, including access networks that use Gigabit Ethernet and SONET OC-n optical signaling. Wavelength conversion is provided for wavelengths that are not compliant with the all-optical network. The invention also provides a Node Manager control mechanism that is local to each switch for configuring and monitoring the switch, as well as distributed Line Card Manager control mechanisms for monitoring and controlling each circuit card. A common, centralized Network Management System control mechanism is also provided for configuring and monitoring the switches in the network.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. An optical transport switching system for use in an optical network, comprising:
   an optical access ingress subsystem which is adapted to receive an optical signal associated with an access network;
   an optical access egress subsystem;
   a transport ingress subsystem;
   a transport egress subsystem; and
   an optical switch subsystem which is adapted to ingress the optical signal into the optical network by optically coupling the optical access ingress subsystem to the transport egress subsystem and which is adapted to selectively provide optical coupling between the transport ingress subsystem and at least one of (1) the optical access egress subsystem, and (2) the transport egress subsystem.

2. The system of claim 1, wherein:
   the optical switch subsystem comprises an all-optical switch.

3. The system of claim 1, wherein:
   the optical switch subsystem comprises a micro-electro-mechanical switch.

4. The system of claim 1, wherein:
   the optical switch subsystem is configurable to provide add multiplexing by optically coupling a specified optical output of the optical access ingress subsystem with a specified optical input of the transport egress subsystem.

5. The system of claim 1, wherein:
   the optical switch subsystem is configurable to provide drop multiplexing by optically coupling a specified optical output of the transport ingress subsystem with a specified optical input of the optical access egress subsystem.

6. The system of claim 1, wherein:
   the transport ingress subsystem and transport egress subsystems each communicate via respective optical links with at least one respective remote node in the optical network.

7. The system of claim 1, wherein:
   the optical switch subsystem is adapted to optically couple a specified optical output of the transport ingress subsystem with at least one of: (a) a specified optical input of the optical access egress subsystem, and (b) a specified optical input of the transport egress subsystem.

8. The system of claim 1, wherein:
the optical switch subsystem is configurable to provide a wavelength cross-connect by optically coupling a specified optical output of the transport ingress subsystem with a specified optical input of the transport egress subsystem.

9. The system of claim 8, wherein;
the optical switch subsystem, when configured to provide the wavelength cross-connect, is adapted to route optical signals in the optical network according to a desired routing protocol.

10. The system of claim 1, wherein:
the optical switch subsystem is adapted to optically couple a specified optical output of the optical access ingress subsystem with at least one of: (a) a specified optical input of the optical access egress subsystem, and (b) a specified optical input of the transport egress subsystem.

11. The system of claim 1, wherein:
the transport ingress subsystem receives an optical signal multiplex via at least one optical link of the optical network, and comprises a demultiplexer for demultiplexing the optical signal multiplex to provide a plurality of individual optical signals to be optically coupled by the optical switch subsystem.

12. The system of claim 1, wherein:
a plurality of individual optical signals are optically coupled to the transport egress subsystem by the optical switch subsystem, and the transport egress subsystem comprises a multiplexer for multiplexing the individual optical signals to provide an optical signal multiplex for transport via at least one optical link of the optical network.

13. The system of claim 1, further comprising:
an access line interface subsystem for converting an optical signal of an access network that has a wavelength that is non-compliant with the optical network to an optical signal having a wavelength that is compliant with the optical network.

14. The system of claim 13, wherein:
the access line interface subsystem provides the optical signal having the compliant wavelength to the optical access ingress subsystem.

15. The system of claim 1, further comprising:
an access line interface subsystem for converting an optical signal of the optical network that has a wavelength that is compliant with the optical network to an optical signal having a wavelength that is non-compliant with the optical network, but compliant with an access network associated with the optical network.

16. The system of claim 15, wherein:
the access line interface subsystem receives the optical signal having the compliant wavelength from the optical access egress subsystem.

17. The system of claim 1, further comprising:
a node manager for selectively configuring the optical switch subsystem to provide at least one of an add/drop multiplexer and a wavelength cross-connect by controlling the optical coupling provided by the optical switch subsystem.

18. The system of claim 1, wherein:
the transport ingress subsystem and transport egress subsystem provide optical inputs and outputs, respectively, of a node in the optical network.

19. The system of claim 1, wherein:
the optical access ingress subsystem, optical access egress subsystem, transport ingress subsystem, and transport egress subsystem each comprise at least one respective optical circuit card.

20. The system of claim 19, wherein:
the cards are receivable in a common bay.

21. The system of claim 1, wherein:
the subsystems each comprise respective electrical connections for communicating with a common node manager via a local area network.

22. The system of claim 1, wherein:
the subsystems each comprise respective optical connections for communicating with an optical backplane.

23. The system of claim 1, further comprising:
an optical performance monitoring subsystem for optically tapping into at least one of the optical access ingress subsystem, the optical access egress subsystem, the transport ingress subsystem, and the transport egress subsystem to obtain performance data therefrom.

24. The system of claim 1, further comprising:
an optical signaling subsystem for at least one of: (a) receiving signaling data through the transport ingress subsystem, and (b) transmitting signaling data through the transport egress subsystem.

25. An optical transport switching system for use in an optical network, comprising:
an optical access ingress subsystem;
an optical access egress subsystem which is adapted to direct the optical signal toward an access network;
a transport ingress subsystem;
a transport egress subsystem; and
the optical switch subsystem is adapted to egress an optical signal from the optical network by optically coupling the optical signal from the transport ingress subsystem to the optical access egress subsystem and is adapted to selectively provide optical coupling between the transport egress subsystem and at least one of (1) the optical access ingress subsystem and (2) the transport ingress subsystem.

26. An optical transport switching system for use in an optical network, comprising:
means for switching optical signals;
means for providing optical access ingress to the optical network;
means for providing optical access egress from the optical network;
means for providing transport ingress to the optical switching means; and
means for providing transport egress from the optical switching means;
wherein:
the switching means is adapted to ingress the optical signal into the optical network by optically coupling the means for providing optical access ingress to the means for providing transport egress and is adapted to selectively provide optical coupling between the means for providing transport ingress and one of (1) the means for providing optical access egress, and (2) the means for providing transport egress.

27. An optical transport switching system for use in an optical network, comprising:
a receiving apparatus having a plurality of respective receiving locations adapted to receive respective optical circuit cards with respective controllers, and a receiving location for receiving a central controller;

an optical backplane associated with the receiving apparatus for optically coupling to the optical circuit cards; and a local area network for electrically coupling the central controller to the circuit card controllers to enable the central controller to control and monitor the optical circuit cards.

28. The system of claim 27, wherein:

the optical circuit cards include at least a transport ingress card, a transport egress card, and a switching fabric card for optically coupling the transport ingress card and the transport egress card.

29. The system of claim 27, wherein:

the optical backplane comprises optical fibers.

30. The system of claim 27, wherein:

the optical circuit cards are of a plurality of card types; and at least some of the receiving locations are designated for receiving particular ones of the card types.

* * * * *

(12) EX PARTE REEXAMINATION CERTIFICATE (8665th)
United States Patent
Tzathas et al.

(10) Number: US 6,973,229 C1
(45) Certificate Issued: Nov. 15, 2011

(54) NODE ARCHITECTURE FOR MODULARIZED AND RECONFIGURABLE OPTICAL NETWORKS, AND METHODS AND APPARATUS THEREFOR

(75) Inventors: Anastasios Tzathas, Howell, NJ (US); Moon W. Kim, Pleasanton, CA (US); Abdella Battou, Silver Spring, MD (US)

(73) Assignee: Lambda Opticalsystems Corporation, Holmdel, NJ (US)

Reexamination Request:
No. 90/009,864, Dec. 23, 2010

Reexamination Certificate for:
Patent No.: 6,973,229
Issued: Dec. 6, 2005
Appl. No.: 09/795,950
Filed: Feb. 28, 2001

(51) Int. Cl.
*G02B 6/26* (2006.01)
*G02B 6/28* (2006.01)
*H04J 14/00* (2006.01)

(52) U.S. Cl. .............................. 385/16; 385/17; 385/24; 398/43; 398/45; 398/48

(58) Field of Classification Search ..................... 385/16
See application file for complete search history.

(56) References Cited

PUBLICATIONS

To view the complete listing of prior art documents cited during the proceeding for Reexamination Control Number 90/009,864, please refer to the USPTO's public Patent Application Information Retrieval (PAIR) system under the Display References tab.

*Primary Examiner* — Christina Y Leung

(57) ABSTRACT

An optical transport switching system having an all-optical switch that can be selectively configured to provide cross-connection and add/drop multiplexing functions. Optical circuit cards are provided in a chassis/bay, and connected by an optical backplane. The circuit cards may include access line interface cards, optical access ingress cards, transport ingress cards, transport egress cards, and optical access egress cards. An optical switching fabric provides selective optical coupling between the cards. The all-optical switch can be used in an optical network that allows external/access networks to access the optical network, including access networks that use Gigabit Ethernet or SONET signaling. Wavelength conversion is provided for non-compliant wavelengths of the access networks. A local area network enables control and monitoring of the cards by a local node manager.

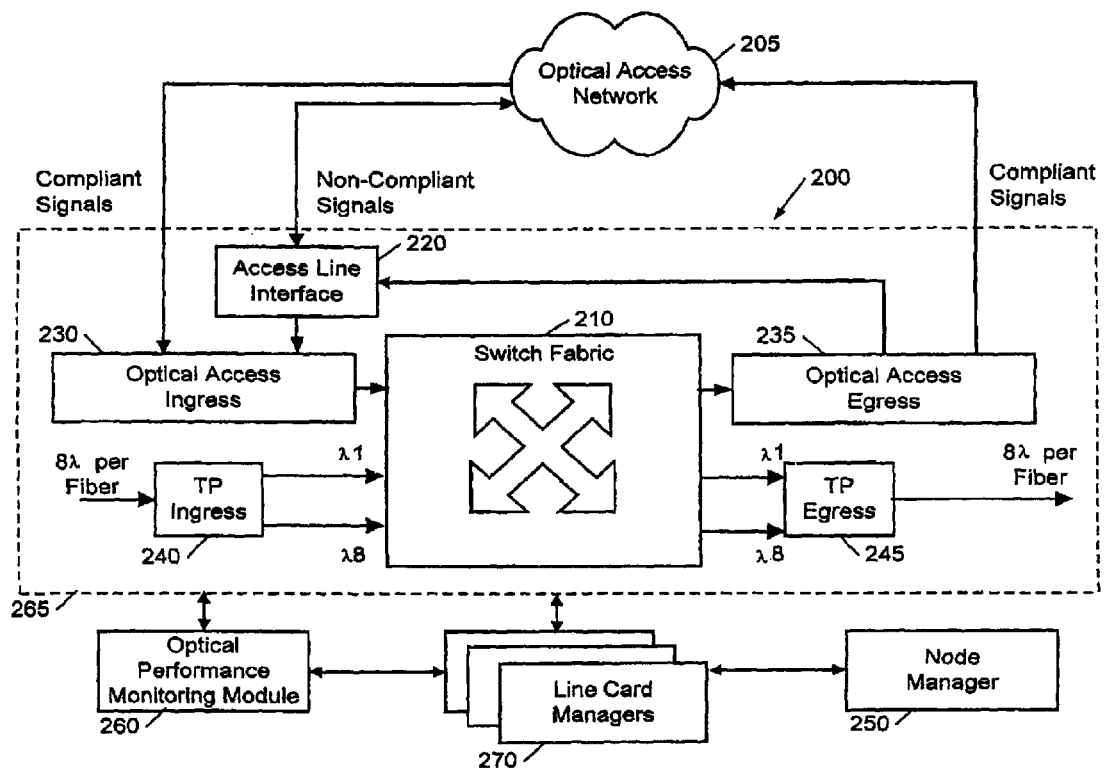

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-26 is confirmed.

Claims 27-30 are cancelled.

* * * * *